(12) United States Patent
De Jong et al.

(10) Patent No.: US 10,698,701 B1
(45) Date of Patent: Jun. 30, 2020

(54) USER INTERFACE FOR ACCESSING AN ACCOUNT

(71) Applicant: Apple Inc., Cupertino, CA (US)

(72) Inventors: Frank De Jong, San Francisco, CA (US); Hannah S. Story, San Mateo, CA (US); Keetae Ryu, Pittsburgh, PA (US); Dmitry V. Belov, Santa Clara, CA (US); Gokul P. Thirumalai, Mountain View, CA (US); Wayne Loofbourrow, San Jose, CA (US); Jonathan Birdsall, San Jose, CA (US); Nagarjuna Thottempudi, Los Altos, CA (US); Felipe Marin Cypriano, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/585,178

(22) Filed: Sep. 27, 2019

Related U.S. Application Data

(60) Provisional application No. 62/855,985, filed on Jun. 1, 2019.

(51) Int. Cl.
*G06F 3/048* (2013.01)
*G06F 9/445* (2018.01)
(Continued)

(52) U.S. Cl.
CPC ............ *G06F 9/4451* (2013.01); *G06F 21/31* (2013.01); *H04L 67/306* (2013.01)

(58) Field of Classification Search
CPC .................. H04L 67/306; H04L 51/046; H04L 2463/082; G06F 21/31; G06F 2221/2117;
(Continued)

(56) References Cited

U.S. PATENT DOCUMENTS 8,112,787 B2    2/2012  Buer
2007/0013662 A1  1/2007  Fauth
(Continued)

FOREIGN PATENT DOCUMENTS

EP     1950678 A1     7/2008
WO   2007/041834 A1   4/2007
WO   2015/112868 A1   7/2015

OTHER PUBLICATIONS

Certificate of Examination received for Australian Patent Application No. 2017101425, dated Jan. 17, 2018, 2 pages.
(Continued)

*Primary Examiner* — Phuong H Nguyen
(74) *Attorney, Agent, or Firm* — Dentons US LLP

(57) ABSTRACT

The present disclosure generally relates to setting up an account for a service. A request to set up an account for a first service is received. In response to receiving the request to set up the account for the first service, a first login option and a second login option are displayed. If an input selecting the first login option is detected, a request to use first contact information for a user to set up the account for the first service is transmitted. If an input selecting the second login option is detected, a request to use second contact information for the user to set up the account for the first service is transmitted. The second contact information is automatically generated for the service and does not reveal the first contact information for the user.

54 Claims, 41 Drawing Sheets

(51) Int. Cl.
*G06F 21/31* (2013.01)
*H04L 29/08* (2006.01)

(58) Field of Classification Search
CPC . G06F 2221/2115; G06F 21/30; G06F 9/4451
See application file for complete search history.

(56) References Cited

U.S. PATENT DOCUMENTS

| | | |
|---|---|---|
| 2009/0067689 A1 | 3/2009 | Porter et al. |
| 2011/0138450 A1 | 6/2011 | Kesanupalli et al. |
| 2014/0195815 A1 | 7/2014 | Taveau et al. |
| 2015/0046336 A1 | 2/2015 | Cummins |
| 2015/0058191 A1 | 2/2015 | Khan et al. |
| 2015/0074615 A1 | 3/2015 | Han et al. |
| 2015/0089636 A1 | 3/2015 | Martynov et al. |
| 2015/0134956 A1* | 5/2015 | Stachura ............ H04L 63/0807 713/168 |
| 2015/0170146 A1 | 6/2015 | Ji et al. |
| 2015/0186636 A1 | 7/2015 | Tharappel et al. |
| 2015/0324615 A1 | 11/2015 | Matsumoto et al. |
| 2015/0348001 A1 | 12/2015 | Van Os et al. |
| 2016/0092877 A1 | 3/2016 | Chew |
| 2016/0241555 A1 | 8/2016 | Vo et al. |
| 2016/0350522 A1 | 12/2016 | Chi et al. |
| 2017/0024091 A1* | 1/2017 | Hosier, Jr. ............... H04L 51/32 |
| 2017/0046704 A1 | 2/2017 | Büchner et al. |
| 2017/0147186 A1 | 5/2017 | Velusamy et al. |
| 2018/0114010 A1 | 4/2018 | Van Os et al. |

OTHER PUBLICATIONS

Decision to Grant received for Danish Patent Application No. PA201770804, dated Jun. 28, 2019, 2 pages.
European Search Report received for European Patent Application No. 17865509.8, dated Oct. 2, 2019, 5 pages.
Intention to Grant received for Danish Patent Application No. PA201770804, dated Apr. 10, 2019, 2 pages.
International Preliminary Report on Patentability received for PCT Patent Application No. PCT/US2017/058368, dated Feb. 19, 2019, 5 pages.
International Search Report and Written Opinion received for PCT Patent Application No. PCT/US2017/058368, dated Feb. 23, 2018, 12 pages.
Invitation to Pay Additional Fee received for PCT Patent Application No. PCT/US2017/058368, dated Dec. 14, 2017, 2 pages.
Non-Final Office Action received for U.S. Appl. No. 15/782,068, dated Jun. 3, 2019, 17 Pages.
Notice of Acceptance received for Australian Patent Application No. 2017317605, dated Aug. 28, 2019, 3 Pages.
Notice of Allowance received for U.S. Appl. No. 15/782,068, dated Sep. 24, 2019, 7 pages.
Office Action received for Australian Patent Application No. 2017317605, dated Apr. 11, 2019, 4 pages.
Office Action received for Australian Patent Application No. 2017317605, dated Feb. 22, 2019, 4 pages.
Office Action received for Danish Patent Application No. PA201770804, dated Feb. 1, 2018, 9 pages.
Office Action received for Danish Patent Application No. PA201770804, dated May 31, 2018, 6 pages.
Office Action received for Danish Patent Application No. PA201770804, dated Nov. 6, 2018, 4 pages.
Office Action received for European Patent Application No. 17865509.8, dated Oct. 10, 2019, 6 pages.
Office Action received for German Patent Application No. 202017005507.4, dated Feb. 5, 2018, 2 pages (1 page of English Translation and 1 page of Official Copy).
Search Report received for Germany Patent Application No. 202017005507.4, dated Jan. 2, 2019, 6 pages (1 page of English Translation and 5 pages of Official Copy).

* cited by examiner

USER INTERFACE FOR ACCESSING AN ACCOUNT

CROSS-REFERENCE TO RELATED APPLICATIONS

This application claims the benefit of U.S. Provisional Patent Application No. 62/855,985, entitled "USER INTERFACE FOR ACCESSING AN ACCOUNT," filed on Jun. 1, 2019, which is hereby incorporated by reference in its entirety.

FIELD

The present disclosure relates generally to computer user interfaces, and more specifically to user interfaces for setting up an account for a service.

BACKGROUND

Services such as applications or websites use user accounts to identify a user using the application or website. In many cases, the application or website provides customized information to the user based on their user account.

BRIEF SUMMARY

Some techniques for setting up an account for a service using electronic devices, however, are generally cumbersome and inefficient. For example, some existing techniques use a complex and time-consuming user interface, which may include manually entering contact information for the user with multiple key presses or keystrokes. For another example, some existing techniques expose the user's personal information, such as the user's email address, to the service. Existing techniques require more time than necessary, wasting user time and device energy. This latter consideration is particularly important in battery-operated devices.

Accordingly, the present technique provides electronic devices with faster, more efficient methods and interfaces for setting up an account for a service. Such methods and interfaces optionally complement or replace other methods for setting up accounts. Such methods and interfaces reduce the cognitive burden on a user and produce a more efficient human-machine interface. For battery-operated computing devices, such methods and interfaces conserve power and increase the time between battery charges.

Example methods are disclosed herein. An example method includes, at an electronic device with a display device: receiving a request to set up an account for a first service; in response to receiving the request to set up the account for the first service, concurrently displaying, via the display device: a first login option; and a second login option; detecting a set of one or more inputs; and in response to detecting the set of one or more inputs: in accordance with a determination that the set of one or more inputs corresponds to selection of the first login option, transmitting a request to use first contact information for a user to set up the account for the first service; and in accordance with a determination that the set of one or more inputs corresponds to selection of the second login option, transmitting a request to use second contact information for the user to set up the account for the first service, wherein the second contact information is automatically generated for the service and does not reveal the first contact information for the user.

Example non-transitory computer-readable storage media are described herein. An example non-transitory computer-readable storage medium stores one or more programs configured to be executed by one or more processors of an electronic device with a display device, the one or more programs including instructions for: receiving a request to set up an account for a first service; in response to receiving the request to set up the account for the first service, concurrently displaying, via the display device: a first login option; and a second login option; detecting a set of one or more inputs; and in response to detecting the set of one or more inputs: in accordance with a determination that the set of one or more inputs corresponds to selection of the first login option, transmitting a request to use first contact information for a user to set up the account for the first service; and in accordance with a determination that the set of one or more inputs corresponds to selection of the second login option, transmitting a request to use second contact information for the user to set up the account for the first service, wherein the second contact information is automatically generated for the service and does not reveal the first contact information for the user.

Example transitory computer-readable storage media are described herein. An example transitory computer-readable storage medium stores one or more programs configured to be executed by one or more processors of an electronic device with a display device, the one or more programs including instructions for: receiving a request to set up an account for a first service; in response to receiving the request to set up the account for the first service, concurrently displaying, via the display device: a first login option; and a second login option; detecting a set of one or more inputs; and in response to detecting the set of one or more inputs: in accordance with a determination that the set of one or more inputs corresponds to selection of the first login option, transmitting a request to use first contact information for a user to set up the account for the first service; and in accordance with a determination that the set of one or more inputs corresponds to selection of the second login option, transmitting a request to use second contact information for the user to set up the account for the first service, wherein the second contact information is automatically generated for the service and does not reveal the first contact information for the user.

Example electronic devices are described herein. An example electronic device includes a display device; one or more processors; and memory storing one or more programs configured to be executed by the one or more processors, the one or more programs including instructions for: receiving a request to set up an account for a first service; in response to receiving the request to set up the account for the first service, concurrently displaying, via the display device: a first login option; and a second login option; detecting a set of one or more inputs; and in response to detecting the set of one or more inputs: in accordance with a determination that the set of one or more inputs corresponds to selection of the first login option, transmitting a request to use first contact information for a user to set up the account for the first service; and in accordance with a determination that the set of one or more inputs corresponds to selection of the second login option, transmitting a request to use second contact information for the user to set up the account for the first service, wherein the second contact information is automatically generated for the service and does not reveal the first contact information for the user.

An example electronic device includes a display device; means for receiving a request to set up an account for a first service; means for, in response to receiving the request to set up the account for the first service, concurrently displaying, via the display device: a first login option; and a second login option; means for detecting a set of one or more inputs; and means for, in response to detecting the set of one or more inputs: in accordance with a determination that the set of one or more inputs corresponds to selection of the first login option, transmitting a request to use first contact information for a user to set up the account for the first service; and in accordance with a determination that the set of one or more inputs corresponds to selection of the second login option, transmitting a request to use second contact information for the user to set up the account for the first service, wherein the second contact information is automatically generated for the service and does not reveal the first contact information for the user.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for setting up an account for a service, thereby increasing the effectiveness, efficiency, and user satisfaction with such devices. Such methods and interfaces may complement or replace other methods for setting up accounts.

DESCRIPTION OF THE FIGURES

For a better understanding of the various described embodiments, reference should be made to the Description of Embodiments below, in conjunction with the following drawings in which like reference numerals refer to corresponding parts throughout the figures.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for setting up an account for a service. For example, some existing techniques use a complex and time-consuming user interface, which may include manually entering contact information for the user with multiple key presses or keystrokes. In contrast, techniques of the present disclosure can reduce the cognitive burden on a user by reducing the amount of information that needs to be entered to set up the account, thereby enhancing productivity. Further, such techniques can reduce processor and battery power otherwise wasted on redundant user inputs.

Figure 6A:
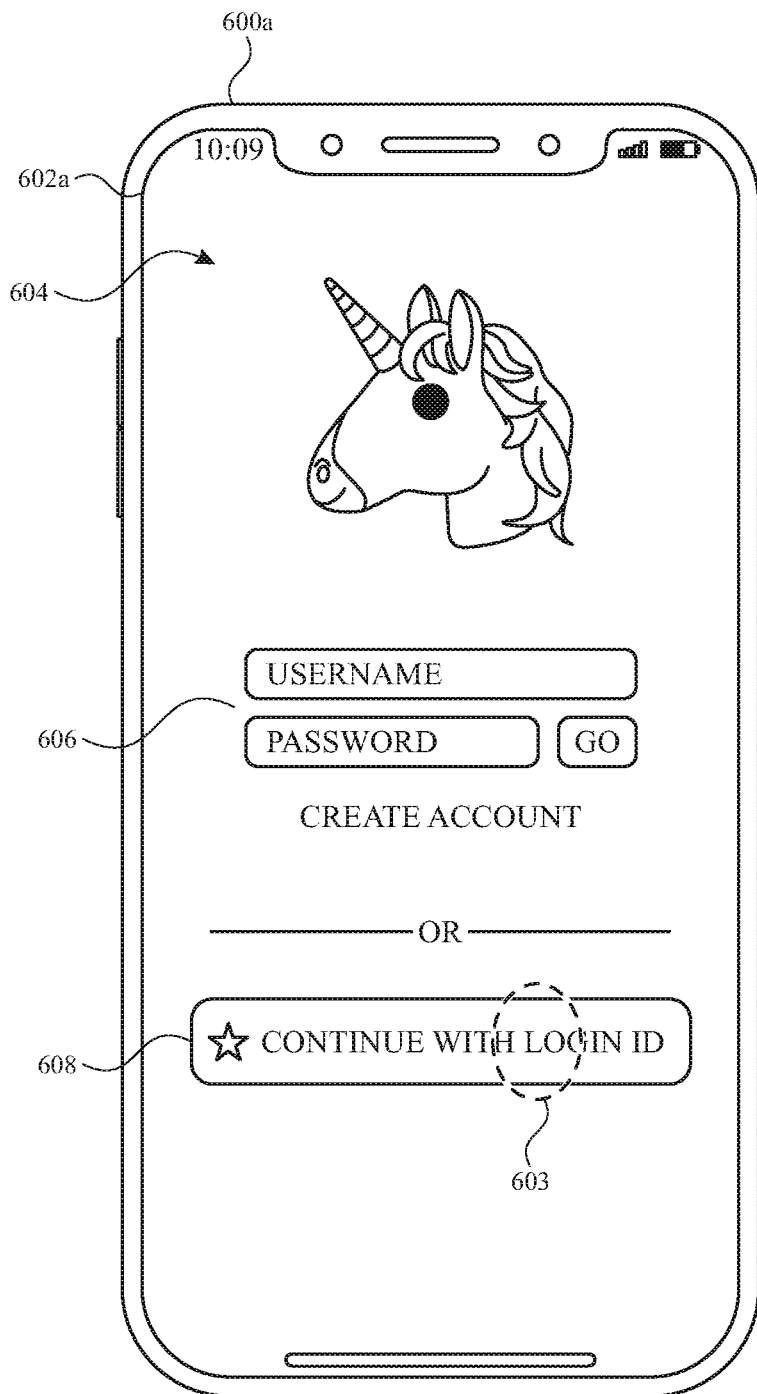
FIGS. 6A-6W illustrate exemplary user interfaces for setting up an account for a service in accordance with some embodiments.
Figure 6W:
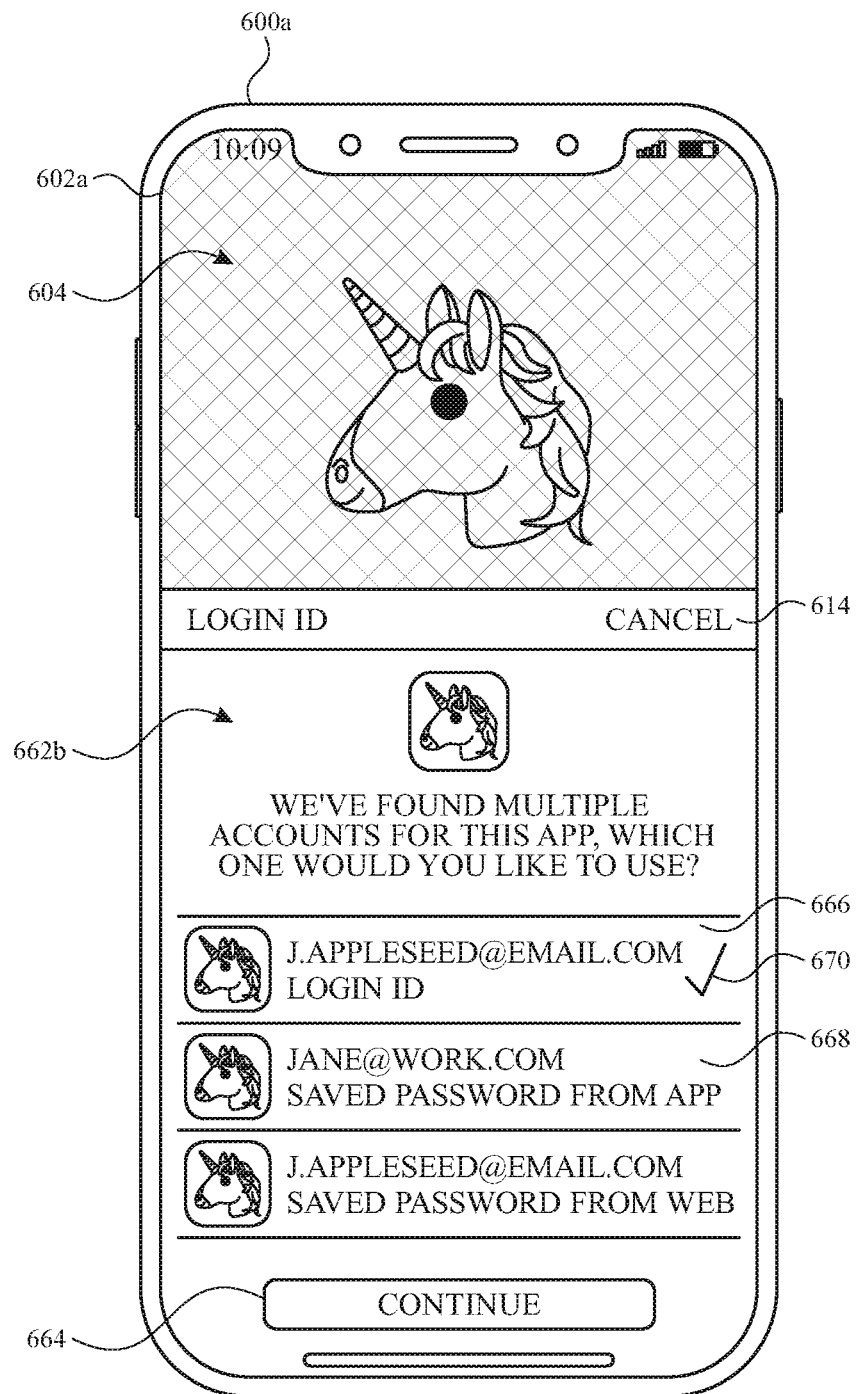
Figure 7A:
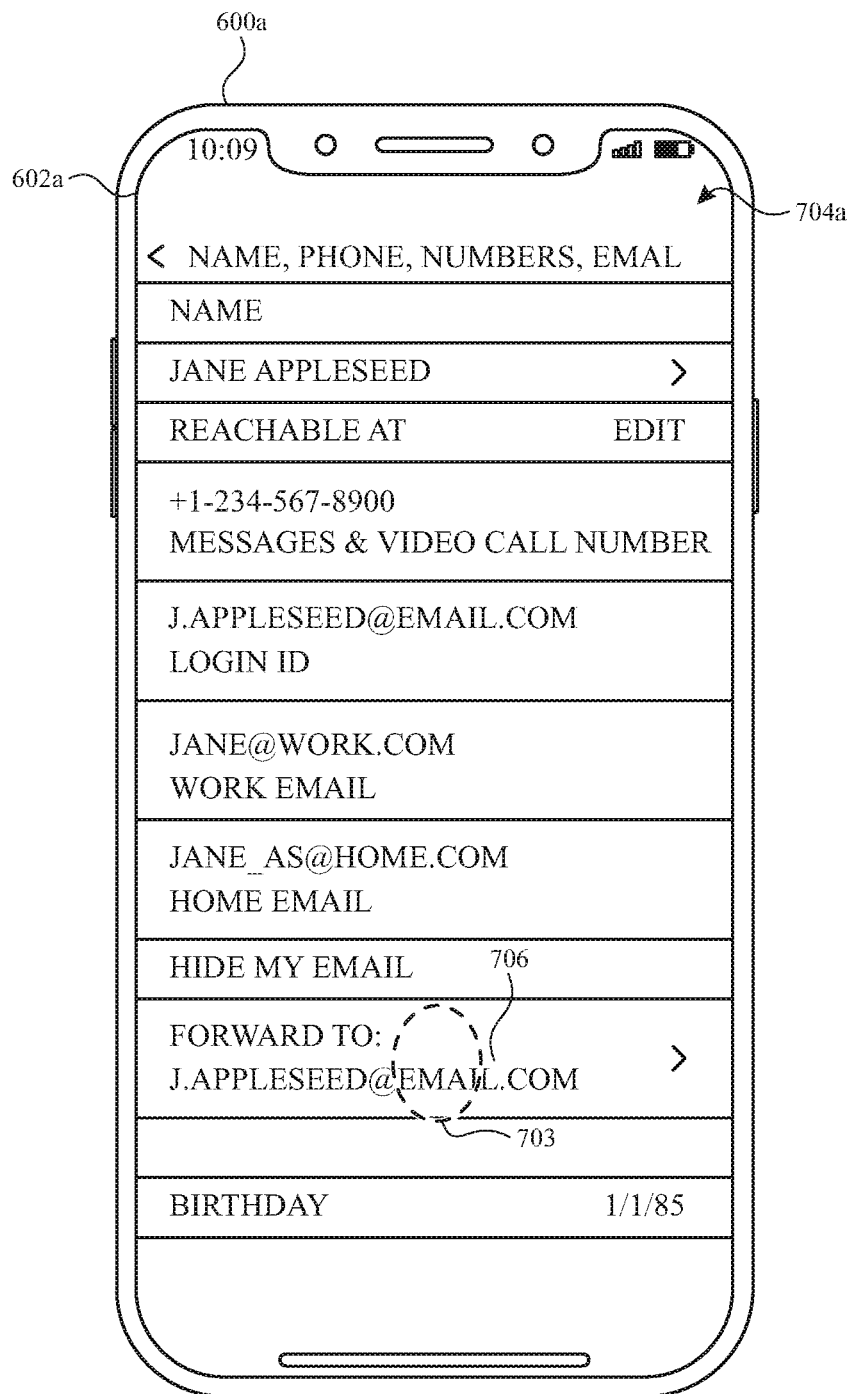
FIGS. 7A-7B illustrate exemplary user interfaces for managing contact information associated with the service in accordance with some embodiments.
Figure 7B:
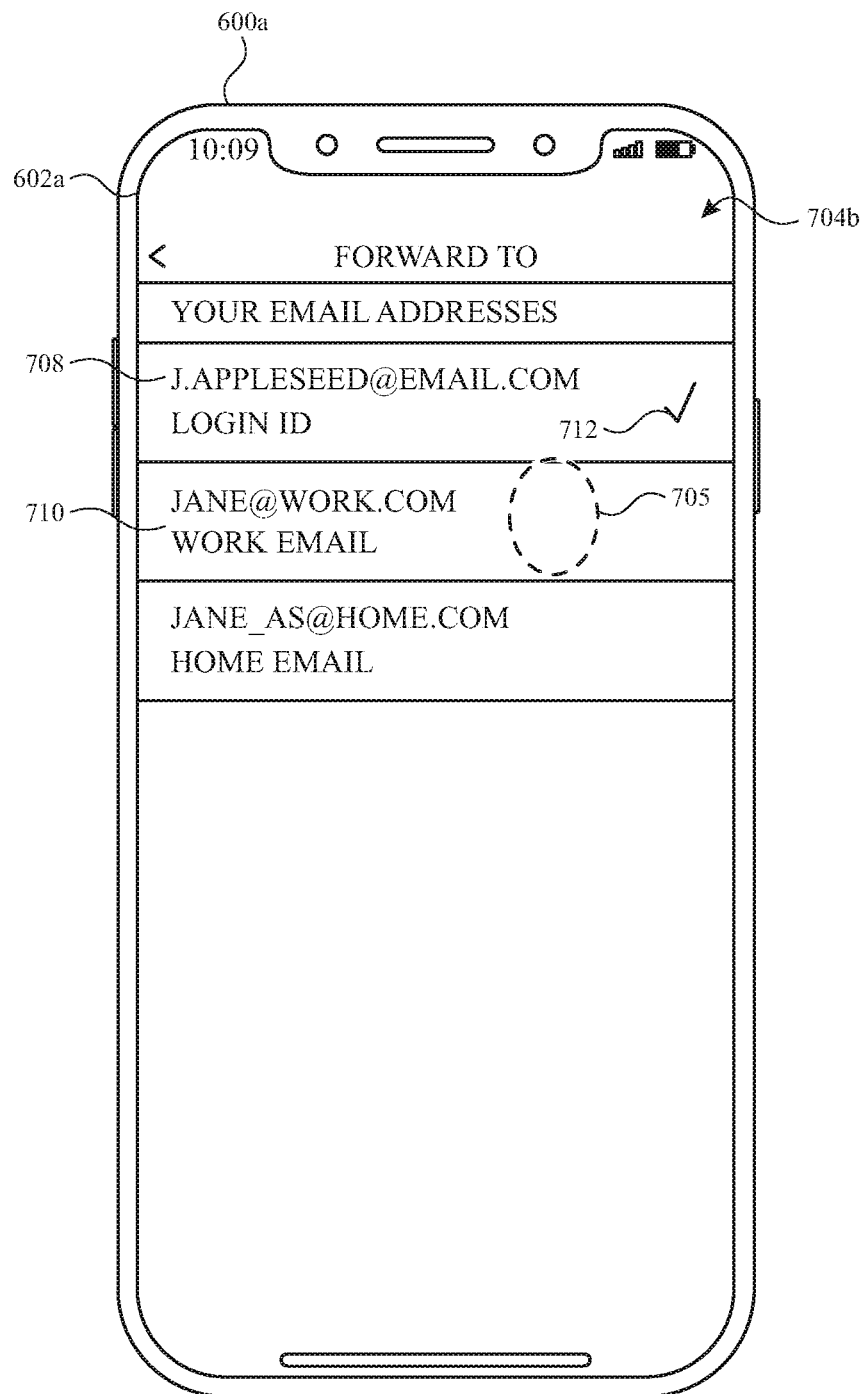

Below, FIGS. 1A-1B, 2, 3, 4A-4B, and 5A-5B provide a description of exemplary devices for performing the techniques for setting up an account for a service. FIGS. 6A-6W illustrate exemplary user interfaces for setting up an account for a service. FIGS. 7A-7B illustrate exemplary user interfaces for managing contact information associated with the service. FIGS. 8A-8G illustrate exemplary user interfaces for viewing and managing settings for the service. FIG. 9 is a flow diagram illustrating methods of setting up an account for a service, in accordance with some embodiments. The user interfaces in FIGS. 6A-6W, 7A-7B, and 8A-8G are used to illustrate the processes described below, including the processes in FIG. 9.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
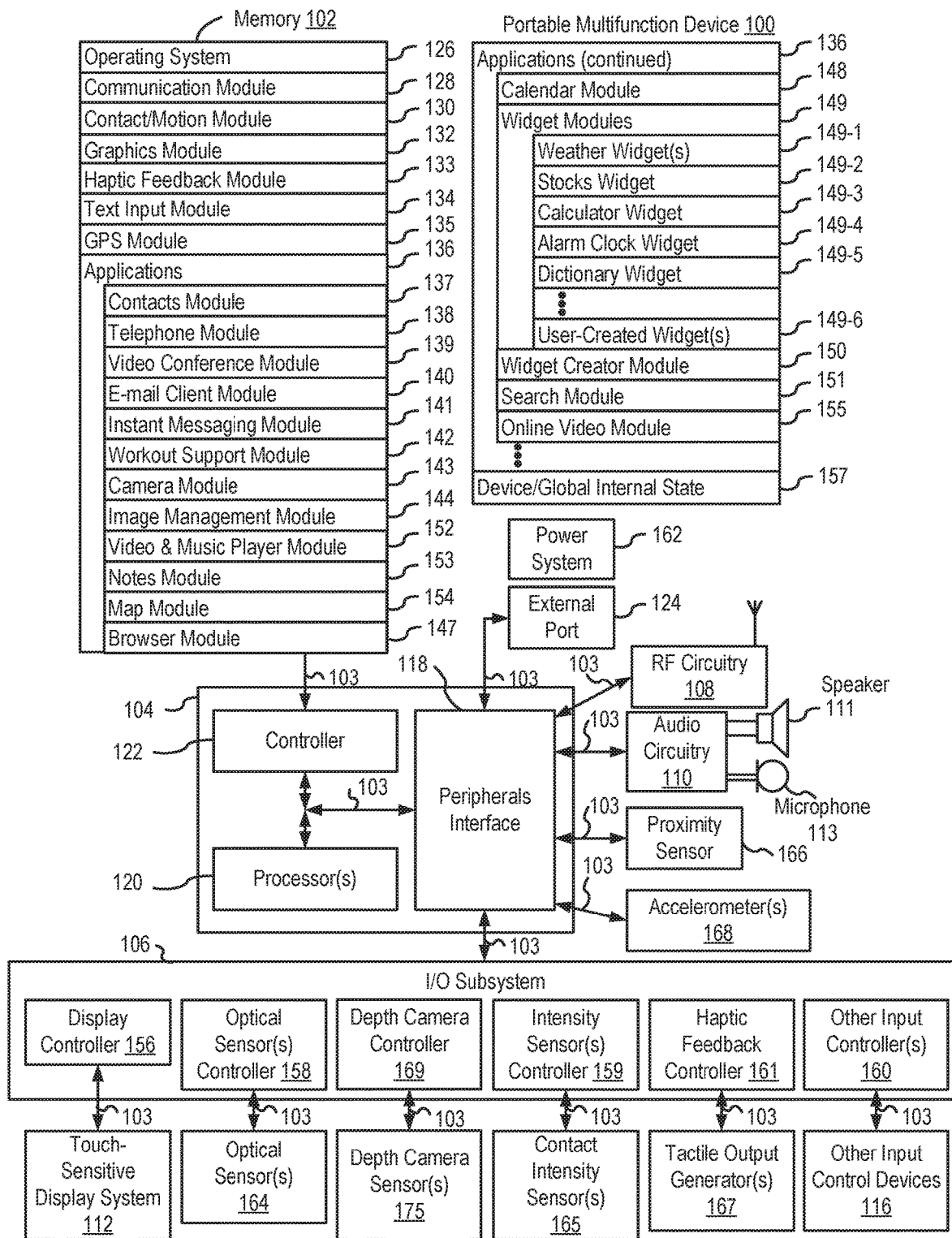
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
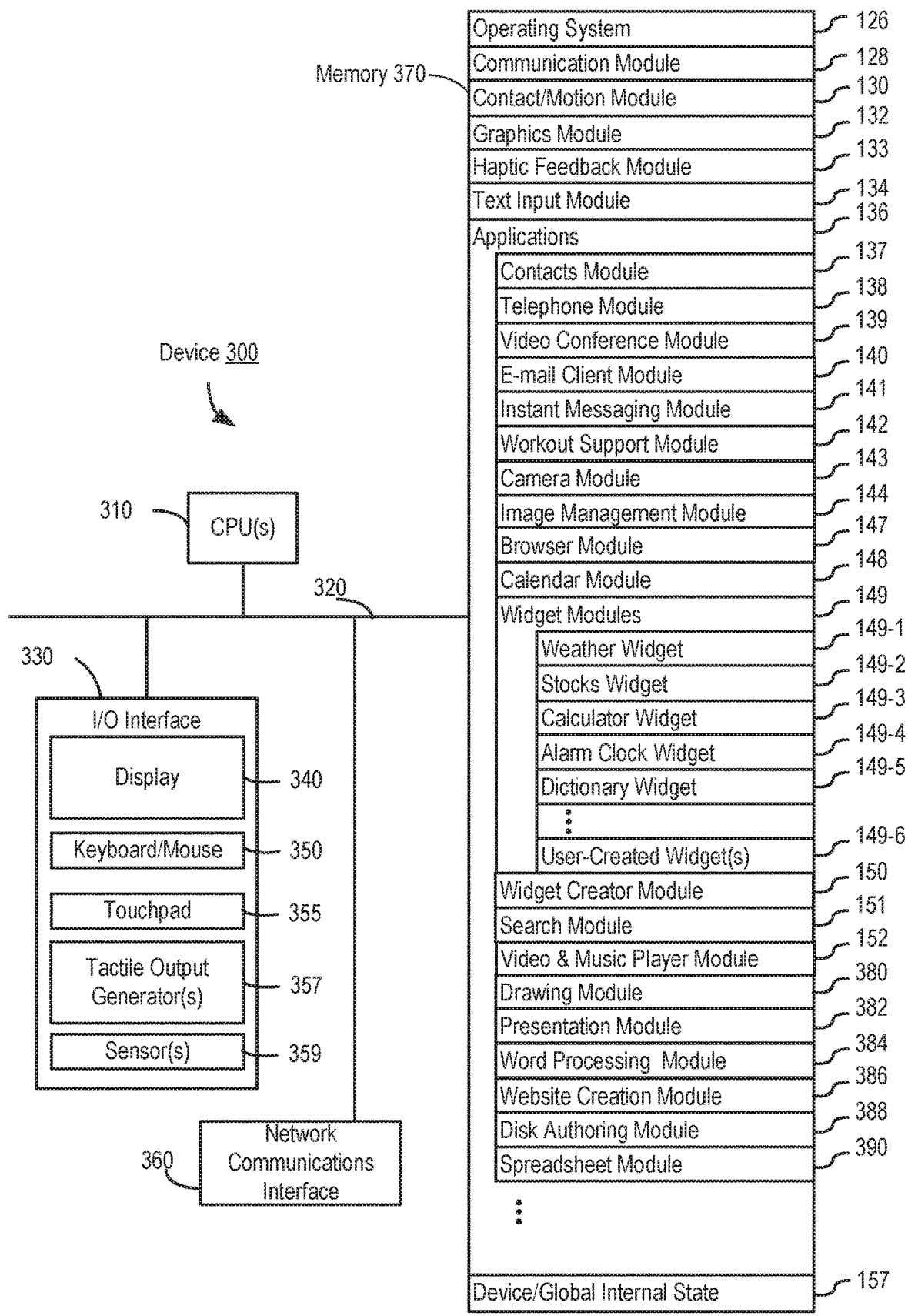
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
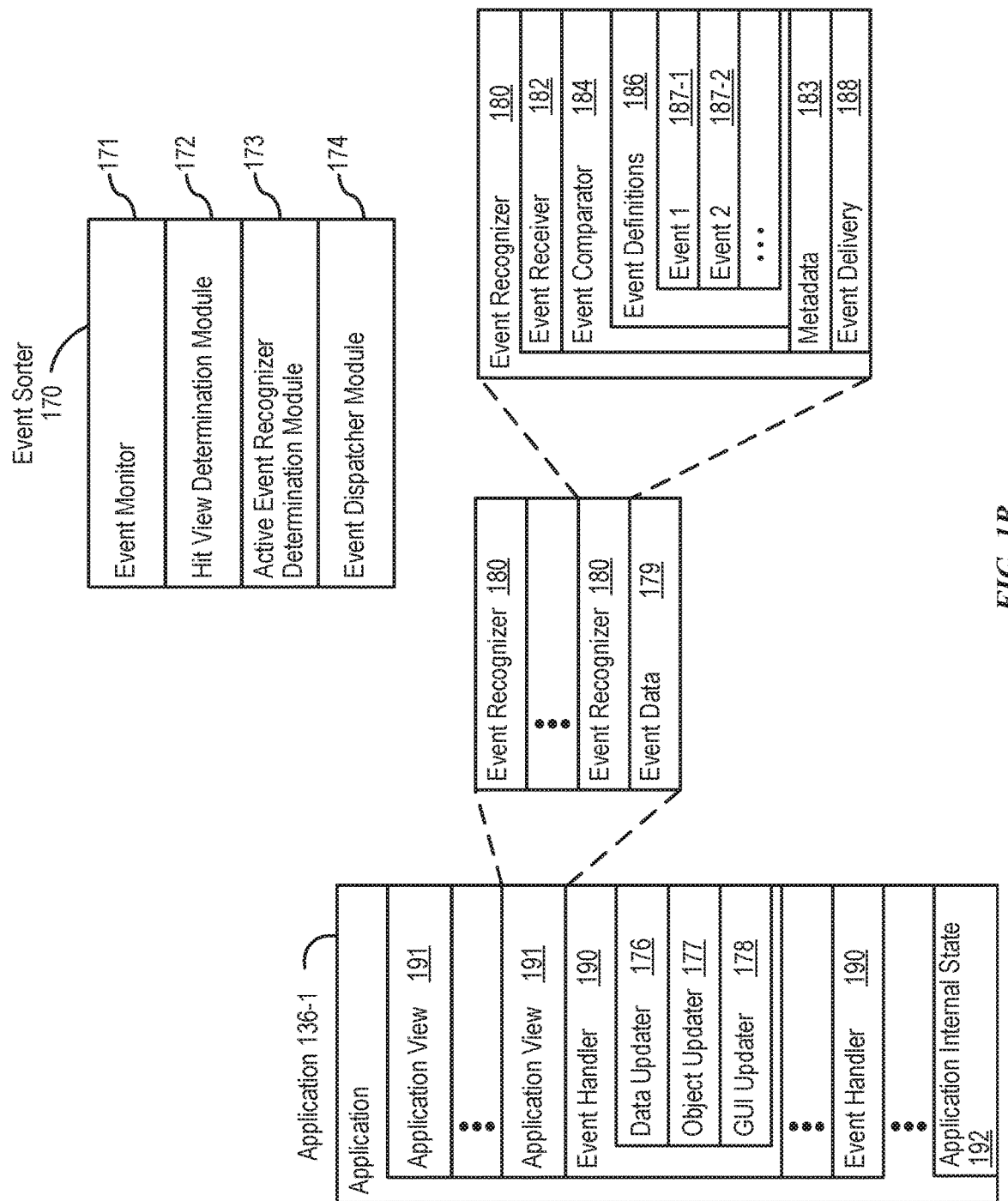
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
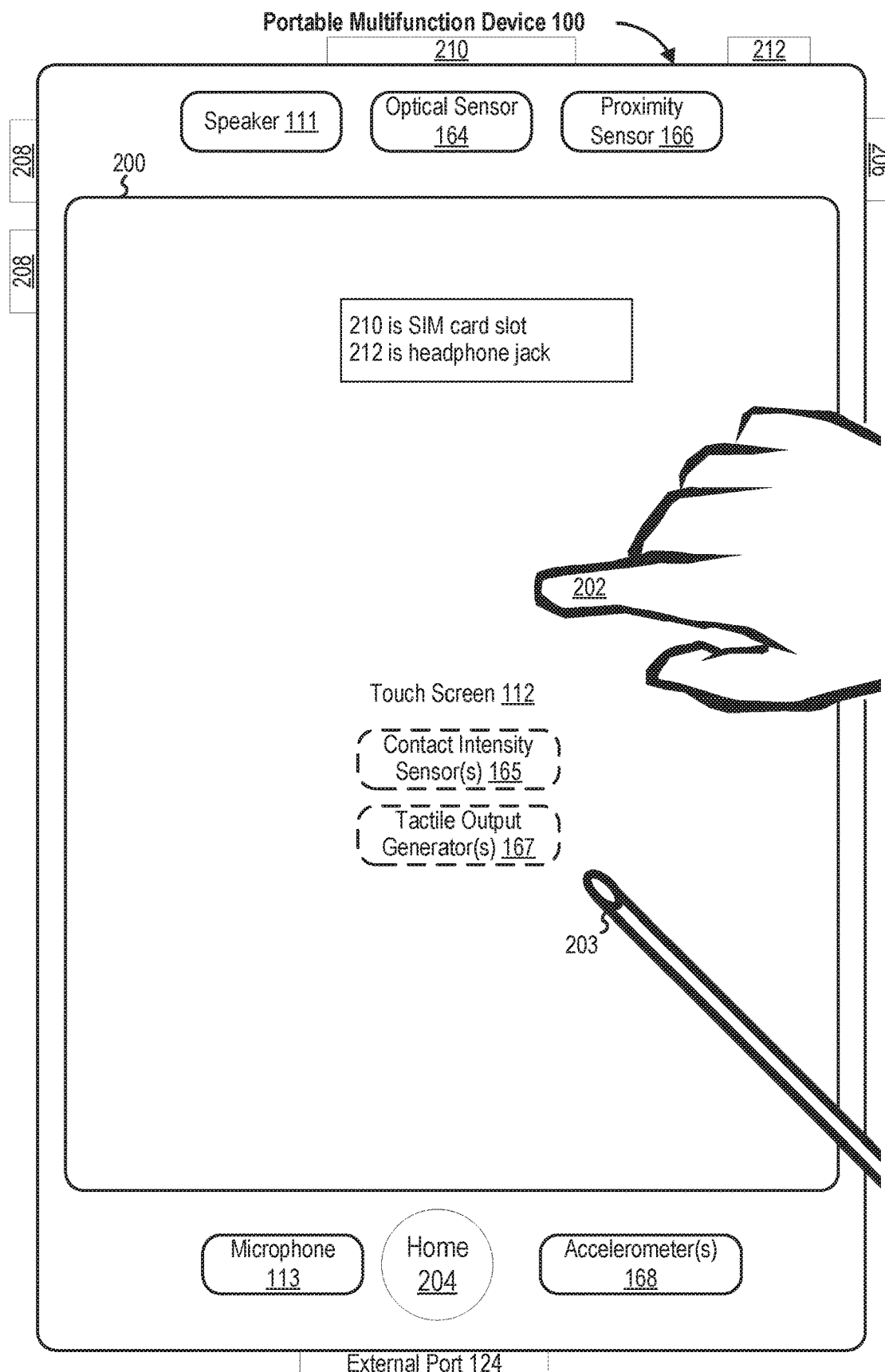
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
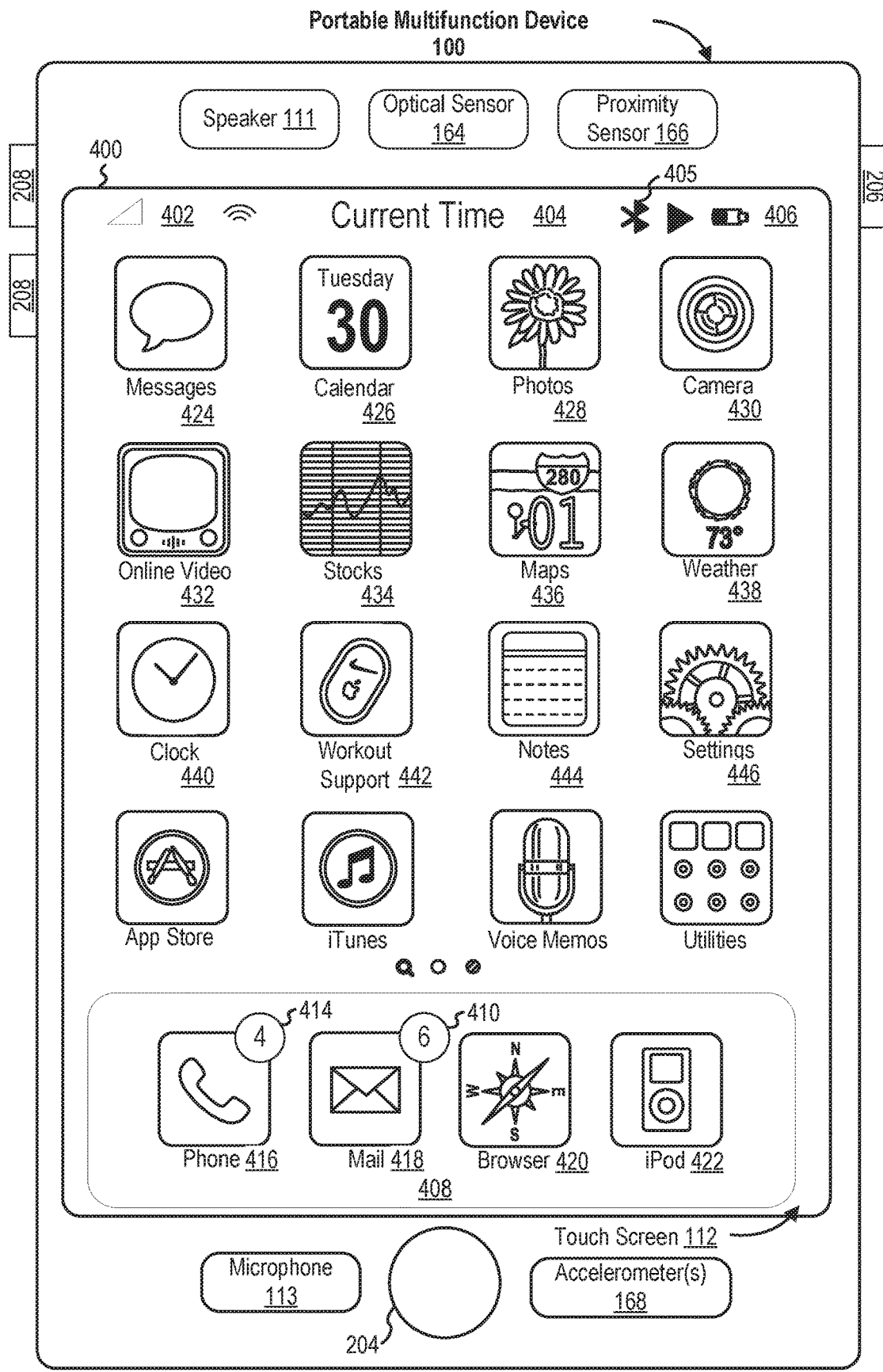
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
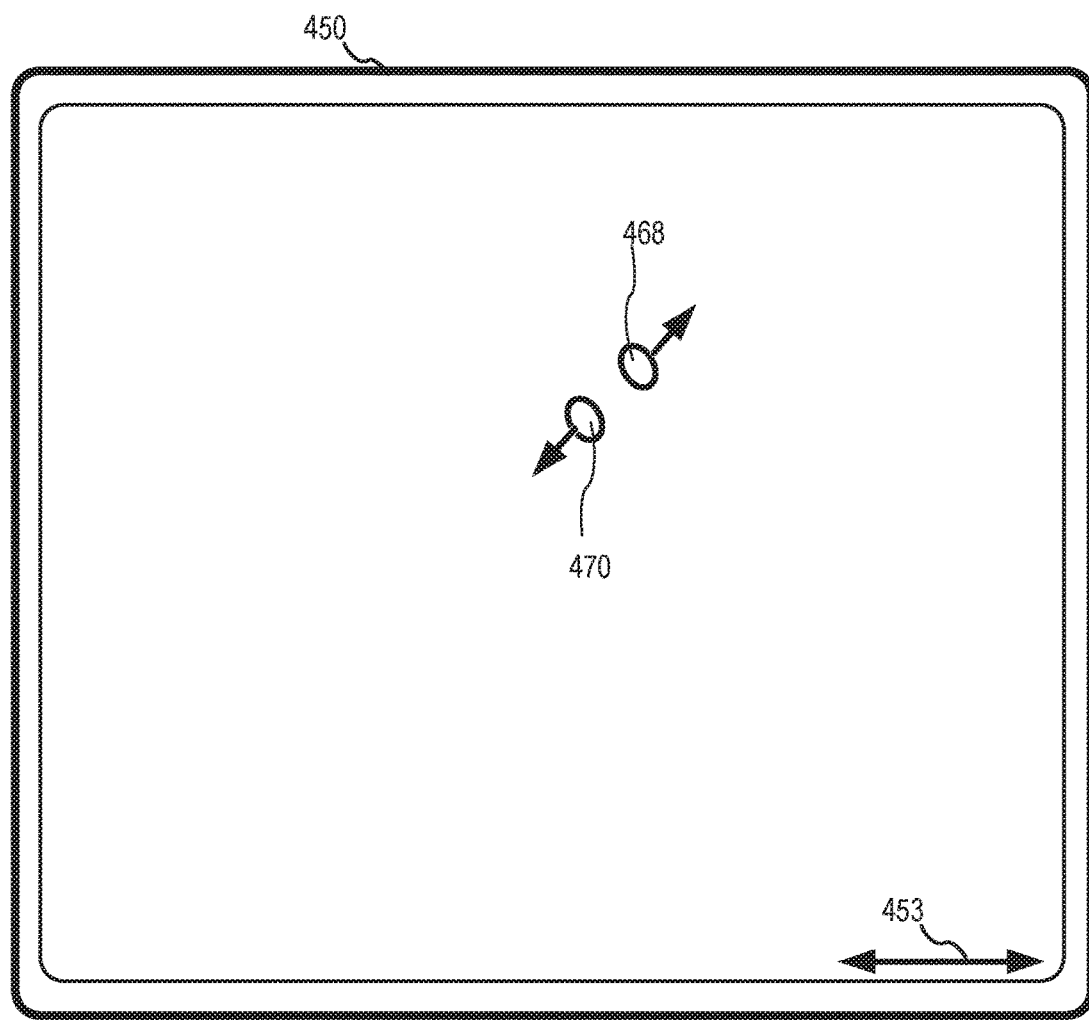
FIG. 4B illustrates an exemplary user interface for a multifunction device with a touch-sensitive surface that is separate from the display in accordance with some embodiments.
Figure 4B:
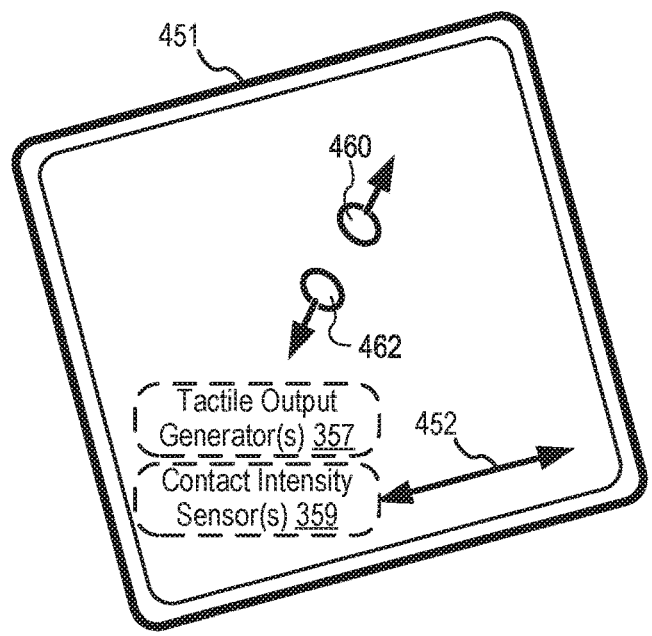

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
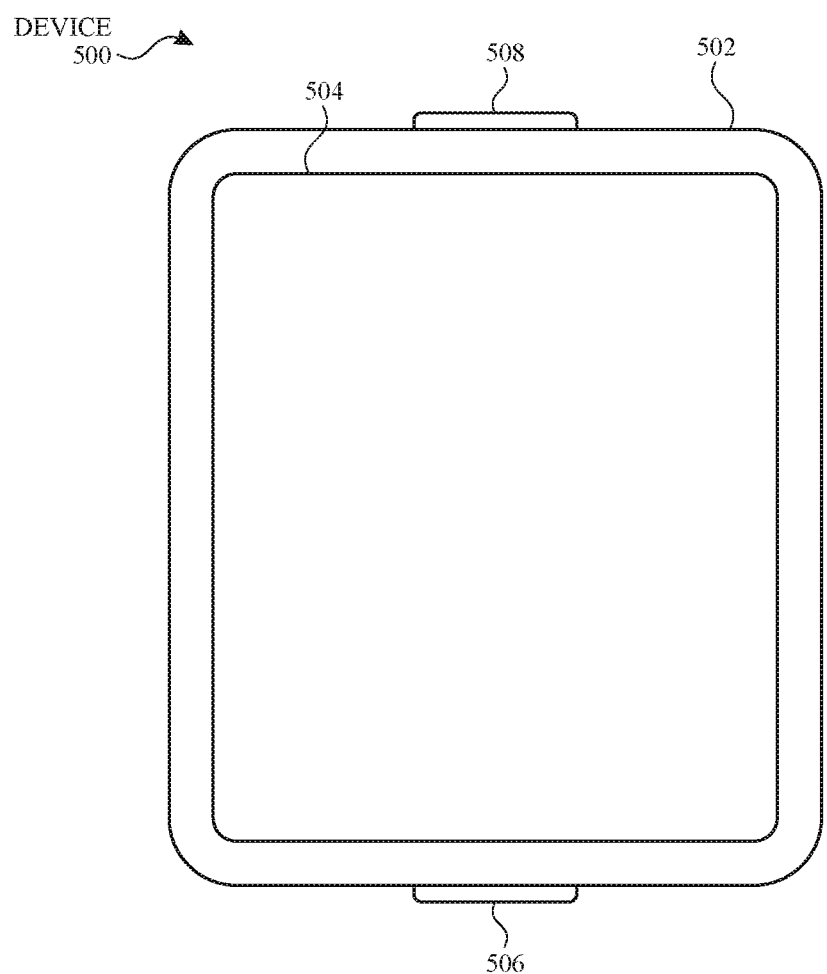
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
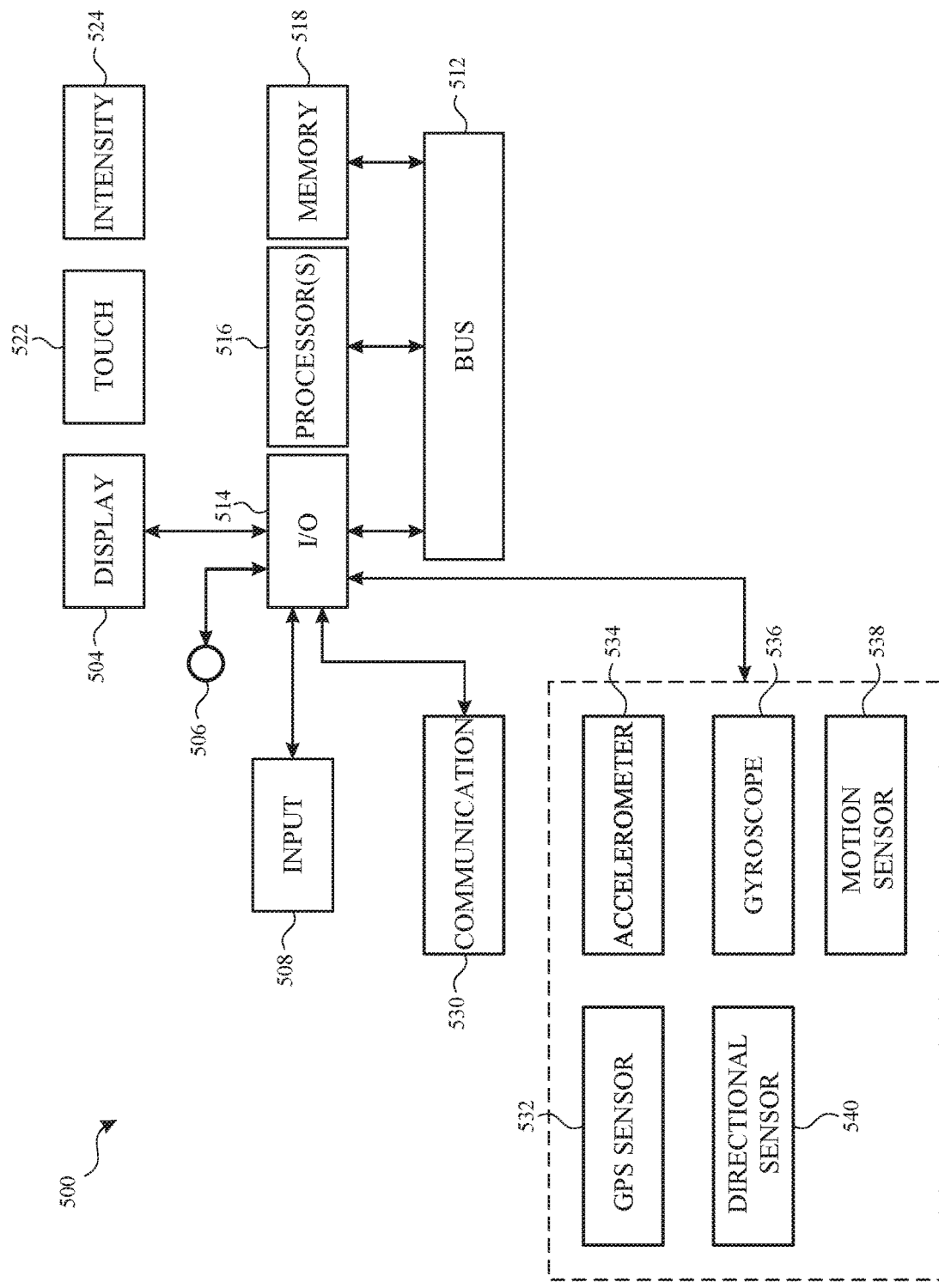
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including process 900 (FIG. 9). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UI") and associated processes that are implemented on an electronic device, such as portable multifunction device 100, device 300, or device 500.

FIGS. 6A-6W illustrate exemplary user interfaces for setting up an account for a service, in accordance with some embodiments. FIGS. 7A-7B illustrate exemplary user interfaces for managing contact information associated with the service, in accordance with some embodiments. FIGS. 8A-8G illustrate exemplary user interfaces for viewing and managing settings for the service, in accordance with some embodiments. The user interfaces in these figures are used to illustrate the processes described below, including the processes in FIG. 9.

FIG. 6A illustrates an electronic device 600a including a display device 602a (e.g., integrated with a touch-sensitive surface). In some embodiments, electronic device 600a includes one or more features of device 100, 300, or 500. Electronic device 600a is configured to display user interfaces provided by first-party services (e.g., applications, websites, or other services owned and/or operated by an entity affiliated with the electronic device) and user interfaces provided by third-party services (e.g., applications, websites, or other services owned and/or operated by a second entity not affiliated with the electronic device). As shown in FIG. 6A, electronic device 600a displays, via display device 602a, a user interface 604 for a third-party service (e.g., an application or website). User interface 604 is used for logging in to or setting up an account with the third-party service. User interface 604 includes login fields 606 for logging in to an account with the third-party service with a username and password created for the third-party service (e.g., a username and password that authenticates a user with the third-party service by transmitting the username and password to the third-party service). User interface 604 also includes an affordance 608 for setting up an account with the third-party service using a first-party authentication provider (e.g., "Login ID") without entering a username and password for the third-party service. Instead, the first-party authentication provider authenticates the user separately from the third-party service (e.g., by logging into an account with the first-party authentication provider and/or verifying the user's identity with biometric information known to the first-party authentication provider), and then the first-party authentication provider communicates with the third-party service to set up and log in to an account with the third-party service, without a user entering a username and password for the third-party service. In addition, the user can use the same authentication process (e.g., logging into the same account with the first-party provider and/or verifying the user's identity with biometric information known to the first-party authentication provider) with the first-party authentication provider to authenticate for a plurality of third-party services. In response to detecting an input 603 (e.g., a tap gesture) corresponding to affordance 608, a user interface for the first-party authentication provider (e.g., user interface 610 as shown in FIG. 6B or 6C) is displayed.

Figure 6B:
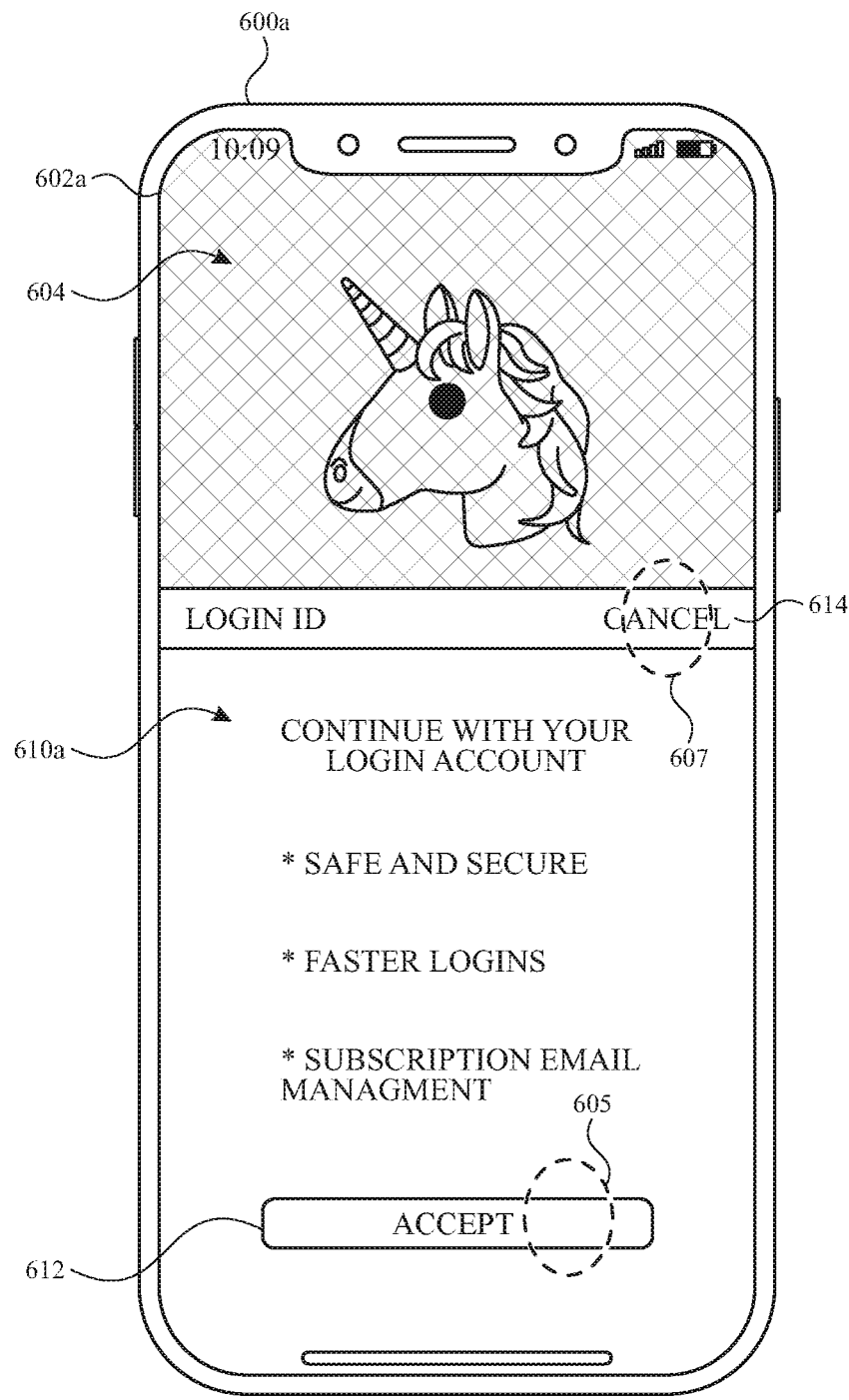

FIG. 6B illustrates user interface 610a for the first-party authentication provider including information describing the first-party authentication provider (e.g., "safe and secure", "faster logins", "subscription email management"). User interface 610a is displayed overlaying user interface 604 for the third-party service (e.g., a portion of user interface 604 continues to be displayed concurrently with user interface 610a). User interface 610a is displayed in response to detecting an input (e.g., input 603 shown in FIG. 6A) requesting the first-party authentication provider set up an account for the third-party service. In some embodiment, user interface 604 is a user interface of a first computer application and user interface 610 is a user interface of a second computer application different from the first computer application. In some embodiments, the first time the first-party authentication provider is used to set up an account for a third-party service, the information describing the first-party authentication provider is included in user interface 610a, as shown in FIG. 6B. In some embodiments, if an account has previously been set up for a third-party service using the first-party authentication provider, the information describing the first-party authentication provider is not included and instead user interface 610b as shown in FIG. 6C is displayed in response to detecting the input requesting the first-party authentication provider set up or log in to an account for the third-party service.

As shown in FIG. 6B, user interface 610a includes an accept affordance 612 and a cancel affordance 614. In response to detecting an input 605 corresponding to the accept affordance 612, the information describing the first-party authentication provider ceases to be displayed and user interface 610b as shown in FIG. 6C is displayed. In response to detecting an input 607 corresponding to the cancel affordance 614, user interface 610a ceases to be displayed and user interface 604 for the third-party service is displayed as shown in FIG. 6A (e.g., user interface 610*a* ceases to overlay user interface 604).

Figure 6C:
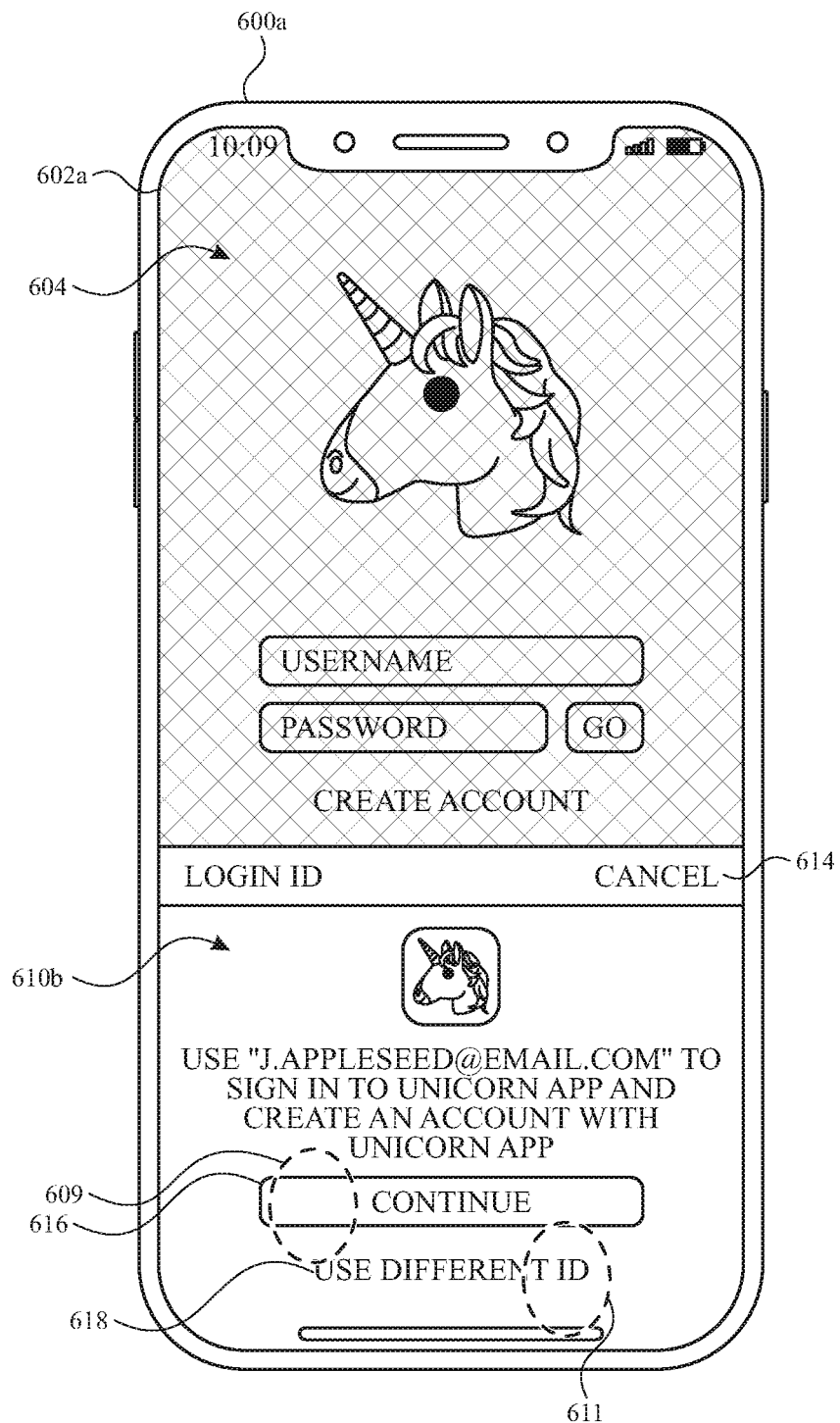

FIG. 6C illustrates user interface 610*b* for the first-party authentication provider, including indication of the account being used with the first-party authentication provider (e.g., "Use 'j.appleseed@email.com' to sign in to Unicorn App and create an account with Unicorn App"). In some embodiments, user interface 610*b* as shown in FIG. 6C is displayed in response to detecting an input (e.g., input 603 shown in FIG. 6A) requesting the first-party authentication provider set up or log in to an account for the third-party service. In some embodiments, user interface 610*b* is displayed after information describing the first-party authentication provider ceases to be displayed in response to detecting input 605 shown in FIG. 6B.

As shown in FIG. 6C, user interface 610*b* includes affordance 616 for continuing with the set up process with the indicated first-party authentication provider account. In some embodiments, user interface 610*b* further includes affordance 618 for changing to a different first-party authentication provider account. In response to detecting an input 609 (e.g., a tap input) corresponding to affordance 616, the electronic device 600*a* continues with the process for setting up an account for the third-party service using the first-party authentication provider. In some embodiments, in response to detecting input 609, the electronic device 600*a* authenticates that the user is an authorized user of the indicated first-party authentication provider account (e.g., the user is authorized to use the account at the first-party authentication provider associated with "j.appleseed@email.com"). In some embodiments, the electronic device 600*a* authenticates the user using facial recognition. In some embodiments, the electronic device 600*a* authenticates the user using fingerprint recognition. In some embodiments, the electronic device 600*a* authenticates the user by requesting a username and password (and optionally, a second authentication factor), and verifying the username and password corresponds to the indicated first-party authentication provider account. In some embodiments, (e.g., while using facial recognition or fingerprint recognition to authentication the user), device 600*a* remains logged in to the first-party authentication provider account. For example, device 600*a* is logged in to the first-party authentication provider account prior to starting the set up process and device 600*a* remains logged in to the first-party authentication provider account throughout the set up process.

Figure 6D:
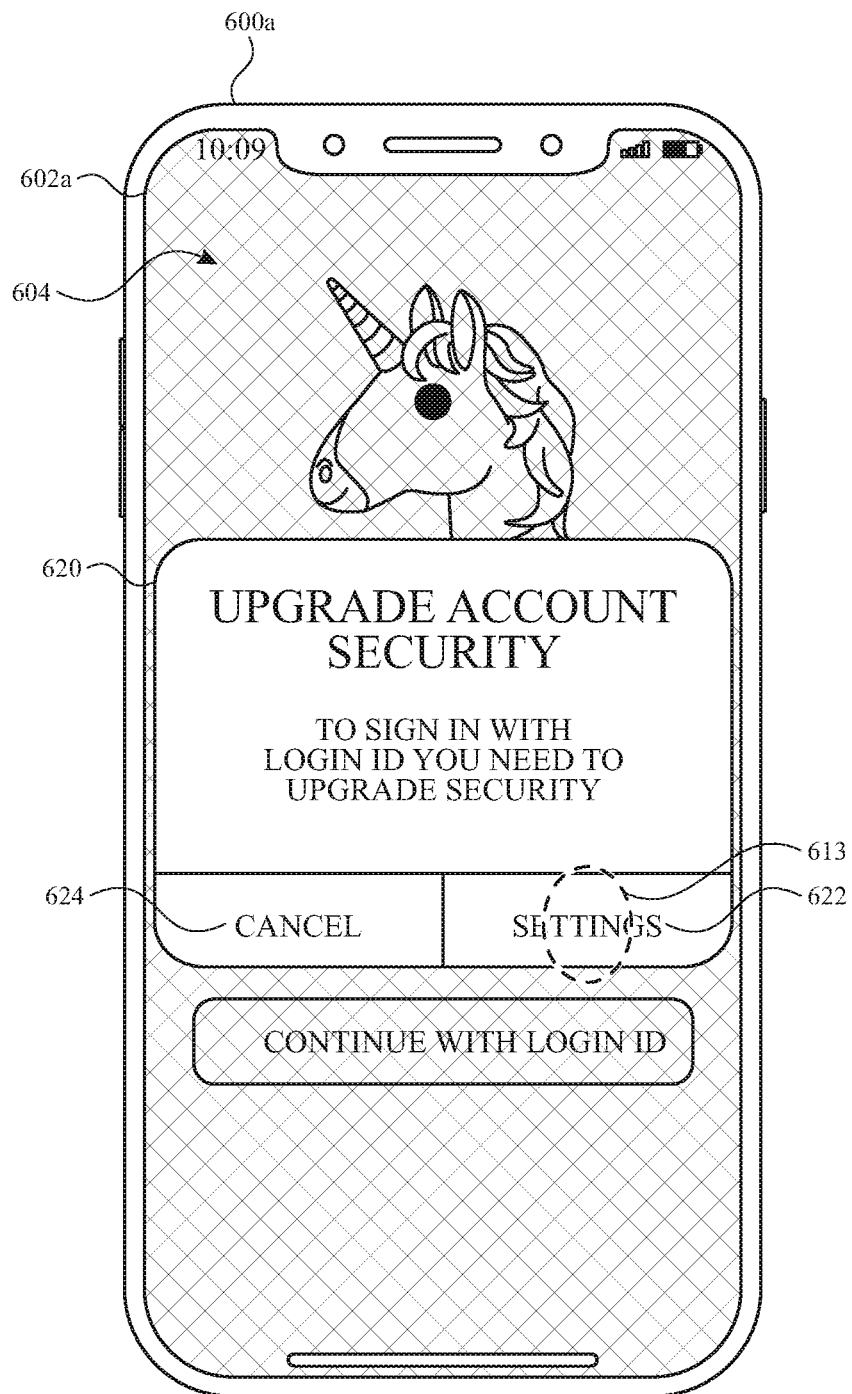

In some embodiments, in response to detecting input 609 (and optionally, after authenticating the user), security parameters associated with the indicated first-party authentication provider account are verified. If an issue with the security of the indicated first-party authentication provider account is detected (e.g., email address is not verified, password does not meet requirements, two factor authentication not enabled, terms and conditions not accepted), then a notification requesting that the user correct the security issue is displayed (e.g., notification 620 as shown in FIG. 6D). If no issues with the security of the indicated first-party authentication provider account are detected (and optionally, the user is authenticated), then the process for setting up an account for the third-party service using the first-party authentication provider continues.

In some embodiments, in response to detecting an input 611 (e.g., a tap input) corresponding to affordance 618, one or more interfaces for changing to a different first-party authentication provider account are displayed (e.g., a login interface for the first-party authentication provider). After the first-party authentication provider account has been changed, user interface 610*b* is displayed as shown in FIG. 6C, but includes an indication of the different account being used with the first-party authentication provider (e.g., a different email address is displayed).

FIG. 6D illustrates notification 620 requesting the user correct a security issue after an issue with the security of an indicated first-party authentication provider account is detected (e.g., email address is not verified, password does not meet requirements, two factor authentication not enabled, terms and conditions not accepted). In some embodiments, the security of the indicated first-party authentication provider account is verified in response to detecting input 609 shown in FIG. 6C (and optionally, after authenticating the user). Notification 620 includes a settings affordance 622 and a cancel affordance 624. In response to detecting an input (e.g., a tap input) corresponding to the cancel affordance 624, notification 620 ceases to be displayed and user interface 610 as shown in FIG. 6C is displayed. From user interface 610 shown in FIG. 6C, a different first-party authentication provider account can be accessed (e.g., an account without security issues), or the process for setting up an account for the third-party service using the first-party authentication provider can be canceled. In response to detecting an input 613 (e.g., a tap input) corresponding to the settings affordance, a security interface for correcting the security issue(s) is displayed (e.g., security interface 626 as shown in FIG. 6E).

Figure 6E:
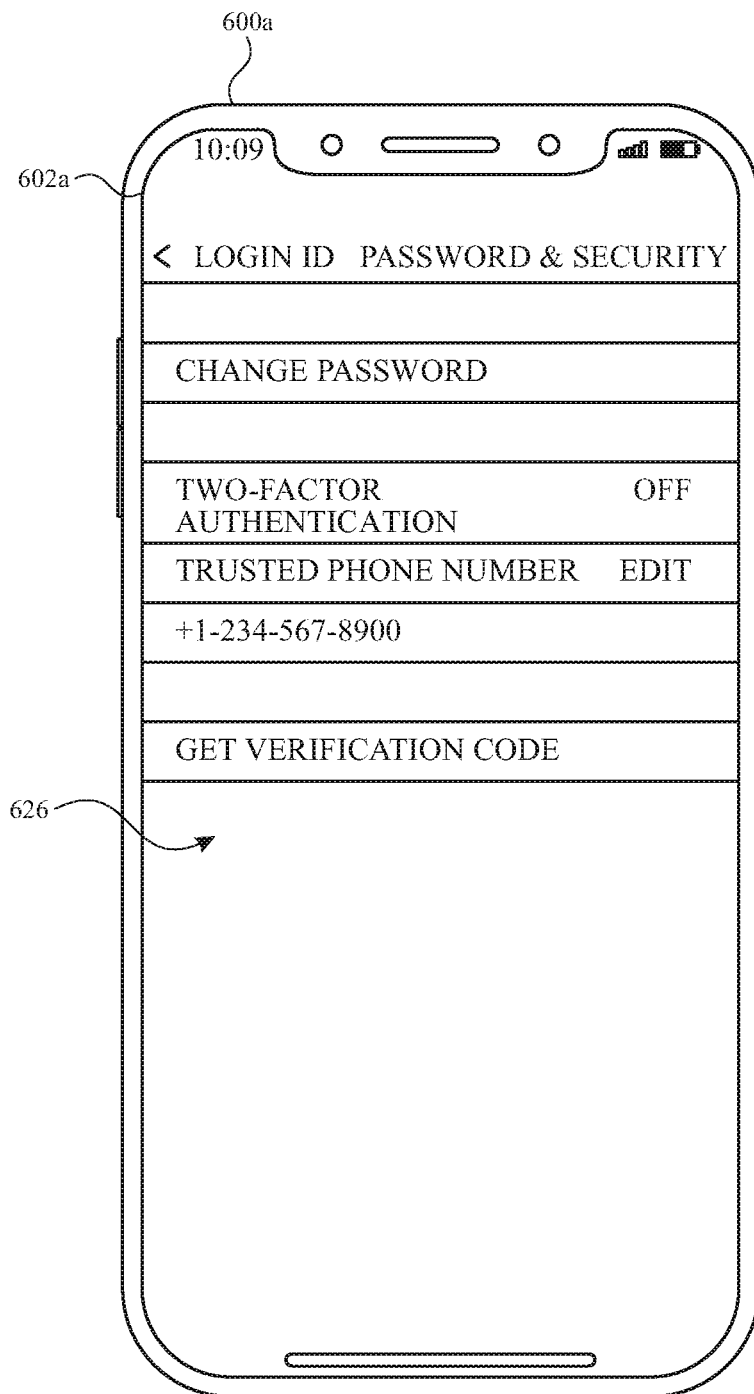

As shown in FIG. 6E, security interface 626 includes security settings associated with a first-party authentication provider account. In some embodiments, security interface 626 is displayed in response to an issue with the security of the indicated first-party authentication provider account being detected (e.g., email address is not verified, password does not meet requirements, two factor authentication not enabled, terms and conditions not accepted). From the security interface 626, the detected security issue(s) can be corrected by a user providing the necessary information and/or inputs for the detected security issue(s).

Figure 6F:
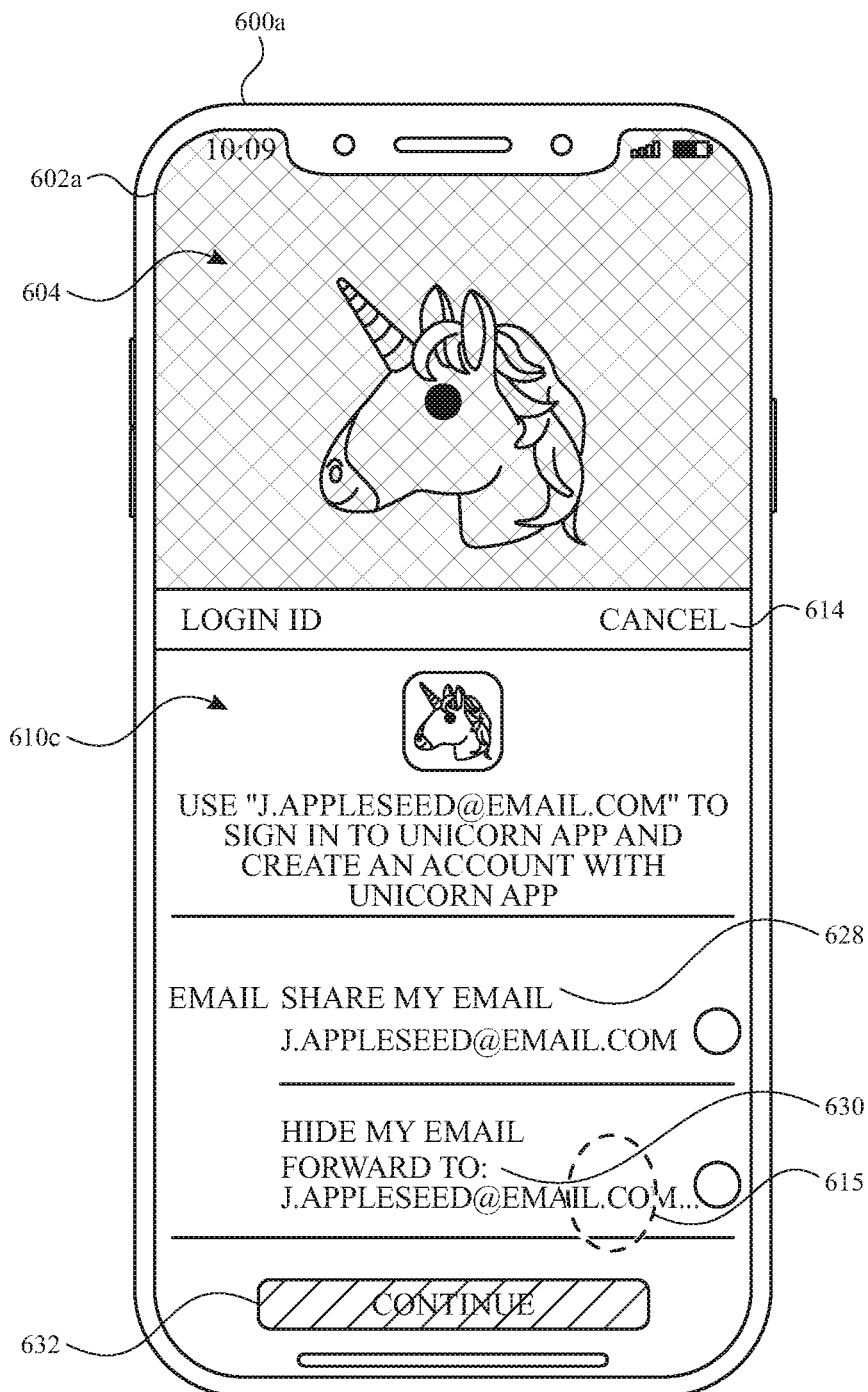

FIG. 6F illustrates user interface 610*c* for the first-party authentication provider including login options 628 and 630. In some embodiments, user interface 610*c* as shown in FIG. 6F is displayed in response to detecting an input (e.g., input 603 shown in FIG. 6A) requesting the first-party authentication provider set up or log in to an account for the third-party service. In some embodiments, user interface 610*c* is displayed after information describing the first-party authentication provider ceases to be displayed in response to detecting input 605 shown in FIG. 6B. In some embodiments, user interface 610*c* is displayed in response to detecting input 609 corresponding to the affordance 616 for continuing with the set up process with the indicated first-party authentication provider account, as shown in FIG. 6C. In some embodiments, user interface 610*c* is displayed instead of user interface 610*b* as shown in FIG. 6C in response to detecting a request for contact information (e.g., a user's email) from the third-party service.

As shown in FIG. 6F, user interface 610*c* includes login option 628 (e.g., a "share my email" option) and login option 630 (e.g., a "hide my email" option). User interface 610*c* further includes affordance 632 for continuing with the account set up process for the third-party service. When user interface 610*c* is initially displayed, neither login option 628 or 630 is selected. While neither login option 628 or 630 is selected, affordance 632 is disabled (e.g., an input on the affordance 632 will not continue the account set up process). In some embodiments, affordance 632 is displayed in a different manner to indicate that the affordance is disabled (e.g., displayed in a different color than when the affordance is enabled). If an input (e.g., a tap input) corresponding to login option 628 is detected, then an indication of the selection is displayed, and contact information for the user (e.g., the user's personal email address associated with the user's first-party authentication provider account) is transmitted to the third-party service as the account set up process continues. If an input (e.g., 615, a tap input) corresponding to login option 630 is detected, then an indication of the selection is displayed, and obfuscated contact information (e.g., a proxy email address that is automatically generated and does not reveal the user's personal email address) is transmitted to the third-party service as the account set up process continues.

Figure 6G:
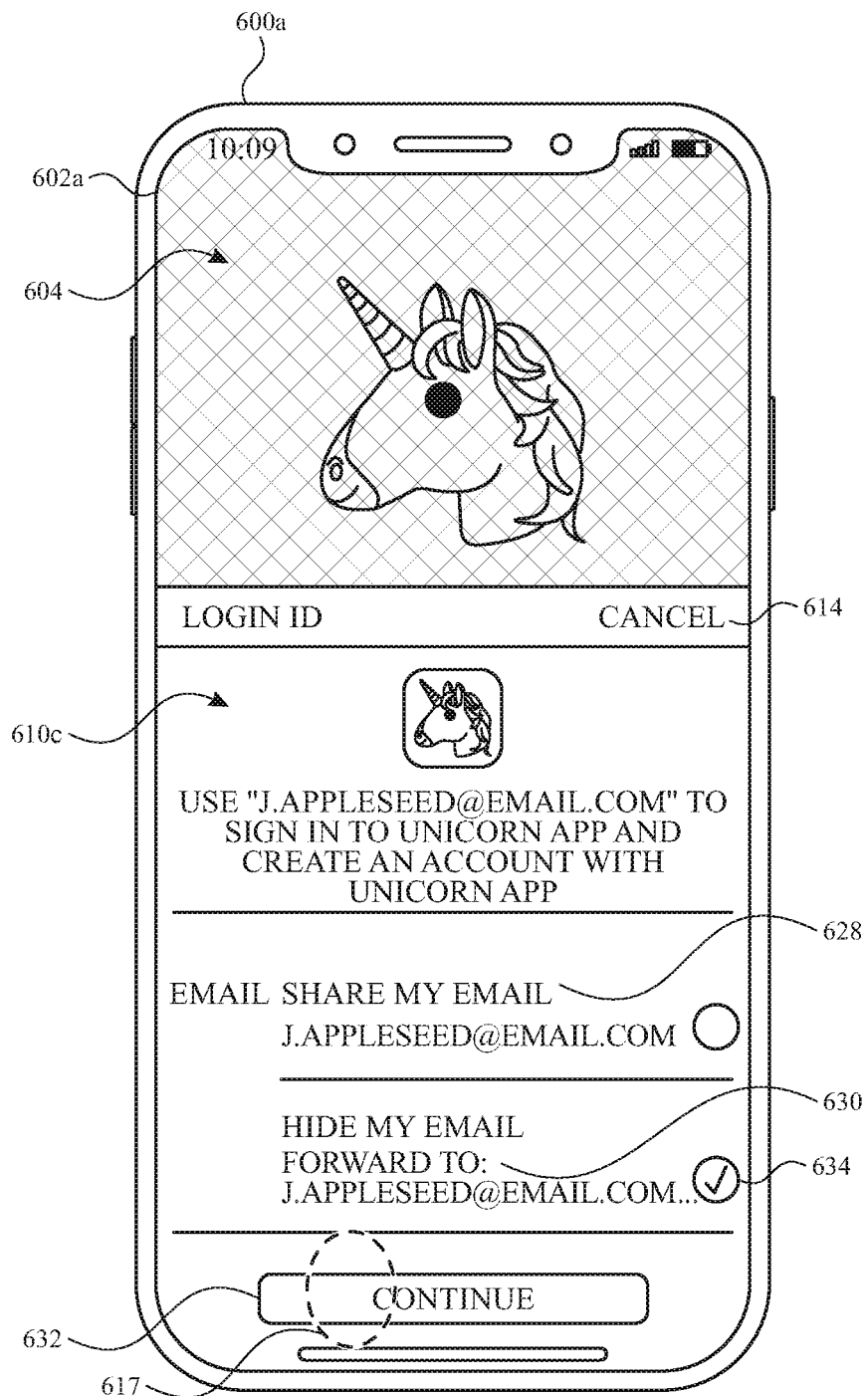

FIG. 6G illustrates user interface 610c after detecting input 615 (as shown in FIG. 6F) corresponding to login option 630. As shown in FIG. 6G, an indication 634 of the selected login option is displayed in response to detecting the input 615. In some embodiments, if the first-party authentication provider has previously been used to set up an account for a third-party service, one of the login options 628 or 630 is preselected based on which login option was selected during the previous set up process (e.g., user interface 610c as shown in FIG. 6F is not displayed). After a login option 628 or 630 is selected, affordance 632 is enabled (e.g., an input on the affordance 632 will continue the account set up process). In some embodiments, affordance 632 is displayed in a different manner to indicate the affordance is enabled (e.g., displayed in a different color than when the affordance is disabled). In response to detecting an input 617 (e.g., a tap input) corresponding to affordance 632, the electronic device 600a continues with the process for setting up an account for the third-party service using the contact information corresponding to the selected login option. In some embodiments, in response to detecting input 617, the electronic device 600a authenticates that the user is an authorized user of the indicated first-party authentication provider account (e.g., the user is authorized to use the account "j.appleseed@email.com"). In some embodiments, the electronic device 600a authenticates the user using facial recognition. In some embodiments, the electronic device 600a authenticates the user using fingerprint recognition. In some embodiments, the electronic device 600a authenticates the user by requesting a username and password (and optionally, a second authentication factor), and verifying the username and password corresponds to the indicated first-party authentication provider account.

Figure 6H:
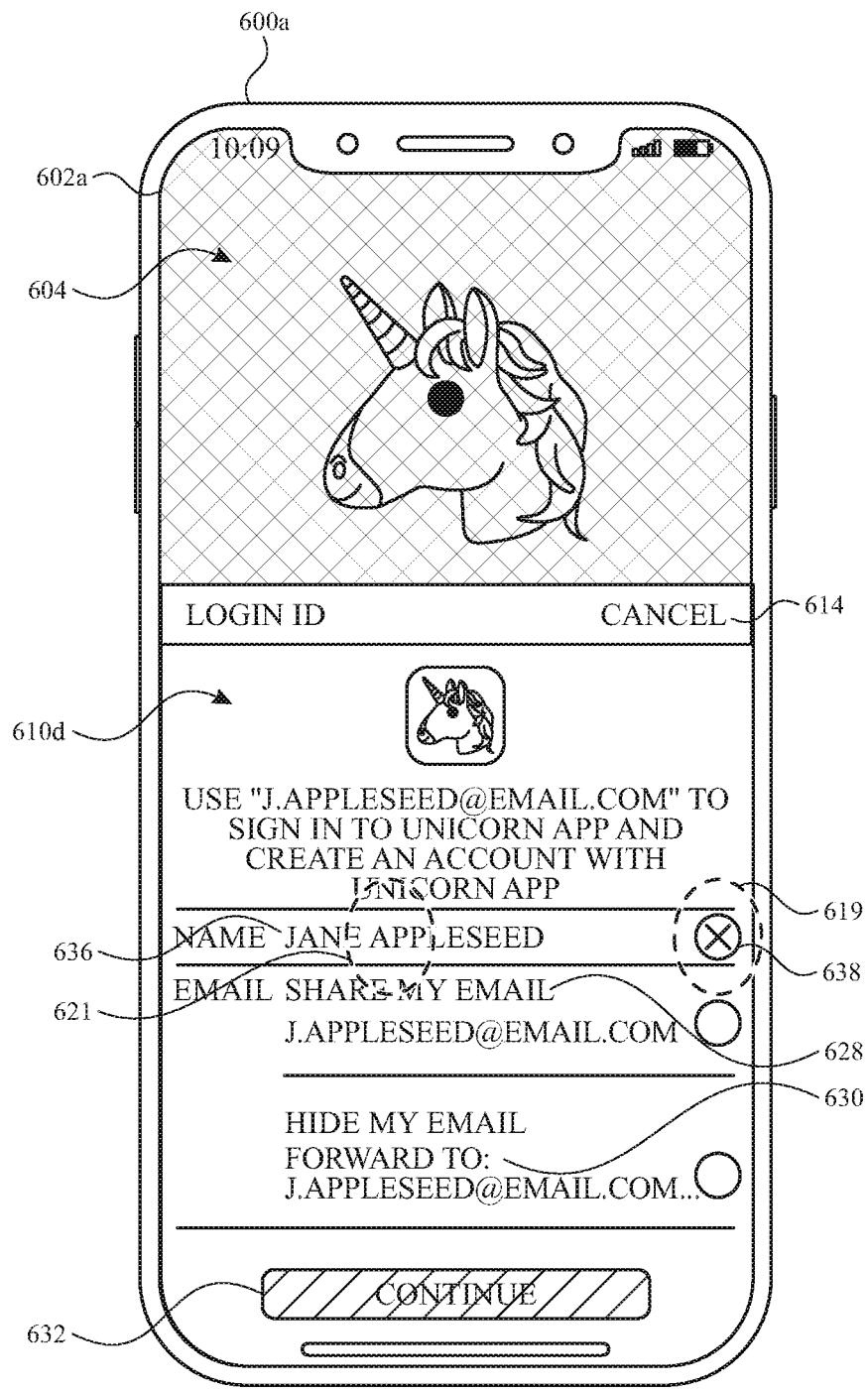

FIG. 6H illustrates user interface 610d for the first-party authentication provider including login options 628 and 630 and a name field 636. In some embodiments, user interface 610d as shown in FIG. 6H is displayed in response to detecting an input (e.g., input 603 shown in FIG. 6A) requesting the first-party authentication provider set up or log in to an account for the third-party service. In some embodiments, user interface 610d is displayed after information describing the first-party authentication provider ceases to be displayed in response to detecting input 605 shown in FIG. 6B. In some embodiments, user interface 610d is displayed in response to detecting input 609 corresponding to the affordance 616 for continuing with the set up process with the indicated first-party authentication provider account, as shown in FIG. 6C. In some embodiments, user interface 610d is displayed instead of user interfaces 610b or 610c as shown in FIGS. 6C and 6F in response to detecting a request for contact information (e.g., a user's email) and the user's name from the third-party service.

Figure 6I:
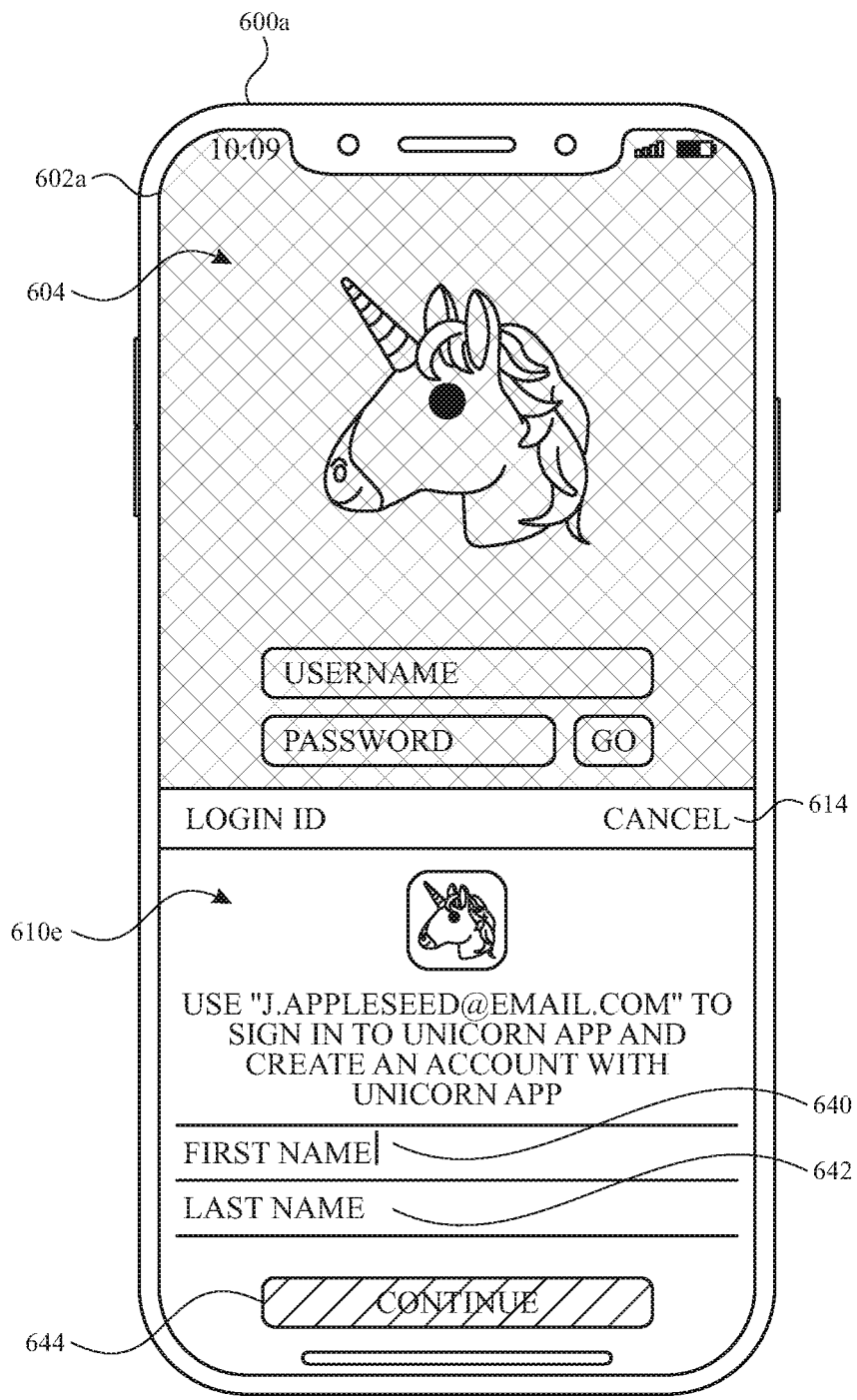
Figure 6J:
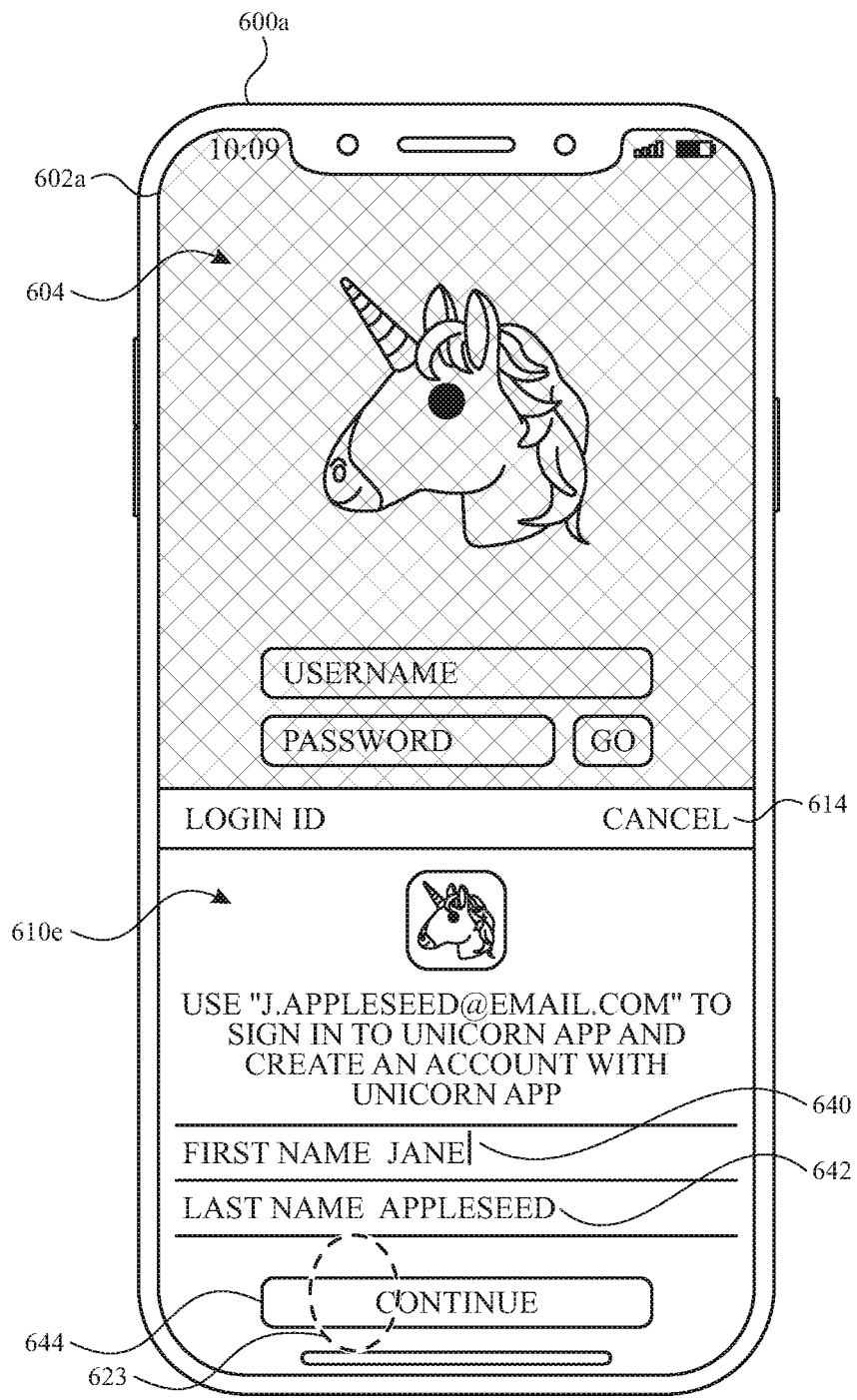

As shown in FIG. 6H, user interface 610d includes a name field 636 in addition to login option 628 (e.g., a "share my email" option) and login option 630 (e.g., a "hide my email" option). User interface 610d further includes clear affordance 638 for clearing the name for the account. When user interface 610d is initially displayed, the name field 636 includes a default name associated with the user's first-party authentication provider account (e.g., the user's name). If an input (e.g., a tap input) corresponding to the name field 636 (e.g., input 621) or the clear affordance 638 (e.g., input 619) is detected, then a user interface for editing the name is displayed (e.g., interface 610e as shown in FIGS. 6I and 6J). In some embodiments, in response to detecting input 621 corresponding to the name field 636, the default name is prepopulated in user interface 610e, as shown in FIG. 6J. In contrast, in some embodiments, in response to detecting input 619 corresponding to the clear affordance 638, the default name is cleared from user interface 610e, as shown in FIG. 6I.

FIG. 6I illustrates user interface 610e with the default name cleared from first name field 640 and last name field 642. In some embodiments, the default name is cleared from user interface 610e in response to detecting input 619 corresponding to the clear affordance 638 as shown in FIG. 6H. While no text is included in the first name field 640 and last name field 642, affordance 644 for continuing with the account set up process for the third-party service is disabled (e.g., an input on the affordance 644 will not continue the account set up process until text is entered in the first name field 640 and last name field 642). In some embodiments, affordance 644 is displayed in a different manner to indicate the affordance is disabled (e.g., displayed in a different color than when the affordance is enabled).

FIG. 6J illustrates user interface 610e with the default name prepopulated in the first name field 640 and last name field 642. In some embodiments, the default name is prepopulated in the first name field 640 and last name field 642 in response to detecting input 621 corresponding to the name field 636 as shown in FIG. 6H. Prepopulating the first name field 640 and last name field 642 with the default name allows the default name to be edited without re-entering the entire name. While text is included in the first name field 640 and last name field 642, affordance 644 for continuing with the account set up process for the third-party service is enabled (e.g., an input on the affordance 644 will continue the account set up process). In some embodiments, affordance 644 is displayed in a different manner to indicate the affordance is enabled (e.g., displayed in a different color than when the affordance is disabled). In response to detecting an input 623 corresponding to affordance 644, user interface 610e ceases to be displayed and user interface 610d as shown in FIG. 6H is displayed using the name as entered in the first name field 640 and last name field 642.

Figure 6K:
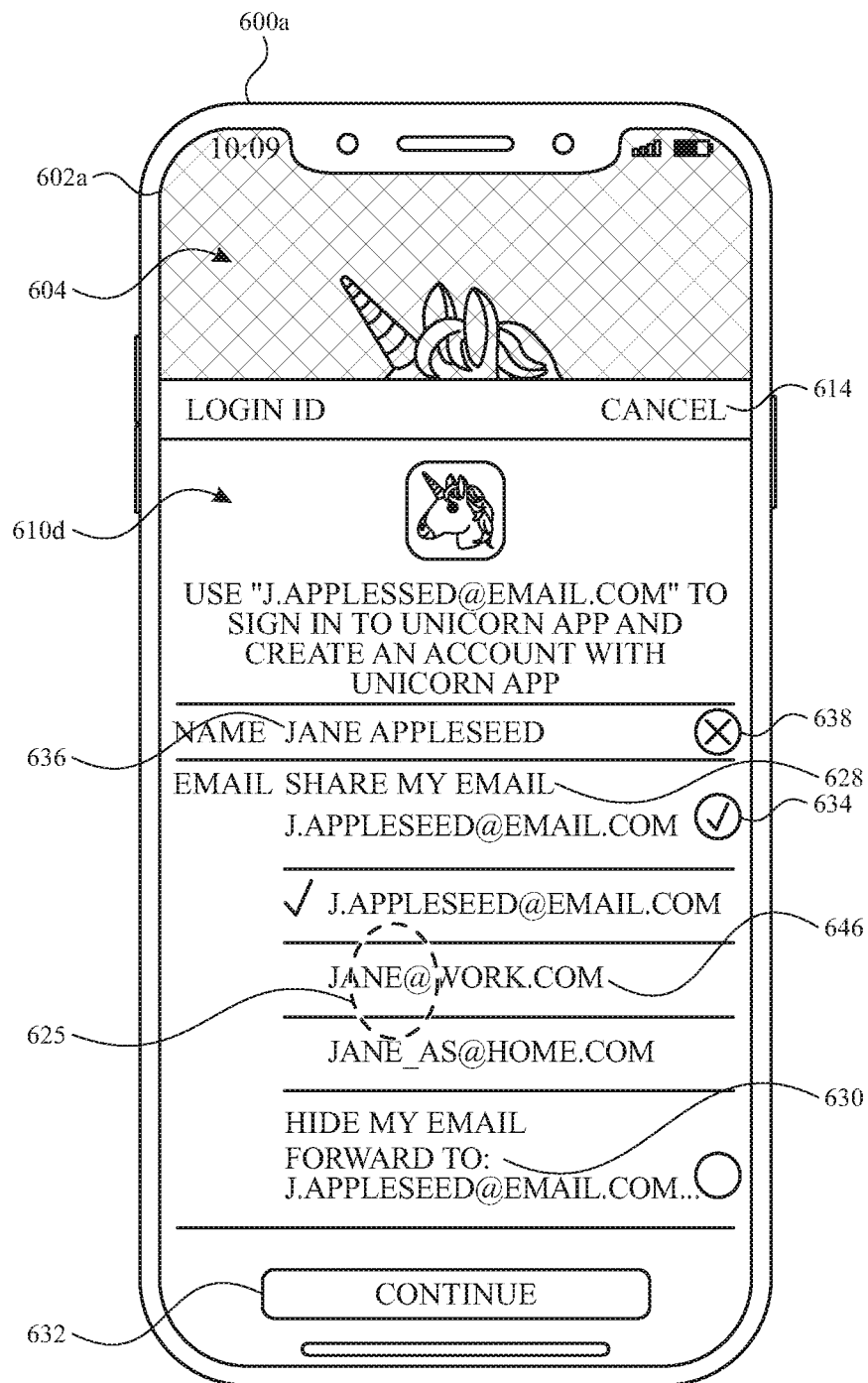

FIG. 6K illustrates user interface 610d after detecting an input corresponding to login option 628 (e.g., the "share my email" option). In some embodiments, as shown in FIG. 6K, if alternate email addresses 646 are known for the user, the alternate email addresses are displayed in response to detecting the input corresponding to login option 628 (e.g., the "share my email" option expands to list the alternate email addresses 646). In some embodiments, an indication (e.g., a checkmark) is displayed to indicate which email address is currently selected for login option 628. In response to an input 625 (e.g., a tap input) corresponding to an alternate email address 646, the email address that will be used for login option 628 is changed.

Figure 6L:
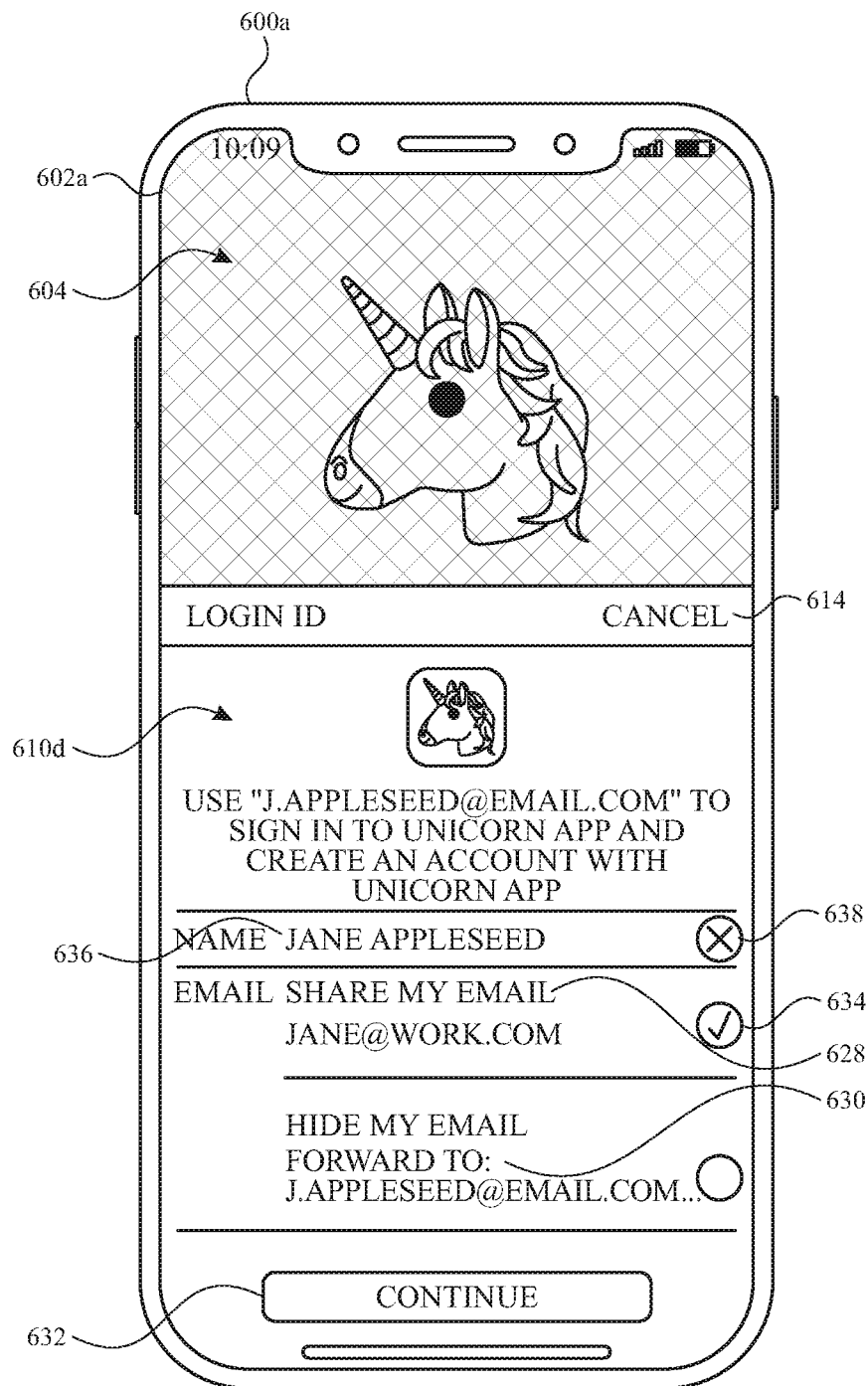

FIG. 6L illustrates user interface 610d after input 625 (shown in FIG. 6K) corresponding to an alternate email address is detected. As shown in FIG. 6L, the email address associated with login option 628 is changed to correspond to the alternate email address selected by input 625. After login option 628 is selected and in response to detecting an input corresponding to affordance 632, the electronic device 600a continues with the process for setting up an account for the third-party service using the contact information corresponding to the login option 628 (e.g., the alternate email address).

Figure 6M:
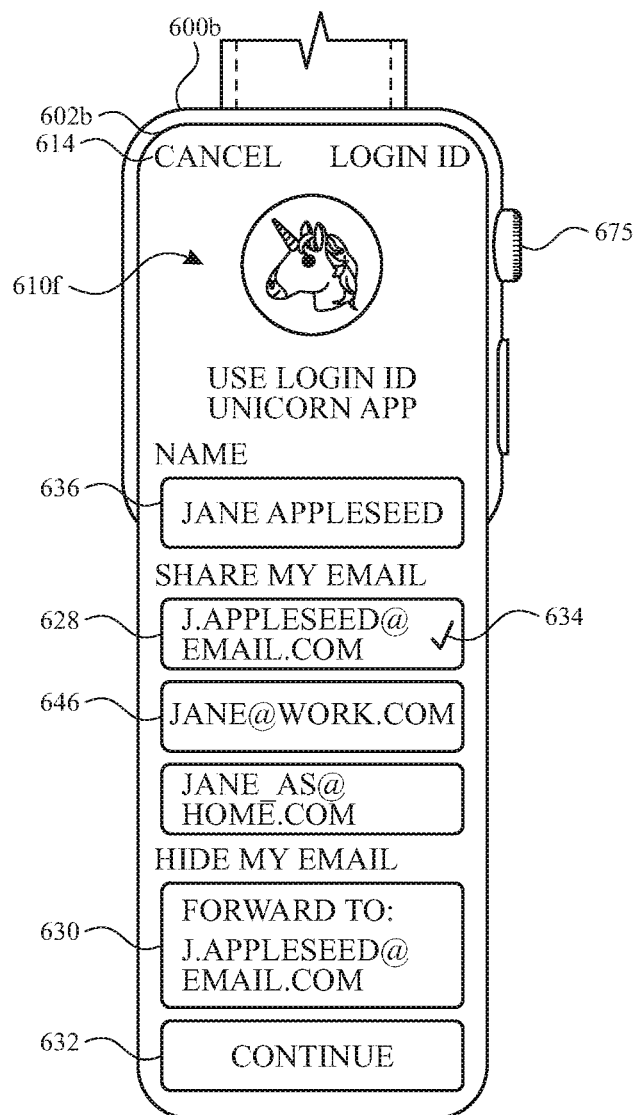

FIG. 6M illustrates electronic device 600b (e.g., a watch) including a display device 602b (e.g., integrated with a touch-sensitive surface). In some embodiments, electronic device 600b includes one or more features of device 100, 300, or 500. Electronic device 600b displays, via display device 602b, user interface 610f. User interface 610f allows a user to set up an account for a third-party service using a first-party authentication provider as described in reference to FIGS. 6A-6L. In some embodiments, user interface 610f includes versions of user interfaces 610a-610e shown in FIGS. 6A-6L modified to be displayed via a small format display device, such as display device 602b. For example, the user interfaces 610a-610e are modified to be scrollable using a rotatable input device 675, and include elements selectable using rotatable input device 675, but otherwise provide the same functionality as described in reference to FIGS. 6A-6L.

Figure 6N:
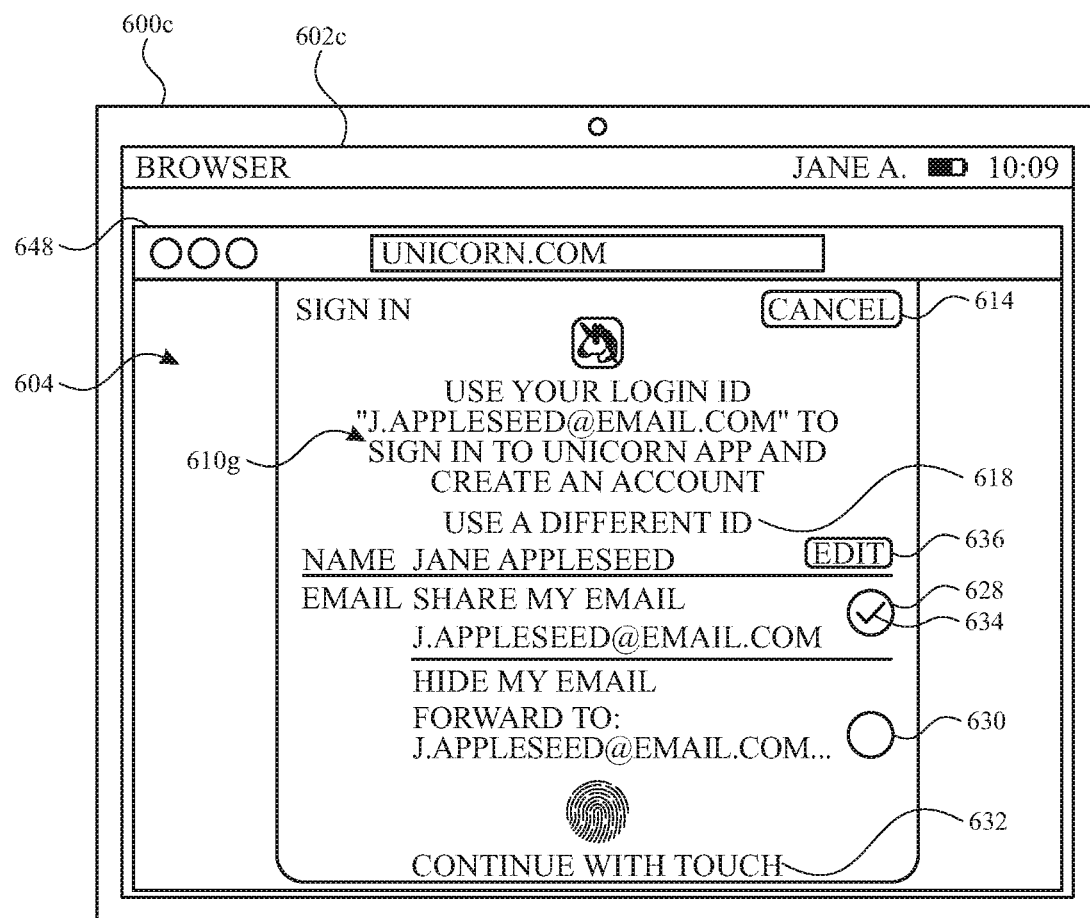

FIG. 6N illustrates electronic device 600c (e.g., a laptop) including a display device 602c. In some embodiments, electronic device 600c includes one or more features of device 100, 300, or 500. Electronic device 600c displays, via display device 602c, user interface 610g overlaying user interface 604 for a third-party service (e.g., a website). As shown in FIG. 6N, user interface 604 is displayed in a first-party web browser 648 (e.g., a web browser owned and/or operated by the same entity as the authentication provider), and user interface 610g is an interface native to the web browser that overlays user interface 604 in the web browser. User interface 610g allows a user to set up an account for the third-party service (e.g., website corresponding to user interface 604) using the first-party authentication provider as described in reference to FIGS. 6A-6L. In some embodiments, user interface 610g includes versions of user interfaces 610a-610e shown in FIGS. 6A-6L modified to be displayed as a native interface of the web browser. For example, the user interfaces 610a-610e are modified to include elements selectable with a mouse and/or keyboard, but otherwise provide the same functionality as described in reference to FIGS. 6A-6L. In some embodiments, affordance 632 for continuing with the process for setting up an account for the third-party service using the first-party authentication provider is activated in response to detecting an authorized fingerprint with a fingerprint sensor.

Figure 6O:
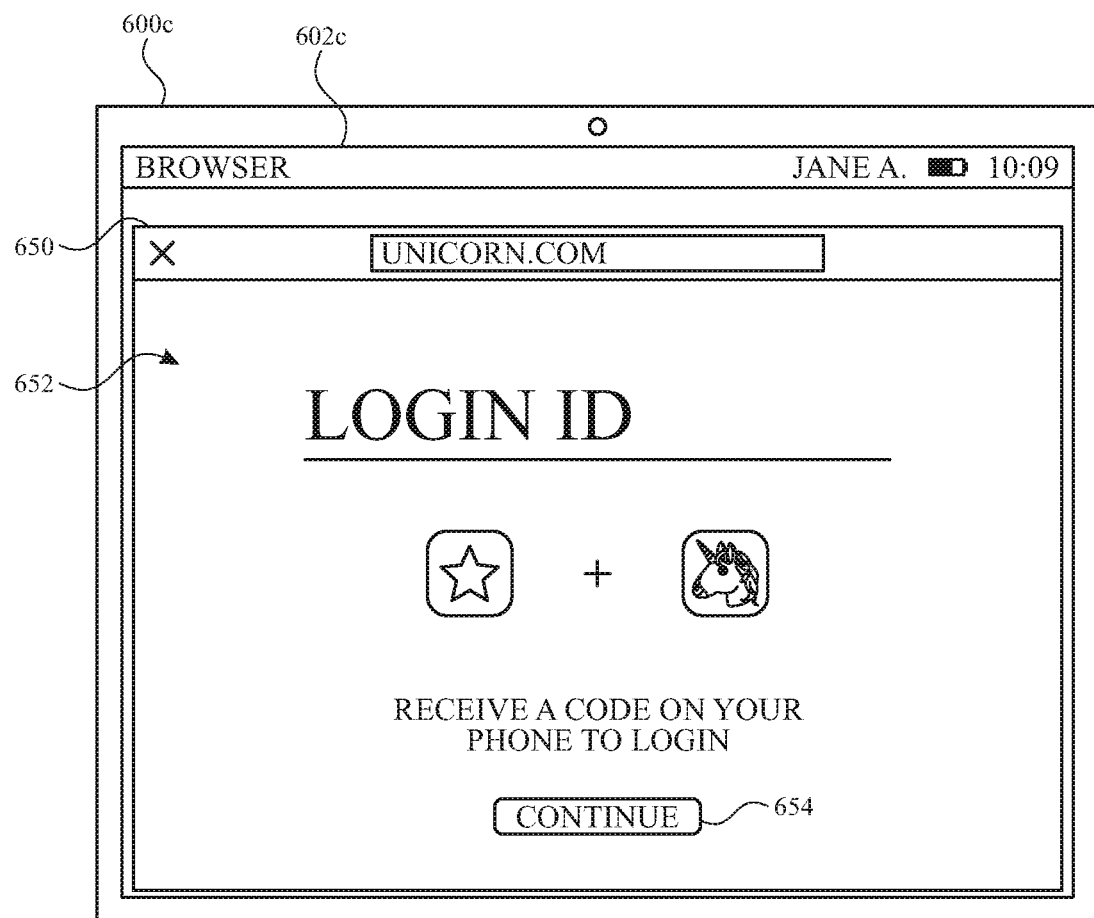

FIG. 6O illustrates electronic device 600c displaying, via display device 602c, user interface 652 in a third-party web browser 650 (e.g., a web browser provided by, owned, and/or operated by a different entity from the authentication provider). User interface 652 is displayed in response to detecting a request to use the authentication provider to set up an account for a service (e.g., a website). In some embodiments, prior to displaying user interface 652, one or more login pages for the authentication provider are displayed, and in response to detecting an authorized login to an account with the authentication provider, user interface 652 is displayed. User interface 652 includes an affordance 654 for continuing with the process for setting up an account for the service using the authentication provider. In response to detecting an input (e.g., a tap input, selection with a cursor) corresponding to affordance 654, a verification code is transmitted to a device associated with the authentication provider account.

Figure 6P:
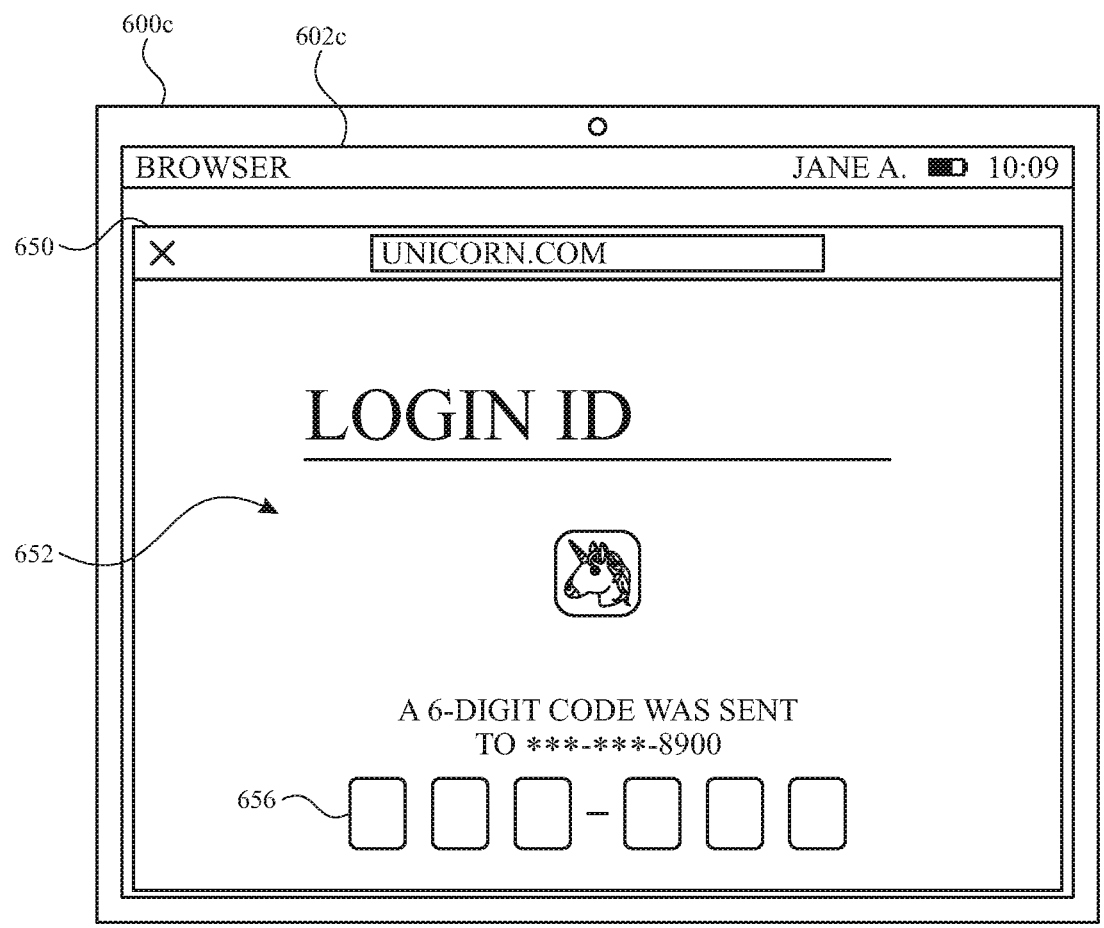

FIG. 6P illustrates user interface 652 after the input corresponding to affordance 654 (shown in FIG. 6O) is detected. As shown in FIG. 6P, user interface 652 includes a field 656 for entering the verification code that was transmitted to the device associated with the authentication provider account. If the verification code authorizes the user, then user interface 652 ceases to be displayed, and the process for setting up an account for the service using the authentication provider continues as described in reference to FIGS. 6A-6L.

Figure 6Q:
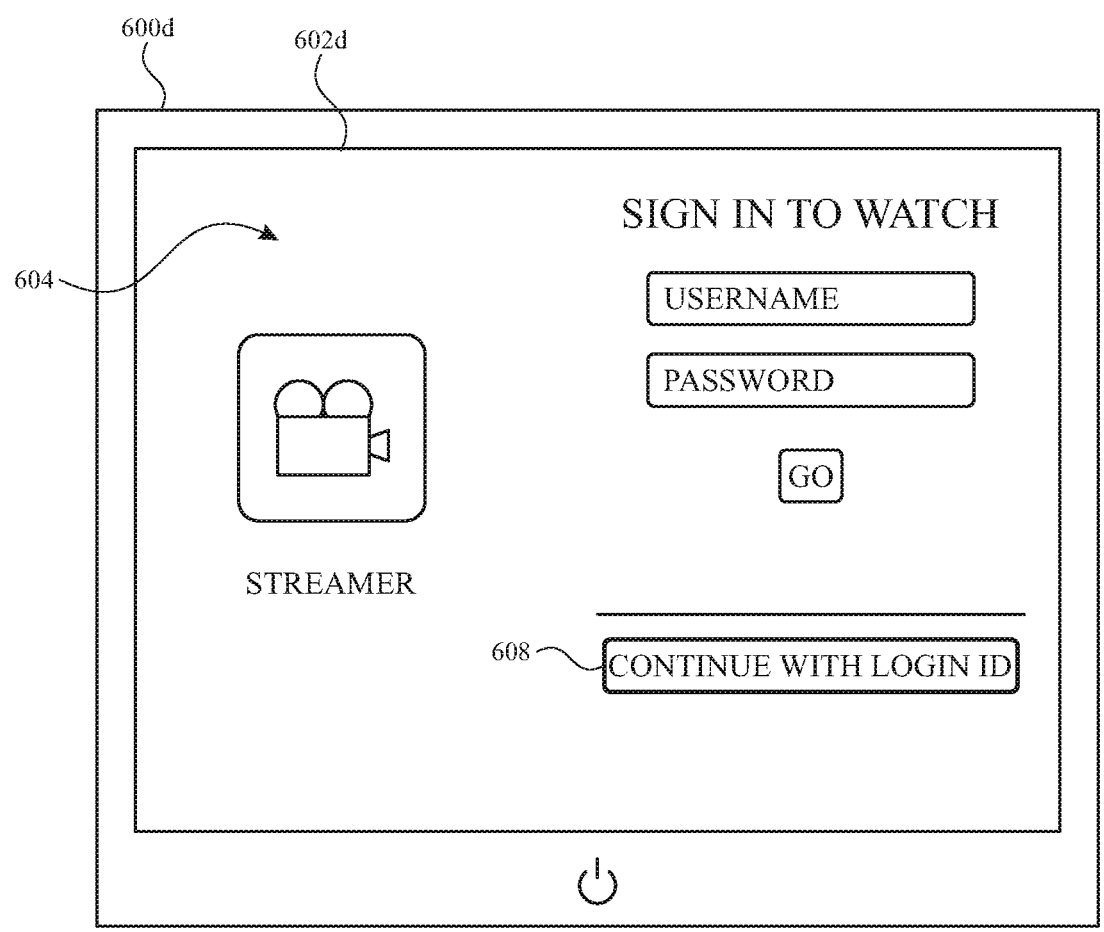

FIG. 6Q illustrates electronic device 600d (e.g., a television) displaying, via display device 602d, user interface 604 for a third-party service (e.g., an interface for a video streaming application). User interface 652 is displayed in response to detecting a request to use the authentication provider to set up an account for a service (e.g., a website). User interface 604 includes affordance 608 for setting up an account with the third-party service using an authentication provider (e.g., "Login ID") without entering a username and password for the third-party service. Instead of displaying user interfaces for setting up the account with the third-party service using the authentication provider on display device 602d, the user interfaces are displayed on a separate device associated with a user's authentication provider account (e.g., electronic device 600a). The process for setting up the account with the third-party service using the authentication provider is initiated on a separate device in response to detecting an input (e.g., selection with a remote) corresponding to affordance 608.

Figure 6R:
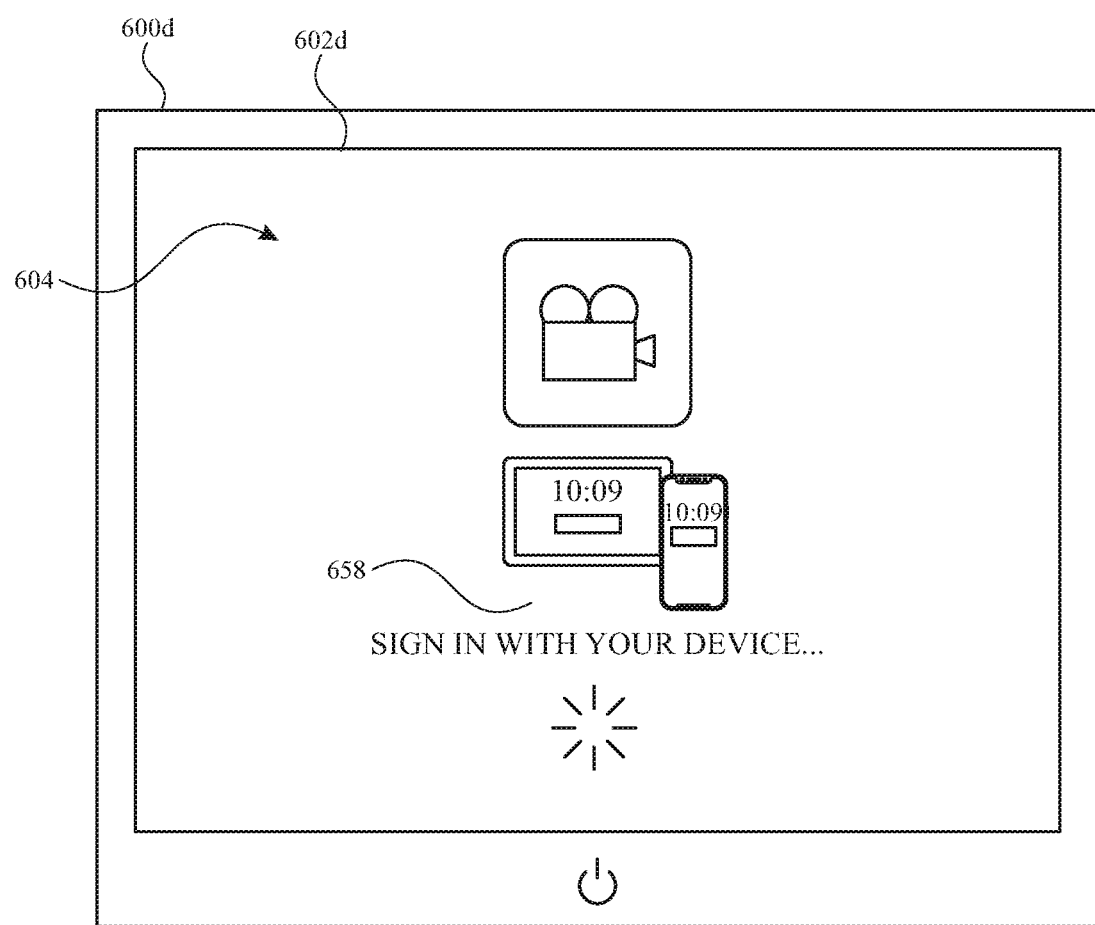

FIG. 6R illustrates user interface 604 after the process for setting up the account with the third-party service using the authentication provider has been initiated on a separate device (e.g., electronic device 600a). As shown in FIG. 6R, user interface 604 includes a notification 658 to use the separate device (e.g., electronic device 600a) to continue with the process for setting up the account with the third-party service using the authentication provider.

Figure 6S:
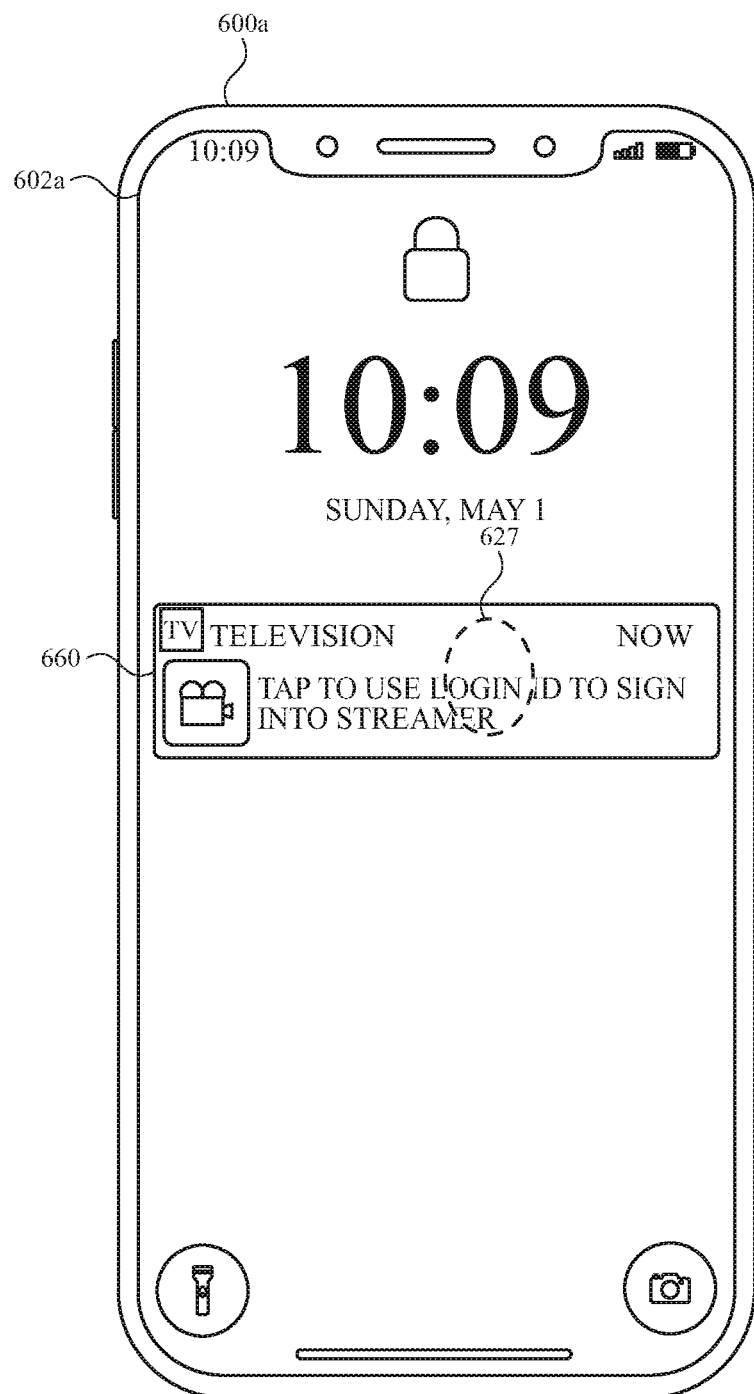

FIG. 6S illustrates electronic device 600a displaying, via display device 602a, a notification 660 that a request has been received from a separate device (e.g., electronic device 600d) to set up an account with a third-party service using an authentication provider. In response to detecting an input 627 (e.g., a tap input) corresponding to the notification 660, the electronic device displays user interface 610h (as shown in FIG. 6T) for continuing the process of setting up the account with the third-party service using the authentication provider on the separate device.

Figure 6T:
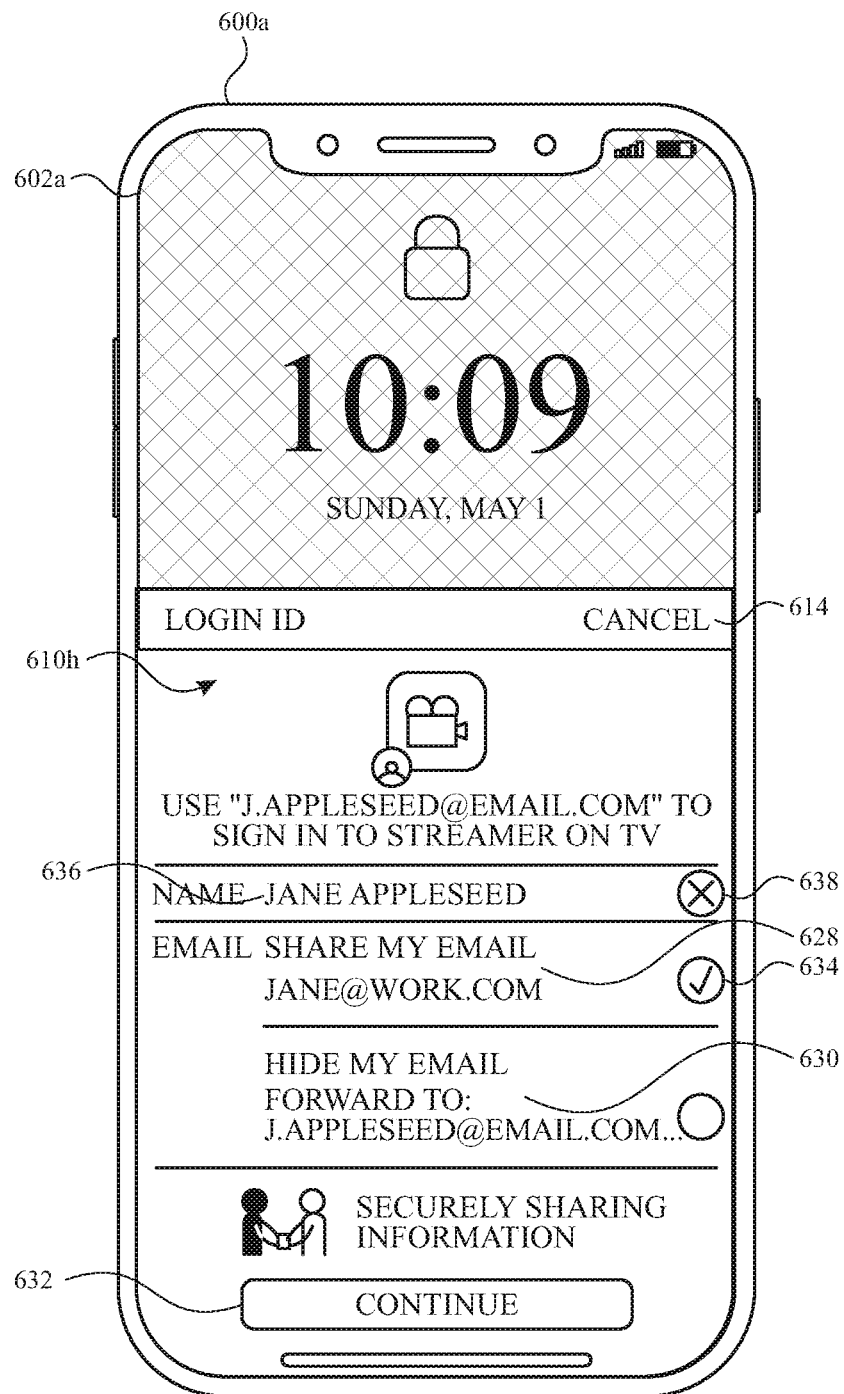

FIG. 6T illustrates user interface 610h for the authentication provider including indication of the separate device (e.g., electronic device 600d) that is requesting the authentication provider be used to set up an account for a service on the separate device (e.g., "Use 'j.appleseed@email.com' to sign in to Streamer on TV"). In some embodiments, user interface 610h as shown in FIG. 6T is displayed in response to detecting input 627 (shown in FIG. 6S) on a notification displayed in response to receiving the request from the separate device. User interface 610h allows a user to set up an account for the service on the separate device (e.g., video streaming application) using the authentication provider as described in reference to FIGS. 6A-6L. In some embodiments, user interface 610h includes the same elements and provides the same functionality as user interfaces 610a-610e described in reference to FIGS. 6A-6L.

Figure 6U:
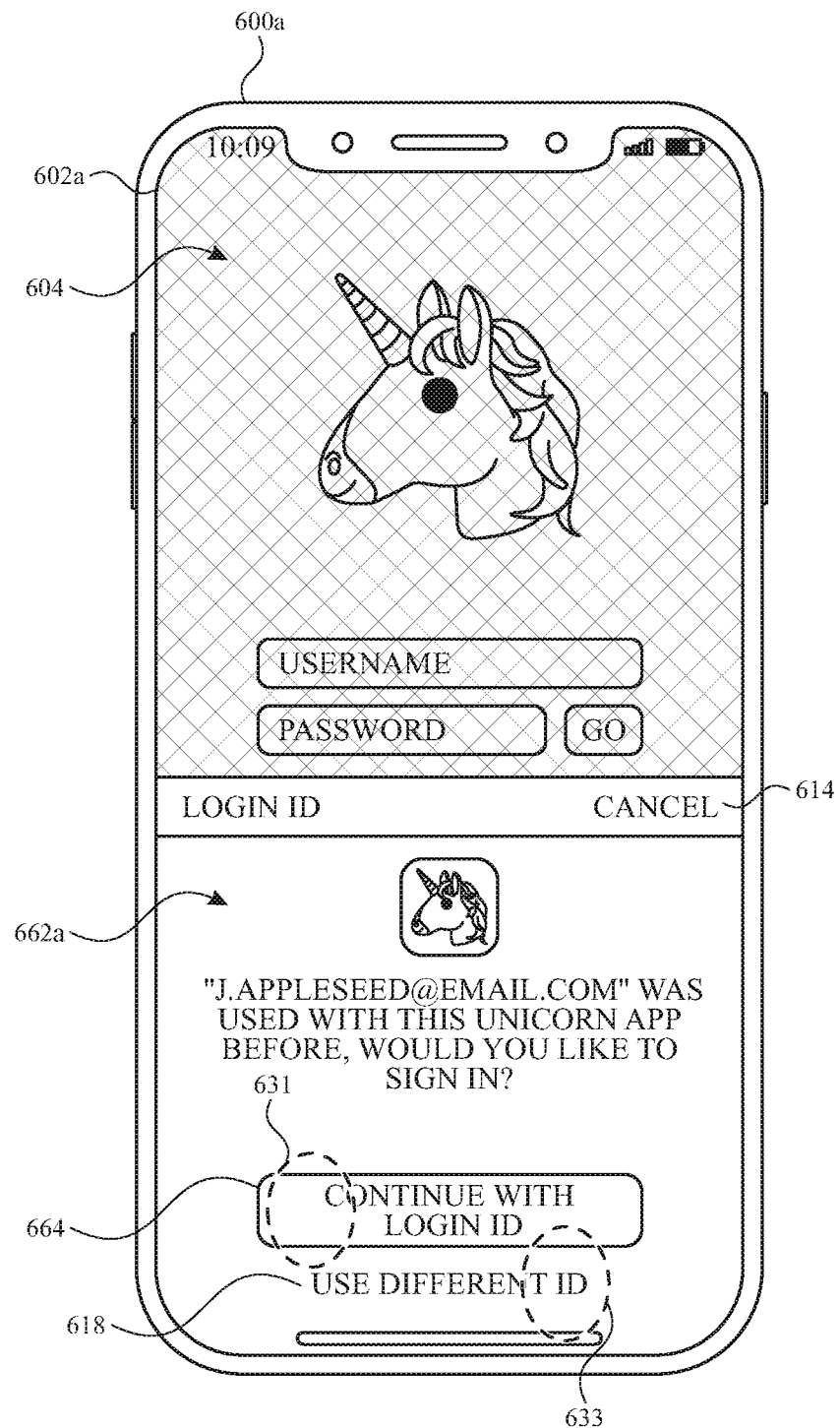

FIG. 6U illustrates electronic device 600a displaying, via display device 602a, user interface 662a for the first-party authentication provider. User interface 662a is displayed in response to detecting an input (e.g., input 603 shown in FIG. 6A) requesting the first-party authentication provider set up or log in to an account for the third-party service, and in response to detecting the current user's first-party authentication provider account has previously been used to set up an account for the third-party service (e.g., the user has previously set up an account for the third-party service using the first-party authentication provider on another device). User interface 662a includes an indication of the first-party authentication provider account that was previously used to set up an account for the third-party service (e.g., "'j.appleseed@email.com' was used with this Unicorn App before, would you like to sign in?"). User interface 662a further includes affordance 664 for continuing with the log in process using the indicated first-party authentication provider account and affordance 618 for changing to a different first-party authentication provider account. In response to detecting an input 631 (e.g., a tap input) corresponding to affordance 664, the electronic device 600a continues with the process for logging in to the account for the third-party service previously set up using the first-party authentication provider. In some embodiments, in response to detecting input 631, the electronic device 600a authenticates that the user is an authorized user of the indicated first-party authentication provider account (e.g., the user is authorized to use the account "j.appleseed@email.com"). In some embodiments, the electronic device 600a authenticates the user using facial recognition. In some embodiments, the electronic device 600a authenticates the user using fingerprint recognition. In some embodiments, the electronic device 600a authenticates the user by requesting a username and password (and optionally, a second authentication factor), and verifying the username and password corresponds to the indicated first-party authentication provider account. In some embodiments, (e.g., while using facial recognition or fingerprint recognition to authentication the user), device 600a remains logged in to the first-party authentication provider account.

In some embodiments, in response to detecting an input 633 (e.g., a tap input) corresponding to affordance 618, one or more interfaces for changing to a different first-party authentication provider account are displayed (e.g., a login interface for the first-party authentication provider). After the first-party authentication provider account has been changed, if the new first-party authentication provider account has previously been used to set up an account for the third-party service, then user interface 662a is displayed as shown in FIG. 6U, but includes an indication of the different account being used with the first-party authentication provider (e.g., a different email address is displayed). If the new first-party authentication provider account has not previously been used to set up an account for the third-party service, then user interface 610b is displayed as shown in FIG. 6C, but includes an indication of the different account being used with the first-party authentication provider (e.g., a different email address is displayed).

Figure 6V:
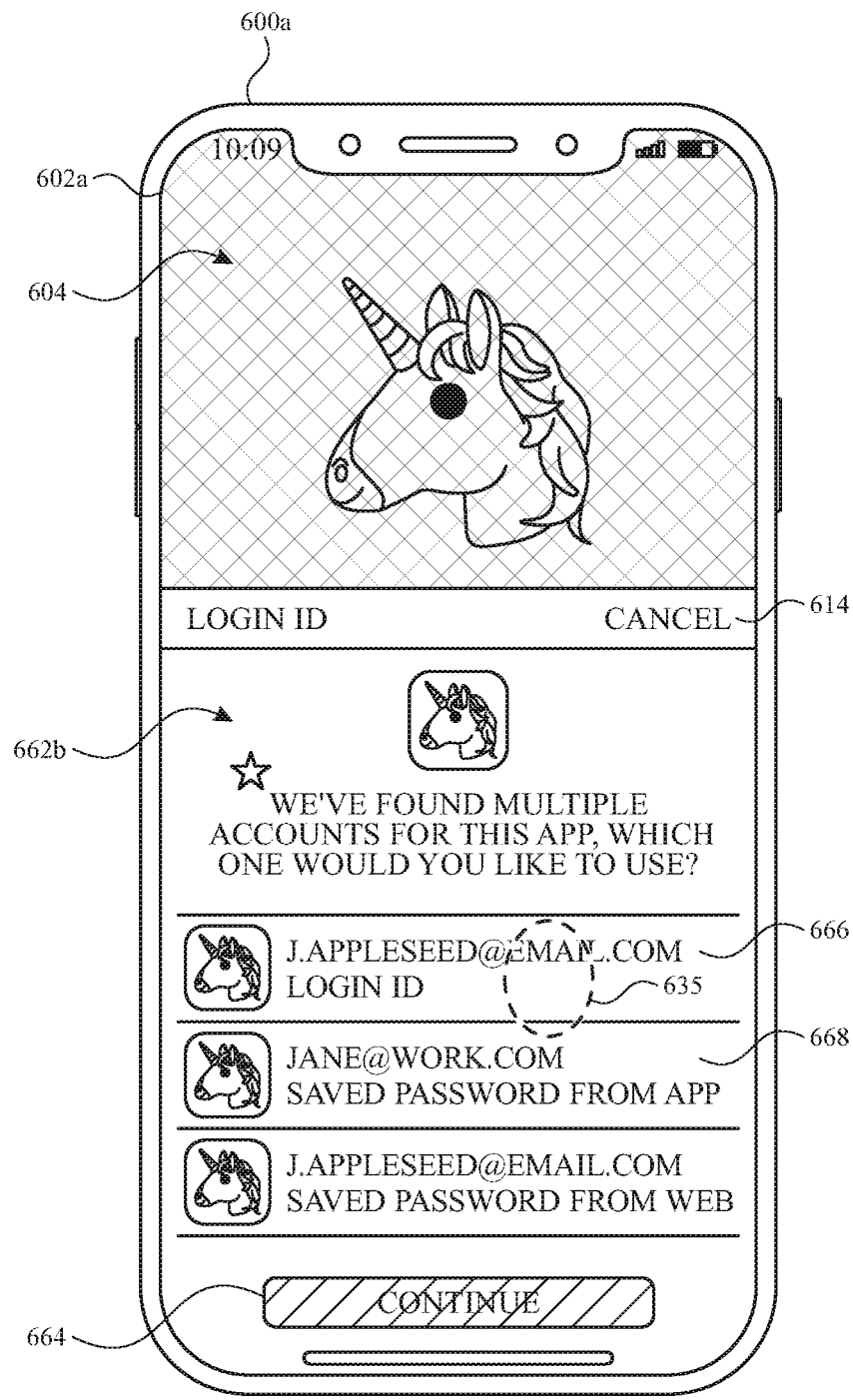

In some embodiments, as shown in FIG. 6V, if multiple accounts are detected that have previously been used to log in to or set up an account for the third-party service (e.g., the user has previously set up an account for the third-party service using the first-party authentication provider on another device and/or previously logged in to an account for the third-party party service using credentials stored at (or accessible by) device 600a), then user interface 662b is displayed. User interface 662b includes an account option 666 corresponding to a first-party authentication provider account that has previously been used to set up an account for the third-party service. User interface 662b also includes account options 668 corresponding to credentials that have previously been used to log in to an account for the third-party service. User interface 662a further includes affordance 664 for continuing with the log in process using the indicated first-party authentication provider account or the credentials that have previously been used to log in. In some embodiments, while no account options 666 or 668 are selected, affordance 664 is disabled (e.g., an input on the affordance 664 will not continue the account log in process). In some embodiments, affordance 664 is displayed in a different manner to indicate the affordance is disabled (e.g., displayed in a different color than when the affordance is enabled).

As shown in FIG. 6W, in response to detecting input 635 (as shown in FIG. 6V) (e.g., a tap input) corresponding to account option 666, an indication 670 of the selected account option is displayed. In some embodiments, after an account option 666 or 668 is selected, affordance 664 is enabled (e.g., an input on the affordance 632 will continue the account log in process). In some embodiments, affordance 664 is displayed in a different manner to indicate the affordance is enabled (e.g., displayed in a different color than when the affordance is disabled). In response to detecting an input corresponding to affordance 664, electronic device 600a logs in to an account for the third-party service using the selected account option 666 or 668.

FIG. 7A illustrates electronic device 600a displaying, via display device 602a, contact information interface 704a for use in accessing third party services using the first-party authentication provider account. Contact information interface 704 includes a forwarding field 706 that indicates an email address to which emails received by a proxy email address are forwarded. The proxy email address is provided to the third-party service when login option 630 (as shown in FIGS. 6F and 6G) (e.g., "hide my email" option) is selected during the set up process for the third-party service. In some embodiments, all emails received by proxy email addresses provided to third-party services are forwarded to the email address indicated by the forwarding field 706. In response to an input 703 (e.g., a tap input) corresponding to the forwarding field 706, the email address to which emails are forwarded can be changed. Thus, even though various third-party services each receive a different obfuscated email address for the user, the user receives emails from the various third-party services at a single email address (e.g., as indicated in forwarding field 706).

As shown in FIG. 7B, contact information interface 704b includes forwarding email options 708 and 710. Forwarding email options 708 and 710 are displayed in response to input 703 corresponding to the forwarding field 706 (as shown in FIG. 7A). Forwarding email options 708 and 710 correspond to email addresses associated with a user of electronic device 600a. Contact information interface 704b further includes an indication 712 of the selected forwarding email option. In response to an input 705 (e.g., a tap input) corresponding to forwarding email option 710 (e.g., "jane@work.com"), the location of indication 712 is changed to indicate forwarding email option 710, and forwarding field 706 (shown in FIG. 7A) is updated to indicate the currently selected forwarding email option 710. In response to selecting a different forwarding email option 710, the proxy email addresses provided to third-party services are updated to forward emails to the newly selected email address.

Figure 8A:
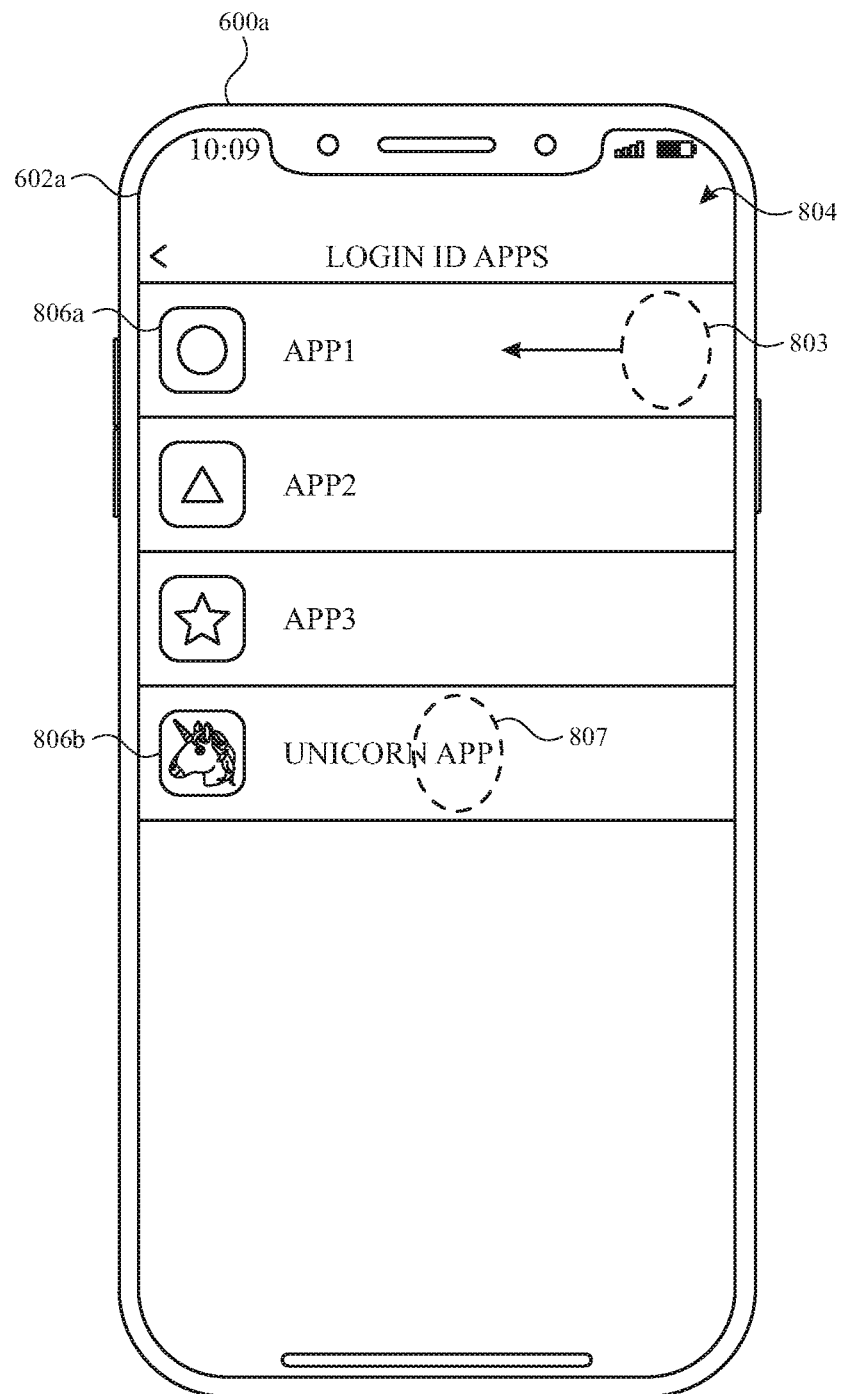
FIGS. 8A-8G illustrate exemplary user interfaces for viewing and managing settings for the service in accordance with some embodiments.
Figure 8B:
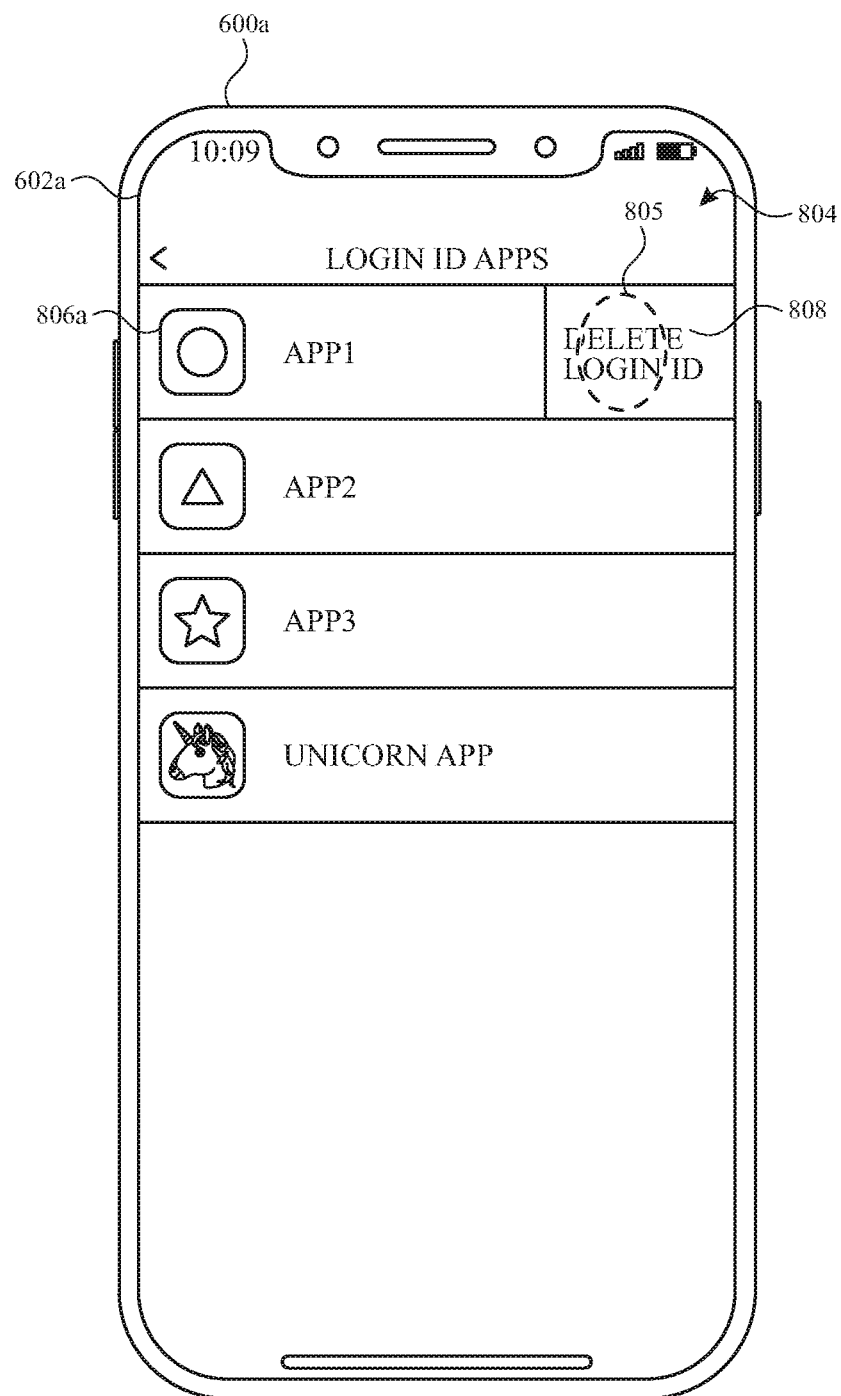

FIG. 8A illustrates electronic device 600a displaying, via display device 602a, settings interface 804 for third-party services set up using the first-party authentication provider. Settings interface 804 includes affordances 806 corresponding to third-party services (e.g., websites or applications) having accounts set up using the first-party authentication provider. In response to an input 803 (e.g., a swipe input) corresponding to affordance 806a, the corresponding third-party service can be removed from the settings interface 804 (as shown in FIG. 8B). In response to an input 807 (e.g., a tap input) corresponding to an affordance 806b, additional settings and information for the corresponding third-party service are displayed (as shown in FIG. 8C).

As shown in FIG. 8B, in response to input 803 (shown in FIG. 8A) (e.g., a swipe input) corresponding to affordance 806a, a delete affordance 808 for the corresponding third-party service is displayed. In response to an input 805 (e.g., a tap input) corresponding to delete affordance 808, the corresponding third-party service (e.g., "Appl") is removed from the settings interface 804. In some embodiments, removing a third-party service deletes any stored credentials for the third-party service so that the first-party authentication provider cannot be used to log in to an account for the third-party service without re-entering credentials or setting up a new account. In some embodiments, removing a third-party service stops emails from the third-party service from being forwarded to a user's email address (e.g., when the "hide my email" option was selected during the account set up process for the third-party service).

Figure 8C:
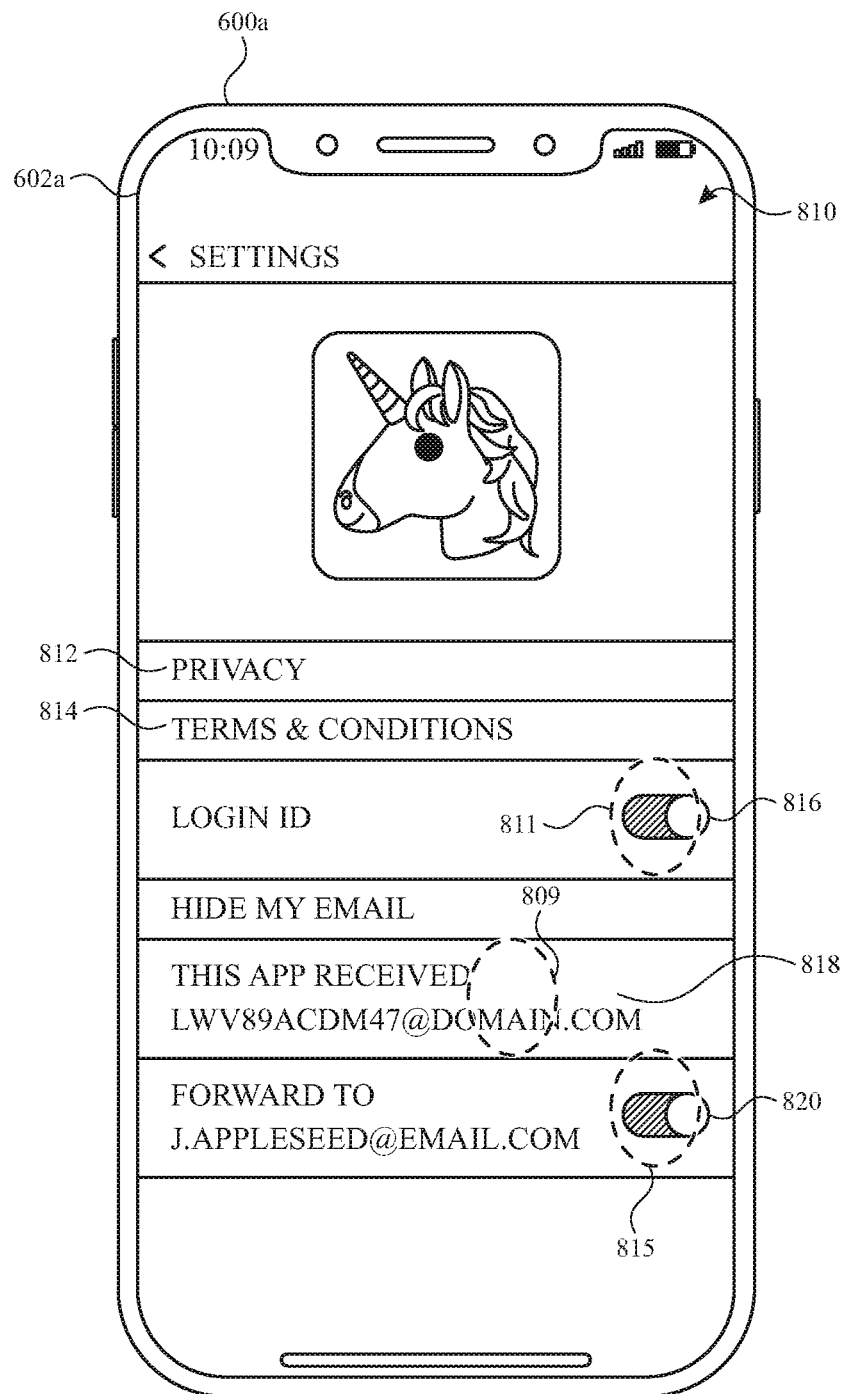
Figure 9:
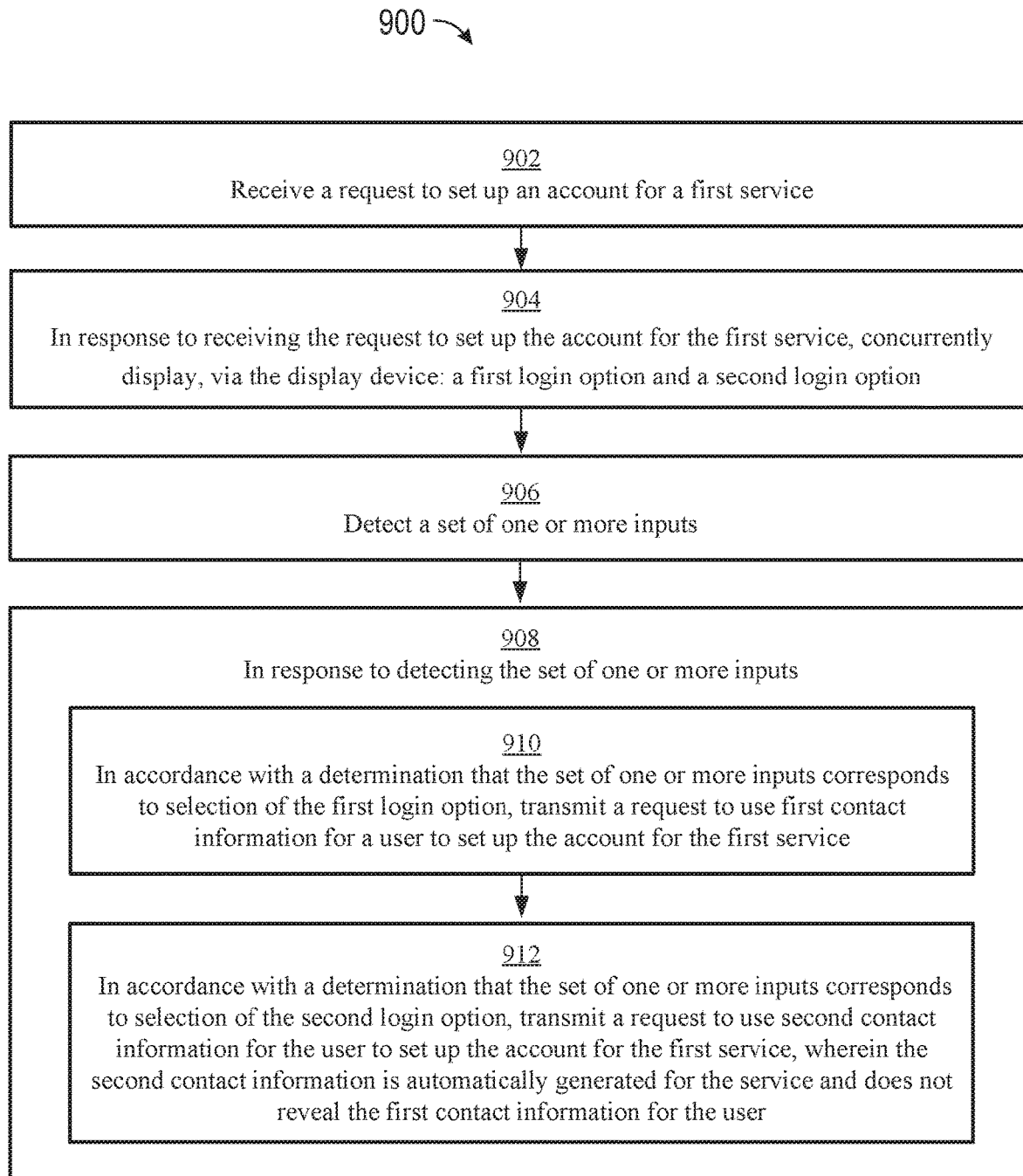
FIG. 9 is a flow diagram illustrating a method for setting up an account for a service using an electronic device in accordance with some embodiments.

FIG. 8C illustrates electronic device 600a displaying, via display device 602a, settings interface 810 for a third-party service (e.g., "Unicorn App"). Settings interface 810 is displayed in response to input 807 (shown in FIG. 8A) (e.g., a tap input) corresponding to affordance 806b. In some embodiments, settings interface 810 includes privacy affordance 812, terms affordance 814, option 816 for enabling or disabling the first-party authentication provider, indication 818 of a proxy email address used for the third-party service, and option 820 for enabling or disabling forwarding of emails sent to the proxy email address. In response to detecting an input (e.g., a tap input) corresponding to the privacy affordance 812, information regarding privacy policies for the third-party service is displayed. In response to detecting an input (e.g., a tap input) corresponding to the terms affordance 814, information regarding the terms and conditions for using the third-party service is displayed. In some embodiments, in response to detecting an input 809 (e.g., a tap input, a long press) corresponding to the indication 818 of the proxy email address used for the third-party service, the proxy email address is copied for pasting into a text field. In response to detecting an input 811 (e.g., a tap input) corresponding option 816 for enabling or disabling the first-party authentication provider, use of the first-party authentication for the third-party service is enabled or disabled. In response to detecting an input 815 (e.g., a tap input) corresponding option 820 for enabling or disabling forwarding of emails sent to the proxy email address, the forwarding of emails sent to the proxy email address by the third-party service is enabled or disabled.

Figure 8D:
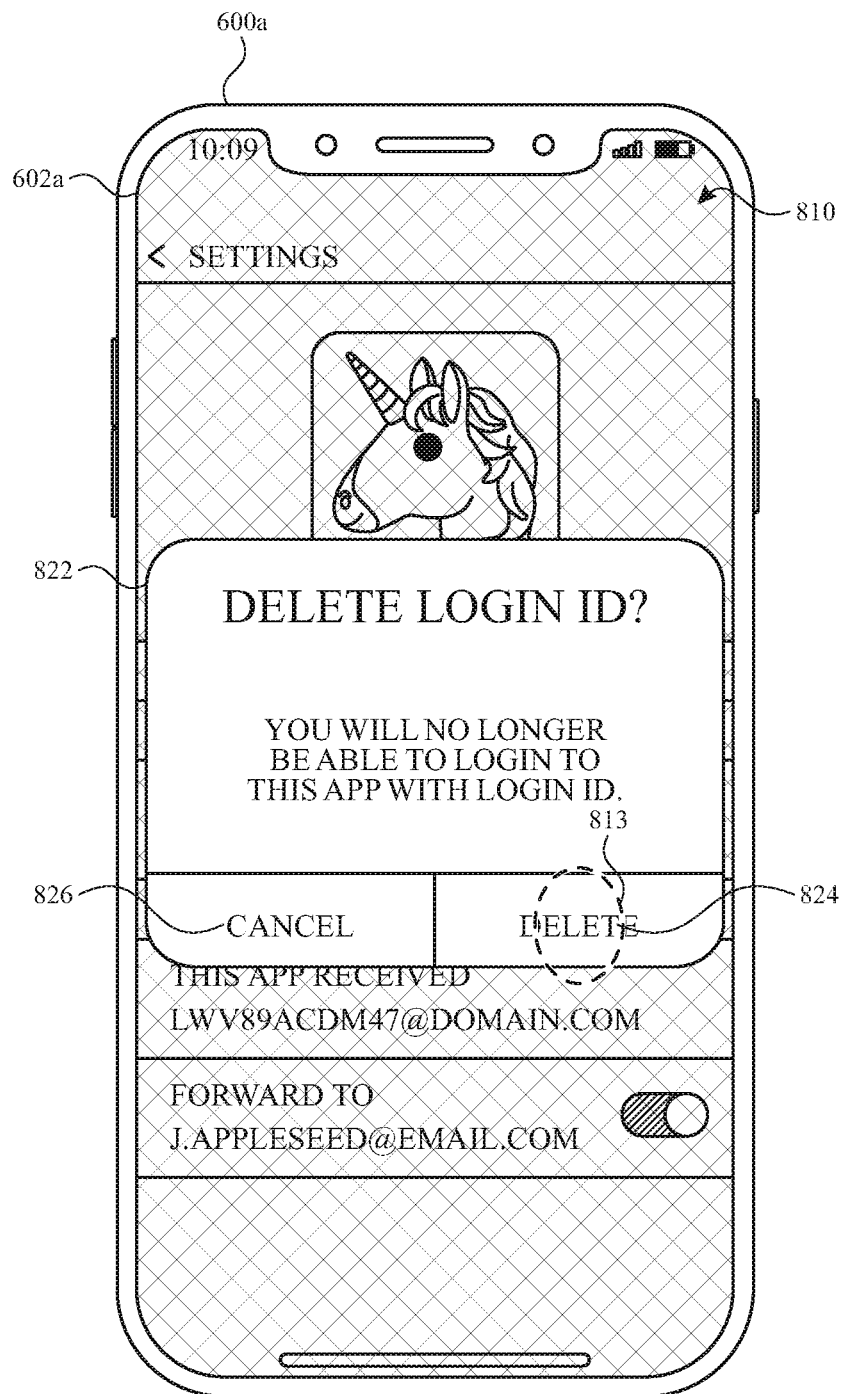

As shown in FIG. 8D, in some embodiments, if the first-party authentication provider is enabled for the third-party service, in response to detecting input 811 (shown in FIG. 8C) corresponding option 816, a notification 822 confirming the first-party authentication provider will be disabled for the third-party service. Notification 822 includes a confirm affordance 824 (e.g., "delete") and a cancel affordance 826. In response to detecting an input 813 (e.g., a tap input) corresponding to the confirm affordance 824, the first-party authentication provider is disabled for the third-party service. In some embodiments, disabling the first-party authentication provider for the third-party service deletes any stored credentials for the third-party service so that the first-party authentication provider cannot be used to log in to an account for the third-party service without re-entering credentials or setting up a new account. In some embodiments, disabling the first-party authentication provider for the third-party service stops emails from the third-party service from being forwarded to the user's email address (e.g., when the "hide my email" option was selected during the account set up process for the third-party service).

Figure 8E:
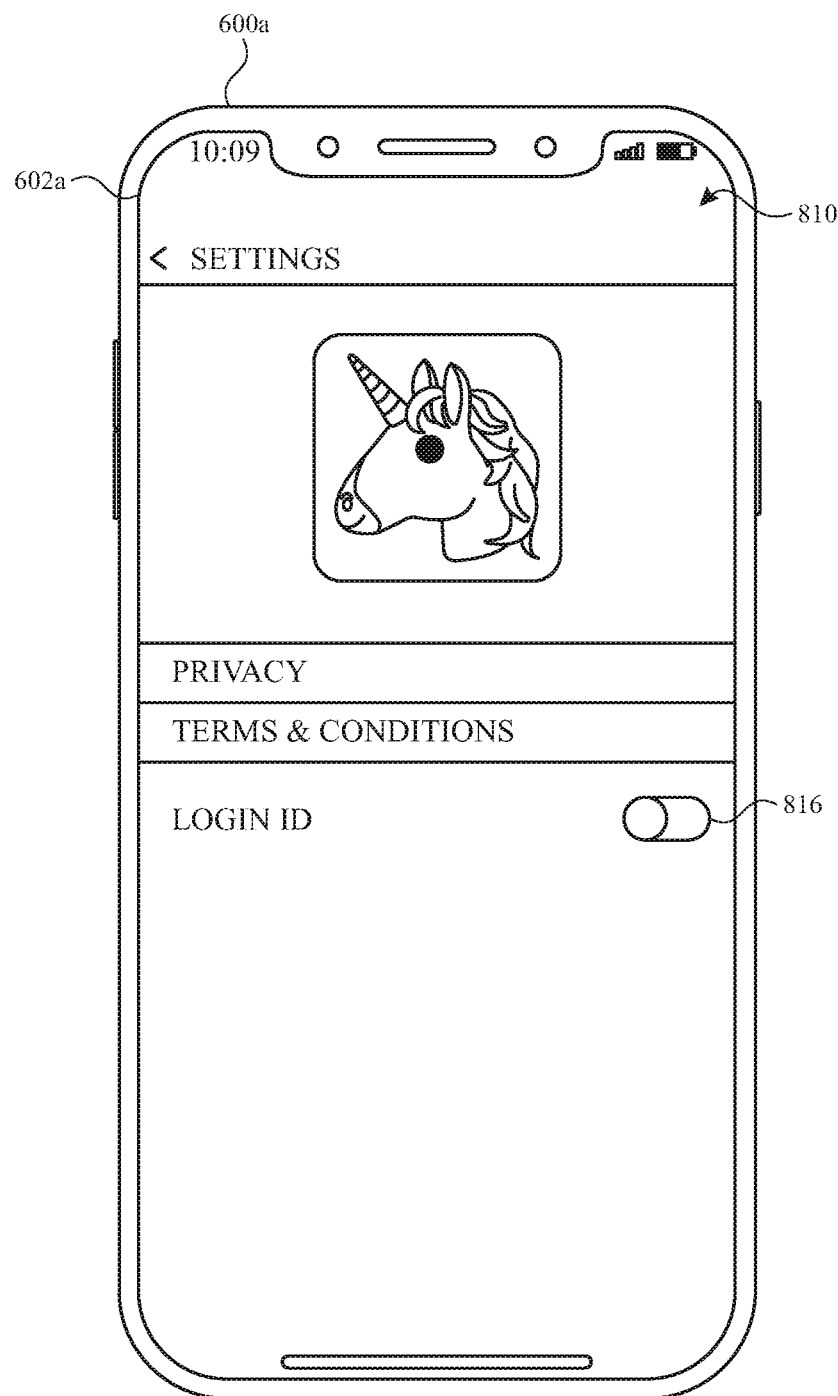

FIG. 8E illustrates settings interface 810 after disabling the first-party authentication provider for the third-party service. As shown in FIG. 8E, option 816 has a changed appearance to indicate the first-party authentication provider has been disabled for the third-party service, and other settings for the third-party service have ceased being displayed.

Figure 8F:
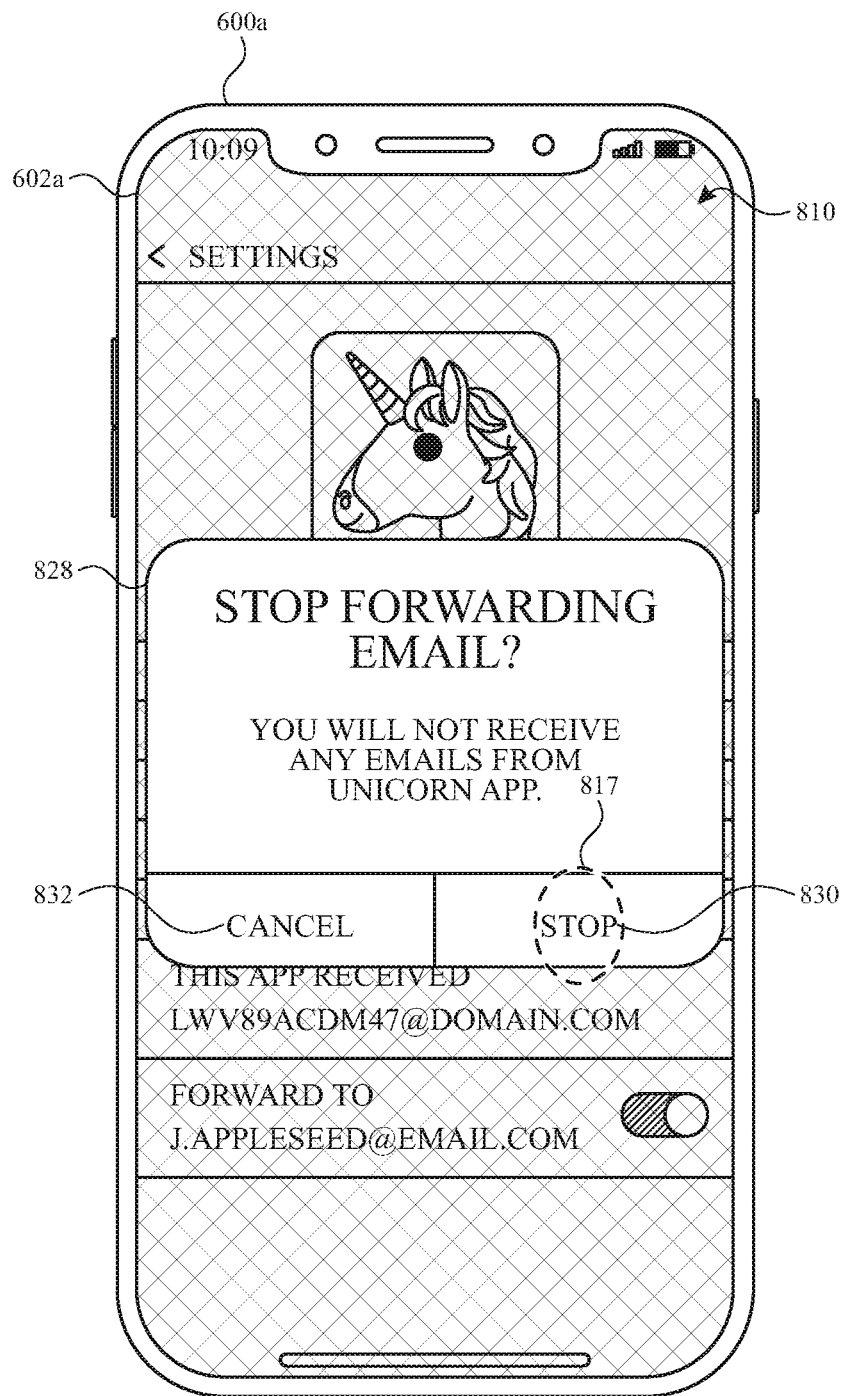

As shown in FIG. 8F, in some embodiments, if forwarding of emails sent to the proxy email address is enabled, in response to detecting input 815 (shown in FIG. 8C) corresponding option 820, a notification 828 confirming forwarding of emails sent to the proxy email address by the third-party service will be disabled. Notification 828 includes a confirm affordance 830 (e.g., "stop") and a cancel affordance 832. In response to detecting an input 817 (e.g., a tap input) corresponding to the confirm affordance 830, forwarding of emails sent to the proxy email address by the third-party service is disabled.

Figure 8G:
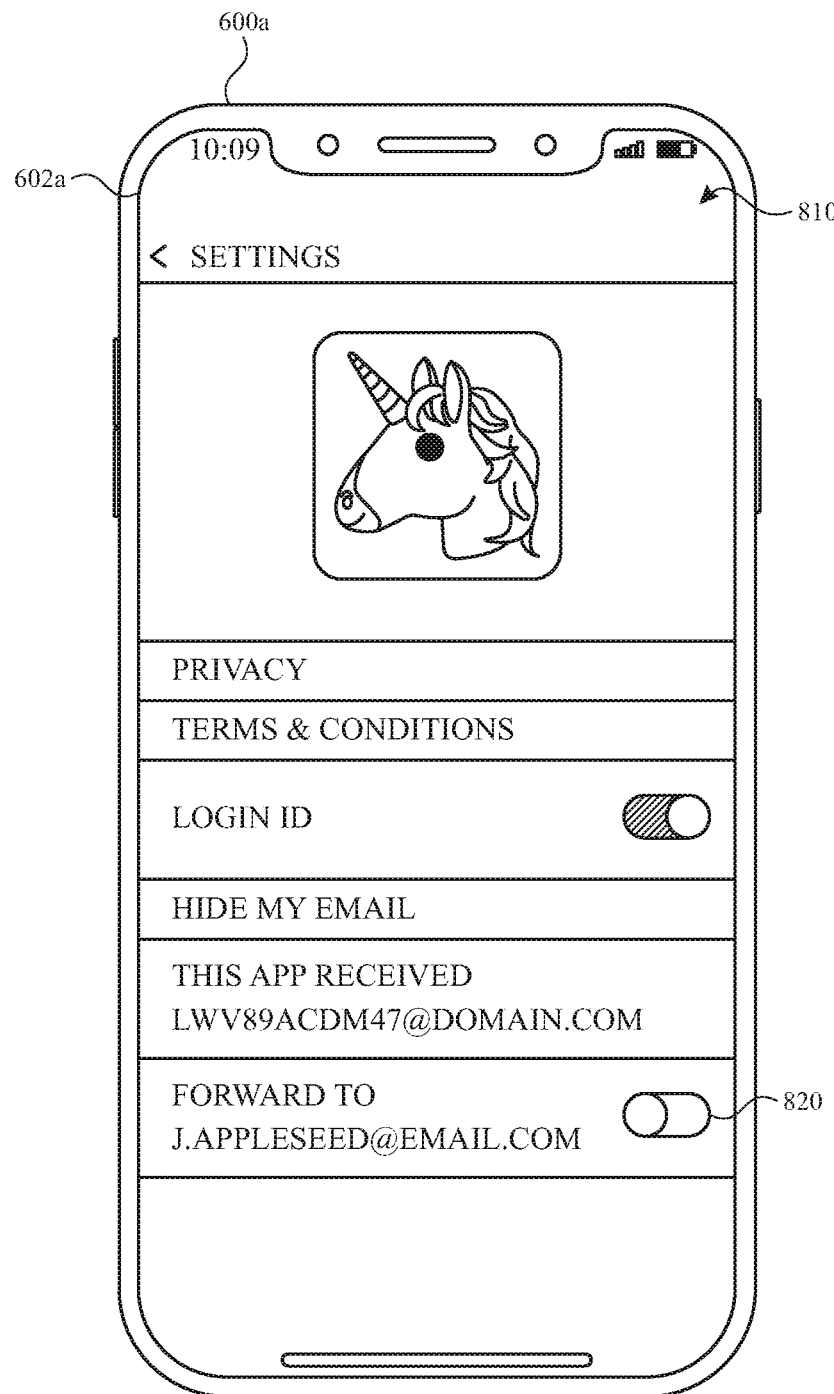

FIG. 8G illustrates settings interface 810 forwarding of emails sent to the proxy email address by the third-party service has been disabled. As shown in FIG. 8G, option 820 has a changed appearance to indicate the forwarding of emails has been disabled.

FIG. 9 is a flow diagram illustrating a method for setting up an account for a service using an electronic device in accordance with some embodiments. Method 900 is performed at a device (e.g., 100, 300, 500, 600a, 600b, 600c, 600d) with a display device. Some operations in method 900 are, optionally, combined, the orders of some operations are, optionally, changed, and some operations are, optionally, omitted.

As described below, method 900 provides an intuitive way for setting up an account for a service. The method reduces the cognitive burden on a user by reducing the amount of information that needs to be entered to set up the account, thereby creating a more efficient human-machine interface. For battery-operated computing devices, enabling a user to enter less information conserves power and increases the time between battery charges.

The electronic device receives (902) a request (e.g., input 603 on affordance 608, input 605 on affordance 612, input 609 on affordance 616) (e.g., a tap on a "continue" affordance) to set up an account for a first service (e.g., a website, an application).

In response to receiving the request to set up the account for the first service, the electronic device concurrently displays (904), via the display device, a first login option (e.g., 628) (e.g., "share my email" option) and a second login option (e.g., 630) (e.g., "hide my email" option).

The electronic device detects (906) a set of one or more inputs (e.g., 615) (e.g., a tap on one of the options and, optionally, a subsequent tap on a continue affordance).

In response to (908) detecting the set of one or more inputs, in accordance with a determination that the set of one or more inputs corresponds to selection of the first login option, the electronic device transmits (910) a request to use first contact information for a user (e.g., email address) to set up the account for the first service.

In response to (908) detecting the set of one or more inputs (e.g., 615), in accordance with a determination that the set of one or more inputs corresponds to selection of the second login option, the electronic device transmits (912) a request to use second contact information for the user (e.g., proxy email address) to set up the account for the first service, wherein the second contact information is automatically generated for the service and does not reveal the first contact information for the user (e.g., user's email address is hidden behind a proxy email address). Selectively transmitting either a user's personal contact information or automatically generated contact information that does not reveal the user's personal contact information enables the device to selectively share the user's personal contact information to only approved recipients, thereby improving security. Selectively transmitting the user's personal contact information to approved recipients increases the security of the device by preventing the sharing of the user's personal contact information with unintended recipients. Further, selectively transmitting the user's personal contact information to approved recipients while transmitting automatically generated contact information to other recipients alleviates the need for the user to manually enter different contact information for different recipients, thereby reducing the number of inputs required to perform the operations. Reducing the number of inputs required enhances the operability of the device and makes the user-device interface more efficient (e.g., by reducing user mistakes when operating/interacting with the device, by reducing false negatives of authentication) which, additionally, reduces power usage and improves battery life of the device by enabling the user to use the device more quickly and efficiently.

In some embodiments, in response to (or subsequent to) receiving the request to set up the account for the first service, the electronic device displays, via the display device, a default name for the account (e.g., 636) (e.g., a name of the user retrieved (locally or from a remote server) from a contact profile of the user, the user's real name). In some embodiments, the default name is not displayed unless the first service requests a name. In some embodiments, while displaying the default name for the account, the electronic device detects a second set of one or more inputs (e.g., 619, 621) (e.g., a tap on the default name). In some embodiments, in response to detecting the second set of one or more inputs, in accordance with a determination that the second set of one or more inputs corresponds to selection of the default name, the electronic device displays an edit interface (e.g., 610e) for a name for the account. In some embodiments, while in the edit interface for the name for the account, the device receives user inputs revising the name for the account (e.g., using an alphabetical keyboard to modify the default name) and/or selecting from a predetermined list of options of names for the account (e.g., different abbreviations for the user's name (e.g., Jane Appleseed, J. Appleseed, Jane A.)). Providing an interface to edit the user's name enables the device to selectively share a user's real name only with approved recipients, thereby improving security. Selectively sharing a user's real name with approved recipients increases the security of the device by preventing the sharing of the user's real name with unintended recipients.

In some embodiments, in response to (or subsequent to) receiving the request to set up the account for the first service, the electronic device concurrently displays, with the default name for the account (e.g., 636) (e.g., the user's real name), an affordance for clearing the name for the account (e.g., 638) (e.g., an "x" icon). In some embodiments, in response to detecting the second set of one or more inputs (e.g., 619, 621), in accordance with a determination that the second set of one or more inputs corresponds to selection of the default name (e.g., 636) (e.g., a tap on the default name), the electronic device displays, as part of the edit interface for the name for the account (e.g., 610a), the default name in a name field of the edit interface (e.g., 640, 642) (e.g., the default name is prepopulated in the edit interface and can be edited). In some embodiments, in response to detecting the second set of one or more inputs, in accordance with a determination that the second set of one or more inputs corresponds to selection of the affordance for clearing the name for the account (e.g., 638) (e.g., a tap on the "x" icon), the electronic device displays the edit interface for the name for the account without displaying the default name in the name field of the edit interface (e.g., 640, 642) (e.g., the edit interface displays an empty field for entering a new name). Providing an interface to edit the user's name enables the device to selectively share a user's real name only with approved recipients, thereby improving security. Selectively sharing a user's real name with approved recipients increases the security of the device by preventing the sharing of the user's real name with unintended recipients.

In some embodiments, in response to detecting a first portion of the set of one or more inputs and before transmitting the request to use the first or second contact information to set up the account for the first service, in accordance with a determination that the first portion of the set of one or more inputs corresponds to selection of the first login option, the electronic device displays a plurality of contact information for the user (e.g., 646) (e.g., a plurality of email addresses of the user, the first contact information with one or more other contact information, an alternative email address). In some embodiments, a second portion of the set of one or more inputs is detected while displaying the plurality of contact information for the user, the second portion of the set of one more inputs corresponding to selection of the first contact information (e.g., a tap on an affordance corresponding to the first contact information, which is displayed concurrently with one or more other affordances for one or more other respective alternative contact information (e.g., alternative email addresses)).

In some embodiments, the electronic device receives a second request to set up an account for a second service (e.g., a second website, a second application). In some embodiments, in response to receiving the second request to set up the account for the second service, in accordance with a determination that a request to use first contact information for the user to set up the account for the first service was transmitted in response to receiving the request to set up the account for the first service, the electronic device concurrently displays the first login option with a selection indicator (e.g., 634) (e.g., the first login option emphasized, a checkmark pre-selecting the share my email option) and the second login option without the selection indicator (e.g., the second login option not emphasized). In some embodiments, the second login option for setting up the account for the second corresponds to an option for requesting to use third contact information (different from the first and second contact information) for the user (e.g., proxy email address) to set up the account for the first service. In some embodiments, the third contact information is automatically generated for the second service and does not reveal the first contact information for the user (e.g., user's email address is hidden behind a proxy email). In some embodiments, in response to receiving the second request to set up the account for the second service, in accordance with a determination that a request to use second contact information for the user to set up the account for the first service was transmitted in response to receiving the request to set up the account for the first service, the electronic device concurrently displays the first login option without a selection indicator and the second login option with the selection indicator (e.g., 634) (e.g., e.g., the second login option emphasized, a checkmark pre-selecting the hide my email option). Pre-selecting a login option based on which login option was previously selected alleviates the need for the user to manually select a login option, thereby reducing the number of inputs required to perform the operation. Reducing the number of inputs required enhances the operability of the device and makes the user-device interface more efficient (e.g., by reducing user mistakes when operating/interacting with the device, by reducing false negatives of authentication) which, additionally, reduces power usage and improves battery life of the device by enabling the user to use the device more quickly and efficiently.

In some embodiments, prior to receiving the request to set up the account for the first service, receiving a request to access (e.g., log into the first service, create a new account for the first service) the first service. In some embodiments, in response to receiving the request to access the first service (e.g., and before concurrently displaying the first and second login options), the electronic device displays alternative account information for the first service (e.g., 668) (e.g., other email address previously used to log in to the service, an existing account for the first service). In some embodiments, the alternative account information includes: an indication of a type of credential (e.g., account login name, account email address) for the alternative account information and an indication of a source of credential (e.g., whether the credential was saved as a result of a login on a website, whether the credential was saved as a result of a login in a particular app, whether the credential is stored in a local/remote credential repository) for the alternative account information. In some embodiments, the request to set up the account for the first service is received while displaying the alternative account information.

In some embodiments, subsequent to transmitting the request to use second contact information for the user (e.g., proxy email address) to set up the account for the first service, the electronic device displays (e.g., in response to a user request to access the settings interface) a settings interface (e.g., 810) (e.g., for the first service) that includes the second contact information for the user (e.g., 818) (e.g., "This app receives: [scrambled]@domain.com") (In some embodiments, the second contact information can be copied into other interfaces (e.g., tap on the second contact information saves the second contact information into a clipboard of the device)).

In some embodiments, the second contact information is an intermediary email address (e.g., proxy email address) configured to forward received emails to an email address (e.g., to the first contact information) of the user. In some embodiments, when the user has multiple email addresses, emails are forwarded to the user's primary email address.

In some embodiments, the electronic device displays (e.g., in response to a user request to access the settings interface) a settings interface (e.g., 704a, 704b) with the email address of the user (e.g., 706) that the intermediary email address (e.g., proxy email address) is configured to forward received emails to (e.g., the first contact information). In some embodiments, the electronic device detects a fourth set of one or more inputs (e.g., 703, 705) modifying the email address of the user. In some embodiments, the electronic device transmits (e.g., in response to a user request (e.g., tap of affordance)) a request to update the intermediary email address (e.g., proxy email address) to forward emails to the modified email address of the user (and not to the initial email address of the user). In some embodiments, all intermediary email addresses associated with the user (e.g., proxy email addresses used with other services or accounts) are updated to forward emails to the modified email address. Updating all intermediary email addresses to forward emails to the modified email address alleviates the need for the user to manually change the email settings for every service, thereby reducing the number of inputs required to perform the operation. Reducing the number of inputs required enhances the operability of the device and makes the user-device interface more efficient (e.g., by reducing user mistakes when operating/interacting with the device, by reducing false negatives of authentication) which, additionally, reduces power usage and improves battery life of the device by enabling the user to use the device more quickly and efficiently.

In some embodiments, subsequent to transmitting the request to use second contact information for the user (e.g., the proxy email address) to set up the account for the first service, the electronic device displays (e.g., in response to a sequence of one or more inputs that includes a user request to access the settings interface and, optionally a request to navigate within the settings interface) a settings interface (e.g., 810) with a disable affordance (e.g., 820). In some embodiments, the electronic device detects an input (e.g., 815) corresponding to the disable affordance. In some embodiments, in response to detecting the input corresponding to the disable affordance, the electronic device transmits a request to cease using the second contact information for the user (e.g., proxy email address) for the account of the first service (and, optionally, to (e.g., instead) use the first contact information for the user (e.g., user's email address) for the account of the first service). Ceasing use of a proxy email address for emails sent by the first service alleviates the need for the user log in to the service to change email preferences or opt out of receiving emails from the first service, thereby reducing the number of inputs required to perform the operation. Reducing the number of inputs required enhances the operability of the device and makes the user-device interface more efficient (e.g., by reducing user mistakes when operating/interacting with the device, by reducing false negatives of authentication) which, additionally, reduces power usage and improves battery life of the device by enabling the user to use the device more quickly and efficiently.

In some embodiments, the electronic device displays information (e.g., 804, 810) (e.g., list of apps, app settings page) corresponding to the first service (e.g., 806b). In some embodiments, the electronic device detects (e.g., while displaying the information corresponding to the first service) a fifth set of one or more inputs (e.g., 803, 808, 811) corresponding to a request to disable the account for the first service (e.g., a swipe gesture, disabling a toggle affordance). In some embodiments, in response to detecting the fifth set of one or more inputs, the electronic device disables the account for the first service (e.g., permanently delete the account, temporarily disable the account, deleting the information corresponding to the first service (e.g., no longer displaying the information corresponding to the first server, transmitting an instruction to no longer forward emails)).

In some embodiments, prior to receiving the request to set up the account for the first service, the electronic device receives a request to access (e.g., log into the first service, create a new account for the first service) the first service. In some embodiments, in response to receiving the request to access the first service (e.g., and before concurrently displaying the first and second login options), the electronic device displays a change account affordance (e.g., 618). In some embodiments, in response to receiving the request to access the first service (e.g., and before concurrently displaying the first and second login options), the electronic device detects an input (e.g., 611) corresponding to the change account affordance. In some embodiments, in response to receiving the request to access the first service (e.g., and before concurrently displaying the first and second login options), in response to detecting the input corresponding to the change account affordance, the electronic device displays an interface to select a login account for the user (e.g., other email address for the user). In some embodiments, in response to receiving the request to access the first service (e.g., and before concurrently displaying the first and second login options), in response to detecting the input corresponding to the change account affordance: the electronic device detects a sixth set of one or more inputs selecting a login account for the user (e.g., entering user ID, password, authentication code for a different ID). In some embodiments, the request to set up the account for the first service is received after detecting the sixth set of one or more inputs selecting the login account for the user. In some embodiments, the first contact information corresponds to contact information of the selected login account (e.g., email address of the newly selected account).

In some embodiments, prior to receiving the request to set up the account for the first service, the electronic device receives a request to access (e.g., log into the first service, create a new account for the first service) the first service. In some embodiments, in response to receiving the request to access the first service (e.g., and before concurrently displaying the first and second login options), the electronic device detects a security issue (e.g., email not verified, two factor authentication not enabled, terms and conditions not accepted). In some embodiments, in response to receiving the request to access the first service (e.g., and before concurrently displaying the first and second login options), the electronic device displays (e.g., based on detecting the security issue) an interface (e.g., 626) to correct the security issue. In some embodiments, in response to receiving the request to access the first service (e.g., and before concurrently displaying the first and second login options), the electronic device detects (subsequent to displaying the interface to correct the security issue) a seventh set of one or more inputs correcting the security issue. In some embodiments, the request (e.g., a tap on a "continue" affordance after correcting the security issue) to set up the account for the first service is received after detecting the seventh set of one or more inputs correcting the security issue.

In some embodiments, the request to set up the account for the first service is received from a second device (e.g., 600d) (e.g., transmitted from a television).

In some embodiments, the request to set up the account for the first service is received from a web browser (e.g., 648) displaying a website (e.g., 604). In some embodiments, the first and second login options are displayed overlaying (e.g., covering) at least a portion of the website (e.g., the login options are not received as part of website pages). In some embodiments, the overlay includes instructions for providing biometric authentication information (e.g., 632) (e.g., presenting a fingerprint to a fingerprint reader or presenting a face to a facial detection sensor such as a visible light camera and/or a depth camera).

In some embodiments, the request to set up the account for the first service is received from a web browser (e.g., 650) displaying a website. In some embodiments, the first and second login options are displayed in a second website (e.g., website with separate login pages). In some embodiments, the second website is owned and/or operated by the same entity or related entities as the entity providing the user contact information to the first service, and the first and second login options authenticate the user with the entity.

In some embodiments, the electronic device detects a request to access the first service (e.g., sign in page for an app or website). In some embodiments, in response to detecting the request to access the first service, the electronic device displays an affordance (e.g., 664) to log in to the first service. In some embodiments, the electronic device detects an input (e.g., 631) corresponding to the affordance to log in to the first service. In some embodiments, in response to detecting the input corresponding to the affordance to log in to the first service, the electronic device accesses the first service (e.g., access information specific to the account) with the account set up for the first service.

In some embodiments, before transmitting the request to use the first or second contact information, the electronic device performs user authentication. In some embodiments, user authentication is performed using facial recognition. In some embodiments, user authentication is performed using fingerprint recognition. In some embodiments, user authentication is performed with a passcode (e.g., when using a watch or other wearable device).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to set up an account for a service. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, date of birth, or any other identifying or personal information.

The present disclosure recognizes that the use of such personal information data, in the present technology, can be used to the benefit of users. For example, the personal information data can be used to improve the process for setting up an account for a service. Further, other uses for personal information data that benefit the user are also contemplated by the present disclosure.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of a user's name or email address, the present technology can be configured to allow users to select to "opt in" or "opt out" of the sharing of personal information data during registration for services or anytime thereafter. In addition to providing "opt in" and "opt out" options, the present disclosure contemplates providing notifications relating to the access or use of personal information. For instance, a user may be notified upon setting up an account for a service that their personal information data will be shared with the service.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. An electronic device, comprising:
    a display device;
    one or more processors; and
    memory storing one or more programs configured to be executed by the one or more processors, the one or more programs including instructions for:
        receiving a request to set up an account for a first service;
        in response to receiving the request to set up the account for the first service, concurrently displaying, via the display device:
            a first login option; and
            a second login option;
        detecting a set of one or more inputs; and
        in response to detecting the set of one or more inputs:
            in accordance with a determination that the set of one or more inputs corresponds to selection of the first login option, transmitting a request to use first contact information for a user to set up the account for the first service; and
            in accordance with a determination that the set of one or more inputs corresponds to selection of the second login option, transmitting a request to use second contact information for the user to set up the account for the first service, wherein the second contact information is automatically generated for the service and does not reveal the first contact information for the user.

2. The electronic device of claim 1, wherein the one or more programs further include instructions for:
    in response to receiving the request to set up the account for the first service, displaying, via the display device, a default name for the account;
    while displaying the default name for the account, detecting a second set of one or more inputs; and
    in response to detecting the second set of one or more inputs:
        in accordance with a determination that the second set of one or more inputs corresponds to selection of the default name, displaying an edit interface for a name for the account.

3. The electronic device of claim 2, wherein the one or more programs further include instructions for:
    in response to receiving the request to set up the account for the first service, concurrently displaying, with the default name for the account, an affordance for clearing the name for the account; and
    in response to detecting the second set of one or more inputs:
        in accordance with a determination that the second set of one or more inputs corresponds to selection of the default name, displaying, as part of the edit interface for the name for the account, the default name in a name field of the edit interface; and
        in accordance with a determination that the second set of one or more inputs corresponds to selection of the affordance for clearing the name for the account, displaying the edit interface for the name for the account without displaying the default name in the name field of the edit interface.

4. The electronic device of claim 1, wherein the one or more programs further include instructions for:
  in response to detecting a first portion of the set of one or more inputs and before transmitting the request to use the first or second contact information to set up the account for the first service:
    in accordance with a determination that the first portion of the set of one or more inputs corresponds to selection of the first login option:
      displaying a plurality of contact information for the user; and
    wherein a second portion of the set of one or more inputs is detected while displaying the plurality of contact information for the user, the second portion of the set of one more inputs corresponding to selection of the first contact information.

5. The electronic device of claim 1, wherein the one or more programs further include instructions for:
  receiving a second request to set up an account for a second service; and
  in response to receiving the second request to set up the account for the second service:
    in accordance with a determination that a request to use first contact information for the user to set up the account for the first service was transmitted in response to receiving the request to set up the account for the first service, concurrently displaying:
      the first login option with a selection indicator; and
      the second login option without the selection indicator;
    in accordance with a determination that a request to use second contact information for the user to set up the account for the first service was transmitted in response to receiving the request to set up the account for the first service, concurrently displaying:
      the first login option without a selection indicator; and
      the second login option with the selection indicator.

6. The electronic device of claim 1, wherein the one or more programs further include instructions for:
  prior to receiving the request to set up the account for the first service, receiving a request to access the first service; and
  in response to receiving the request to access the first service:
    displaying alternative account information for the first service, wherein the alternative account information includes:
      an indication of a type of credential for the alternative account information; and
      an indication of a source of credential for the alternative account information.

7. The electronic device of claim 1, wherein the one or more programs further include instructions for:
  subsequent to transmitting the request to use second contact information for the user to set up the account for the first service, displaying a settings interface that includes the second contact information for the user.

8. The electronic device of claim 1, wherein the second contact information is an intermediary email address configured to forward received emails to an email address of the user.

9. The electronic device of claim 8, wherein the one or more programs further include instructions for:
  displaying a settings interface with the email address of the user that the intermediary email address is configured to forward received emails to;
  detecting a fourth set of one or more inputs modifying the email address of the user; and
  transmitting a request to update the intermediary email address to forward emails to the modified email address of the user.

10. The electronic device of claim 1, wherein the one or more programs further include instructions for:
  subsequent to transmitting the request to use second contact information for the user to set up the account for the first service, displaying a settings interface with a disable affordance;
  detecting an input corresponding to the disable affordance; and
  in response to detecting the input corresponding to the disable affordance:
    transmitting a request to cease using the second contact information for the user for the account of the first service.

11. The electronic device of claim 1, wherein the one or more programs further include instructions for:
  displaying information corresponding to the first service;
  detecting a fifth set of one or more inputs corresponding to a request to disable the account for the first service; and
  in response to detecting the fifth set of one or more inputs, disabling the account for the first service.

12. The electronic device of claim 1, wherein the one or more programs further include instructions for:
  prior to receiving the request to set up the account for the first service, receiving a request to access the first service; and
  in response to receiving the request to access the first service:
    displaying a change account affordance;
    detecting an input corresponding to the change account affordance; and
    in response to detecting the input corresponding to the change account affordance:
      displaying an interface to select a login account for the user; and
      detecting a sixth set of one or more inputs selecting a login account for the user,
  wherein the request to set up the account for the first service is received after detecting the sixth set of one or more inputs selecting the login account for the user, and wherein the first contact information corresponds to contact information of the selected login account.

13. The electronic device of claim 1, wherein the one or more programs further include instructions for:
  prior to receiving the request to set up the account for the first service, receiving a request to access the first service; and
  in response to receiving the request to access the first service:
    detecting a security issue;
    displaying an interface to correct the security issue; and
    detecting a seventh set of one or more inputs correcting the security issue,
  wherein the request to set up the account for the first service is received after detecting the seventh set of one or more inputs correcting the security issue.

14. The electronic device of claim 1, wherein the request to set up the account for the first service is received from a second device.

15. The electronic device of claim 1, wherein the request to set up the account for the first service is received from a web browser displaying a website, and wherein the first and second login options are displayed overlaying at least a portion of the website.

16. The electronic device of claim 1, wherein the request to set up the account for the first service is received from a web browser displaying a website, and wherein the first and second login options are displayed in a second website.

17. The electronic device of claim 1, wherein the one or more programs further include instructions for:
   detecting a request to access the first service;
   in response to detecting the request to access the first service, displaying an affordance to log in to the first service;
   detecting an input corresponding to the affordance to log in to the first service; and
   in response to detecting the input corresponding to the affordance to log in to the first service, accessing the first service with the account set up for the first service.

18. The electronic device of claim 1, wherein the one or more programs further include instructions for:
   before transmitting the request to use the first or second contact information, performing user authentication.

19. A method, comprising:
   at an electronic device with a display device:
      receiving a request to set up an account for a first service;
      in response to receiving the request to set up the account for the first service, concurrently displaying, via the display device:
         a first login option; and
         a second login option;
      detecting a set of one or more inputs; and
      in response to detecting the set of one or more inputs:
         in accordance with a determination that the set of one or more inputs corresponds to selection of the first login option, transmitting a request to use first contact information for a user to set up the account for the first service; and
         in accordance with a determination that the set of one or more inputs corresponds to selection of the second login option, transmitting a request to use second contact information for the user to set up the account for the first service, wherein the second contact information is automatically generated for the service and does not reveal the first contact information for the user.

20. A non-transitory computer-readable storage medium storing one or more programs configured to be executed by one or more processors of an electronic device with a display device, the one or more programs including instructions for:
   receiving a request to set up an account for a first service;
   in response to receiving the request to set up the account for the first service, concurrently displaying, via the display device:
      a first login option; and
      a second login option;
   detecting a set of one or more inputs; and
   in response to detecting the set of one or more inputs:
      in accordance with a determination that the set of one or more inputs corresponds to selection of the first login option, transmitting a request to use first contact information for a user to set up the account for the first service; and
      in accordance with a determination that the set of one or more inputs corresponds to selection of the second login option, transmitting a request to use second contact information for the user to set up the account for the first service, wherein the second contact information is automatically generated for the service and does not reveal the first contact information for the user.

21. The method of claim 19, further comprising:
   in response to receiving the request to set up the account for the first service, displaying, via the display device, a default name for the account;
   while displaying the default name for the account, detecting a second set of one or more inputs; and
   in response to detecting the second set of one or more inputs:
      in accordance with a determination that the second set of one or more inputs corresponds to selection of the default name, displaying an edit interface for a name for the account.

22. The method of claim 21, further comprising:
   in response to receiving the request to set up the account for the first service, concurrently displaying, with the default name for the account, an affordance for clearing the name for the account; and
   in response to detecting the second set of one or more inputs:
      in accordance with a determination that the second set of one or more inputs corresponds to selection of the default name, displaying, as part of the edit interface for the name for the account, the default name in a name field of the edit interface; and
      in accordance with a determination that the second set of one or more inputs corresponds to selection of the affordance for clearing the name for the account, displaying the edit interface for the name for the account without displaying the default name in the name field of the edit interface.

23. The method of claim 19, further comprising:
   in response to detecting a first portion of the set of one or more inputs and before transmitting the request to use the first or second contact information to set up the account for the first service:
      in accordance with a determination that the first portion of the set of one or more inputs corresponds to selection of the first login option:
         displaying a plurality of contact information for the user; and
      wherein a second portion of the set of one or more inputs is detected while displaying the plurality of contact information for the user, the second portion of the set of one or more inputs corresponding to selection of the first contact information.

24. The method of claim 19, further comprising:
   receiving a second request to set up an account for a second service; and
   in response to receiving the second request to set up the account for the second service:
      in accordance with a determination that a request to use first contact information for the user to set up the account for the first service was transmitted in response to receiving the request to set up the account for the first service, concurrently displaying:
         the first login option with a selection indicator; and
         the second login option without the selection indicator;
      in accordance with a determination that a request to use second contact information for the user to set up the account for the first service was transmitted in response to receiving the request to set up the account for the first service, concurrently displaying:

the first login option without a selection indicator; and the second login option with the selection indicator.

25. The method of claim 19, further comprising:

prior to receiving the request to set up the account for the first service, receiving a request to access the first service; and in response to receiving the request to access the first service:

displaying alternative account information for the first service, wherein the alternative account information includes:

an indication of a type of credential for the alternative account information; and an indication of a source of credential for the alternative account information.

26. The method of claim 19, further comprising:

subsequent to transmitting the request to use second contact information for the user to set up the account for the first service, displaying a settings interface that includes the second contact information for the user.

27. The method of claim 19, wherein the second contact information is an intermediary email address configured to forward received emails to an email address of the user.

28. The method of claim 27, further comprising:

displaying a settings interface with the email address of the user that the intermediary email address is configured to forward received emails to;

detecting a fourth set of one or more inputs modifying the email address of the user; and transmitting a request to update the intermediary email address to forward emails to the modified email address of the user.

29. The method of claim 19, further comprising:

subsequent to transmitting the request to use second contact information for the user to set up the account for the first service, displaying a settings interface with a disable affordance;

detecting an input corresponding to the disable affordance; and in response to detecting the input corresponding to the disable affordance:

transmitting a request to cease using the second contact information for the user for the account of the first service.

30. The method of claim 19, further comprising:

displaying information corresponding to the first service;

detecting a fifth set of one or more inputs corresponding to a request to disable the account for the first service; and in response to detecting the fifth set of one or more inputs, disabling the account for the first service.

31. The method of claim 19, further comprising:

prior to receiving the request to set up the account for the first service, receiving a request to access the first service; and in response to receiving the request to access the first service:

displaying a change account affordance;

detecting an input corresponding to the change account affordance; and in response to detecting the input corresponding to the change account affordance:

displaying an interface to select a login account for the user; and detecting a sixth set of one or more inputs selecting a login account for the user, wherein the request to set up the account for the first service is received after detecting the sixth set of one or more inputs selecting the login account for the user, and wherein the first contact information corresponds to contact information of the selected login account.

32. The method of claim 19, further comprising:

prior to receiving the request to set up the account for the first service, receiving a request to access the first service; and in response to receiving the request to access the first service:

detecting a security issue;

displaying an interface to correct the security issue; and detecting a seventh set of one or more inputs correcting the security issue, wherein the request to set up the account for the first service is received after detecting the seventh set of one or more inputs correcting the security issue.

33. The method of claim 19, wherein the request to set up the account for the first service is received from a second device.

34. The method of claim 19, wherein the request to set up the account for the first service is received from a web browser displaying a website, and wherein the first and second login options are displayed overlaying at least a portion of the website.

35. The method of claim 19, wherein the request to set up the account for the first service is received from a web browser displaying a website, and wherein the first and second login options are displayed in a second website.

36. The method of claim 19, further comprising:

detecting a request to access the first service;

in response to detecting the request to access the first service, displaying an affordance to log in to the first service;

detecting an input corresponding to the affordance to log in to the first service; and in response to detecting the input corresponding to the affordance to log in to the first service, accessing the first service with the account set up for the first service.

37. The method of claim 19, further comprising:

before transmitting the request to use the first or second contact information, performing user authentication.

38. The non-transitory computer-readable storage medium of claim 20, wherein the one or more programs further include instructions for:

in response to receiving the request to set up the account for the first service, displaying, via the display device, a default name for the account;

while displaying the default name for the account, detecting a second set of one or more inputs; and in response to detecting the second set of one or more inputs:

in accordance with a determination that the second set of one or more inputs corresponds to selection of the default name, displaying an edit interface for a name for the account.

39. The non-transitory computer-readable storage medium of claim 38, wherein the one or more programs further include instructions for:

in response to receiving the request to set up the account for the first service, concurrently displaying, with the default name for the account, an affordance for clearing the name for the account; and in response to detecting the second set of one or more inputs:
    in accordance with a determination that the second set of one or more inputs corresponds to selection of the default name, displaying, as part of the edit interface for the name for the account, the default name in a name field of the edit interface; and
    in accordance with a determination that the second set of one or more inputs corresponds to selection of the affordance for clearing the name for the account, displaying the edit interface for the name for the account without displaying the default name in the name field of the edit interface.

40. The non-transitory computer-readable storage medium of claim 20, wherein the one or more programs further include instructions for:
    in response to detecting a first portion of the set of one or more inputs and before transmitting the request to use the first or second contact information to set up the account for the first service:
        in accordance with a determination that the first portion of the set of one or more inputs corresponds to selection of the first login option:
            displaying a plurality of contact information for the user; and
        wherein a second portion of the set of one or more inputs is detected while displaying the plurality of contact information for the user, the second portion of the set of one more inputs corresponding to selection of the first contact information.

41. The non-transitory computer-readable storage medium of claim 20, wherein the one or more programs further include instructions for:
    receiving a second request to set up an account for a second service; and
    in response to receiving the second request to set up the account for the second service:
        in accordance with a determination that a request to use first contact information for the user to set up the account for the first service was transmitted in response to receiving the request to set up the account for the first service, concurrently displaying:
            the first login option with a selection indicator; and
            the second login option without the selection indicator;
        in accordance with a determination that a request to use second contact information for the user to set up the account for the first service was transmitted in response to receiving the request to set up the account for the first service, concurrently displaying:
            the first login option without a selection indicator; and
            the second login option with the selection indicator.

42. The non-transitory computer-readable storage medium of claim 20, wherein the one or more programs further include instructions for:
    prior to receiving the request to set up the account for the first service, receiving a request to access the first service; and
    in response to receiving the request to access the first service:
        displaying alternative account information for the first service, wherein the alternative account information includes:
            an indication of a type of credential for the alternative account information; and
            an indication of a source of credential for the alternative account information.

43. The non-transitory computer-readable storage medium of claim 20, wherein the one or more programs further include instructions for:
    subsequent to transmitting the request to use second contact information for the user to set up the account for the first service, displaying a settings interface that includes the second contact information for the user.

44. The non-transitory computer-readable storage medium of claim 20, wherein the second contact information is an intermediary email address configured to forward received emails to an email address of the user.

45. The non-transitory computer-readable storage medium of claim 44, wherein the one or more programs further include instructions for:
    displaying a settings interface with the email address of the user that the intermediary email address is configured to forward received emails to;
    detecting a fourth set of one or more inputs modifying the email address of the user; and
    transmitting a request to update the intermediary email address to forward emails to the modified email address of the user.

46. The non-transitory computer-readable storage medium of claim 20, wherein the one or more programs further include instructions for:
    subsequent to transmitting the request to use second contact information for the user to set up the account for the first service, displaying a settings interface with a disable affordance;
    detecting an input corresponding to the disable affordance; and
    in response to detecting the input corresponding to the disable affordance:
        transmitting a request to cease using the second contact information for the user for the account of the first service.

47. The non-transitory computer-readable storage medium of claim 20, wherein the one or more programs further include instructions for:
    displaying information corresponding to the first service;
    detecting a fifth set of one or more inputs corresponding to a request to disable the account for the first service; and
    in response to detecting the fifth set of one or more inputs, disabling the account for the first service.

48. The non-transitory computer-readable storage medium of claim 20, wherein the one or more programs further include instructions for:
    prior to receiving the request to set up the account for the first service, receiving a request to access the first service; and
    in response to receiving the request to access the first service:
        displaying a change account affordance;
        detecting an input corresponding to the change account affordance; and
        in response to detecting the input corresponding to the change account affordance:
            displaying an interface to select a login account for the user; and
            detecting a sixth set of one or more inputs selecting a login account for the user,
    wherein the request to set up the account for the first service is received after detecting the sixth set of one or more inputs selecting the login account for the user, and wherein the first contact information corresponds to contact information of the selected login account.

49. The non-transitory computer-readable storage medium of claim 20, wherein the one or more programs further include instructions for:
    prior to receiving the request to set up the account for the first service, receiving a request to access the first service; and
    in response to receiving the request to access the first service:
        detecting a security issue;
        displaying an interface to correct the security issue; and
        detecting a seventh set of one or more inputs correcting the security issue,
    wherein the request to set up the account for the first service is received after detecting the seventh set of one or more inputs correcting the security issue.

50. The non-transitory computer-readable storage medium of claim 20, wherein the request to set up the account for the first service is received from a second device.

51. The non-transitory computer-readable storage medium of claim 20, wherein the request to set up the account for the first service is received from a web browser displaying a website, and wherein the first and second login options are displayed overlaying at least a portion of the website.

52. The non-transitory computer-readable storage medium of claim 20, wherein the request to set up the account for the first service is received from a web browser displaying a website, and wherein the first and second login options are displayed in a second website.

53. The non-transitory computer-readable storage medium of claim 20, wherein the one or more programs further include instructions for:
    detecting a request to access the first service;
    in response to detecting the request to access the first service, displaying an affordance to log in to the first service;
    detecting an input corresponding to the affordance to log in to the first service; and
    in response to detecting the input corresponding to the affordance to log in to the first service, accessing the first service with the account set up for the first service.

54. The non-transitory computer-readable storage medium of claim 20, wherein the one or more programs further include instructions for:
    before transmitting the request to use the first or second contact information, performing user authentication.

\* \* \* \* \*

UNITED STATES PATENT AND TRADEMARK OFFICE
CERTIFICATE OF CORRECTION

PATENT NO. : 10,698,701 B1
APPLICATION NO. : 16/585178
DATED : June 30, 2020
INVENTOR(S) : Frank De Jong et al.

Page 1 of 1

It is certified that error appears in the above-identified patent and that said Letters Patent is hereby corrected as shown below:

In the Claims

In Column 49, Line 15, Claim 4, after "one" insert -- or --.

In Column 52, Line 48, Claim 23, after "one" insert -- or --.

In Column 55, Line 30, Claim 40, after "one" insert -- or --.

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*